United States Patent
Pouyoul et al.

(10) Patent No.: US 7,165,107 B2
(45) Date of Patent: Jan. 16, 2007

(54) SYSTEM AND METHOD FOR DYNAMIC, TRANSPARENT MIGRATION OF SERVICES

(75) Inventors: Eric Pouyoul, San Francisco, CA (US); Mohamed M. Abdelaziz, Santa Clara, CA (US); Jean-Christophe Hugly, Palo Alto, CA (US); Michael J. Duigou, Fremont, CA (US); Bernard A. Traversat, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 809 days.

(21) Appl. No.: 10/164,259

(22) Filed: Jun. 5, 2002

(65) Prior Publication Data

US 2002/0156893 A1    Oct. 24, 2002

Related U.S. Application Data

(63) Continuation-in-part of application No. 10/055,645, filed on Jan. 22, 2002, and a continuation-in-part of application No. 10/055,773, filed on Jan. 22, 2002, and a continuation-in-part of application No. 10/054,809, filed on Jan. 22, 2002, and a continuation-in-part of application No. 10/055,547, filed on Jan. 22, 2002, and a continuation-in-part of application No. 10/055,641, filed on Jan. 22, 2002, and a continuation-in-part of application No. 10/055,741, filed on Jan. 22, 2002, and a continuation-in-part of application No. 10/055,662, filed on Jan. 22, 2002.

(60) Provisional application No. 60/308,932, filed on Jul. 31, 2001, provisional application No. 60/286,225, filed on Apr. 24, 2001, provisional application No. 60/268,893, filed on Feb. 14, 2001, provisional application No. 60/263,573, filed on Jan. 22, 2001.

(51) Int. Cl.
*G06F 15/16* (2006.01)

(52) U.S. Cl. .................................... 709/225; 709/224
(58) Field of Classification Search ........ 709/200–204, 709/217–229
See application file for complete search history.

(56) References Cited

U.S. PATENT DOCUMENTS 5,109,483 A    4/1992    Baratz et al.

(Continued)

FOREIGN PATENT DOCUMENTS

| EP | 993 163   | 4/2000 |
|---|---|---|
| EP | 1 058 422 | 7/2000 |
| EP | 022 876   | 7/2000 |

OTHER PUBLICATIONS

Anderson, David; Resilient Overlay Networks; May 2001; MIT.*
Dabek, Frank et al.; Building peer-to-peer Systems with Chord, a Distributed Lookup Service; MIT.*

(Continued)

*Primary Examiner*—Moustafa M. Meky
(74) *Attorney, Agent, or Firm*—Robert C. Kowert; Meyertons, Hood, Kivlin, Kowert & Goetzel, P.c.

(57) ABSTRACT

System and method for the dynamic and transparent migration of services in a peer-to-peer networking environment. Member peers in a peer group using a peer-to-peer platform may cooperate to provide redundant instances of services to member peers. Dynamic migration of a service may be performed by unbinding one or more peer-to-peer platform pipes from a peer hosting an instance of the service and binding the pipes to another peer hosting a different instance of the service. Using pipes, services may transparently failover from one physical peer endpoint to another in order to mask a service or peer failure, or to access a newly published instance of a service. Thus, a collection of peers may provide a high level of fault tolerance, where, for example, a new peer at a different location may replace a crashed peer, with the new peer taking over the existing pipe to keep the communication going.

65 Claims, 19 Drawing Sheets

U.S. PATENT DOCUMENTS

| | | | |
|---|---|---|---|
| 5,224,205 A | 6/1993 | Dinkin et al. |
| 5,442,637 A | 8/1995 | Nguyen |
| 5,517,622 A | 5/1996 | Ivanoff et al. |
| 5,675,629 A | 10/1997 | Raffel et al. |
| 5,675,782 A | 10/1997 | Montague et al. |
| 5,719,861 A | 2/1998 | Okanoue |
| 5,729,682 A | 3/1998 | Marquis et al. |
| 5,758,087 A | 5/1998 | Aaker et al. |
| 5,764,982 A | 6/1998 | Madduri |
| 5,768,527 A | 6/1998 | Zhu et al. |
| 5,805,820 A | 9/1998 | Bellovin et al. |
| 5,896,503 A | 4/1999 | Badovinatz et al. |
| 5,931,916 A | 8/1999 | Barker et al. |
| 5,941,988 A | 8/1999 | Bhagwat et al. |
| 5,999,530 A | 12/1999 | LeMaire et al. |
| 6,032,175 A | 2/2000 | Fletcher et al. |
| 6,061,734 A | 5/2000 | London |
| 6,094,674 A | 7/2000 | Hattori et al. |
| 6,105,064 A | 8/2000 | Davis et al. |
| 6,182,136 B1 | 1/2001 | Ramanathan et al. |
| 6,212,558 B1 | 4/2001 | Antur et al. |
| 6,269,099 B1 | 7/2001 | Borella et al. |
| 6,317,438 B1 | 11/2001 | Trebes, Jr. |
| 6,324,580 B1 | 11/2001 | Jindal et al. |
| 6,408,328 B1 | 6/2002 | Haury |
| 6,408,341 B1 | 6/2002 | Feeney et al. |
| 6,415,323 B1 * | 7/2002 | McCanne et al. ........... 709/225 |
| 6,456,600 B1 | 9/2002 | Rochberger et al. |
| 6,477,590 B1 | 11/2002 | Habusha et al. |
| 6,490,618 B1 | 12/2002 | Ferguson et al. |
| 6,587,970 B1 * | 7/2003 | Wang et al. ................... 714/47 |
| 6,591,310 B1 | 7/2003 | Johnson |
| 6,611,872 B1 | 8/2003 | McCanne |
| 6,633,761 B1 | 10/2003 | Singhal et al. |
| 6,651,105 B1 | 11/2003 | Bhagwat et al. |
| 6,658,540 B1 | 12/2003 | Sirola et al. |
| 6,671,746 B1 | 12/2003 | Northrup |
| 6,681,282 B1 | 1/2004 | Golden et al. |
| 6,721,286 B1 | 4/2004 | Williams et al. |
| 6,732,180 B1 | 5/2004 | Hale et al. |
| 6,742,023 B1 | 5/2004 | Fanning et al. |
| 6,778,491 B1 | 8/2004 | Fourcand et al. |
| 6,779,004 B1 | 8/2004 | Zintel |
| 6,782,527 B1 | 8/2004 | Kouznetsov et al. |
| 6,795,917 B1 | 9/2004 | Yionen |
| 6,810,259 B1 | 10/2004 | Zhang |
| 6,816,461 B1 | 11/2004 | Scrandis et al. |
| 6,826,763 B1 | 11/2004 | Wang et al. |
| 6,845,091 B1 | 1/2005 | Ogier et al. |
| 6,865,600 B1 | 3/2005 | Brydon et al. |
| 6,892,210 B1 | 5/2005 | Erickson et al. |
| 6,892,230 B1 | 5/2005 | Gu et al. |
| 2002/0049760 A1 * | 4/2002 | Scott et al. ................... 707/10 |
| 2002/0062375 A1 | 5/2002 | Teodosiu et al. |
| 2002/0073075 A1 | 6/2002 | Dutta et al. |
| 2002/0073204 A1 | 6/2002 | Dutta et al. |
| 2002/0107935 A1 | 8/2002 | Lowery et al. |
| 2002/0112058 A1 | 8/2002 | Weisman et al. |
| 2002/0161821 A1 | 10/2002 | Narayan et al. |
| 2003/0067912 A1 | 4/2003 | Mead et al. |
| 2004/0068477 A1 | 4/2004 | Gilmour et al. |
| 2005/0053093 A1 | 3/2005 | Fukushima et al. |

OTHER PUBLICATIONS

Weibin Zhao, Henning Schulzrinne, and Erik Guttman. mSLP—Mesh Enhanced Service Location Protocol. In Proc. of the IEEE Int'l. Conf. on Computer Communications and Networks (ICCCN'00), Las Vegas, USA, Oct. 2000.*

Cederqvist, et al., "What is CVS?", 1993, 6 pages.

Microsoft Computer Dictionary, 1999, Microsoft, 4th Edition, p. 252.

Kalt, C., "RFC 2812 Internet Relay Chat: Client Protocol," Request for Comments, Apr. 2000, pp. 1-63, XP002242624.

Marmor, M.S., "Make the P2P Leap with Toadnode," Web Technologies, Miller Freeman, US, vol. 5, No. 12, Dec. 2000, pp. 44-49, XP008000376, ISSN: 1086-556X, *Section "How the Gnutella Protocol Works," on pp. 46-46.

Krikorian, R., "Hello JXTA," The O'Reilly Network, Online!, Apr. 25, 2001, pp. 1-9, XP002249288.

Drschollusers.sourceforge.net: "Napster Messages," Open Source Napster Server, 'Online!, Apr. 7, 2000, pp. 1-25, XP002249287.

* cited by examiner

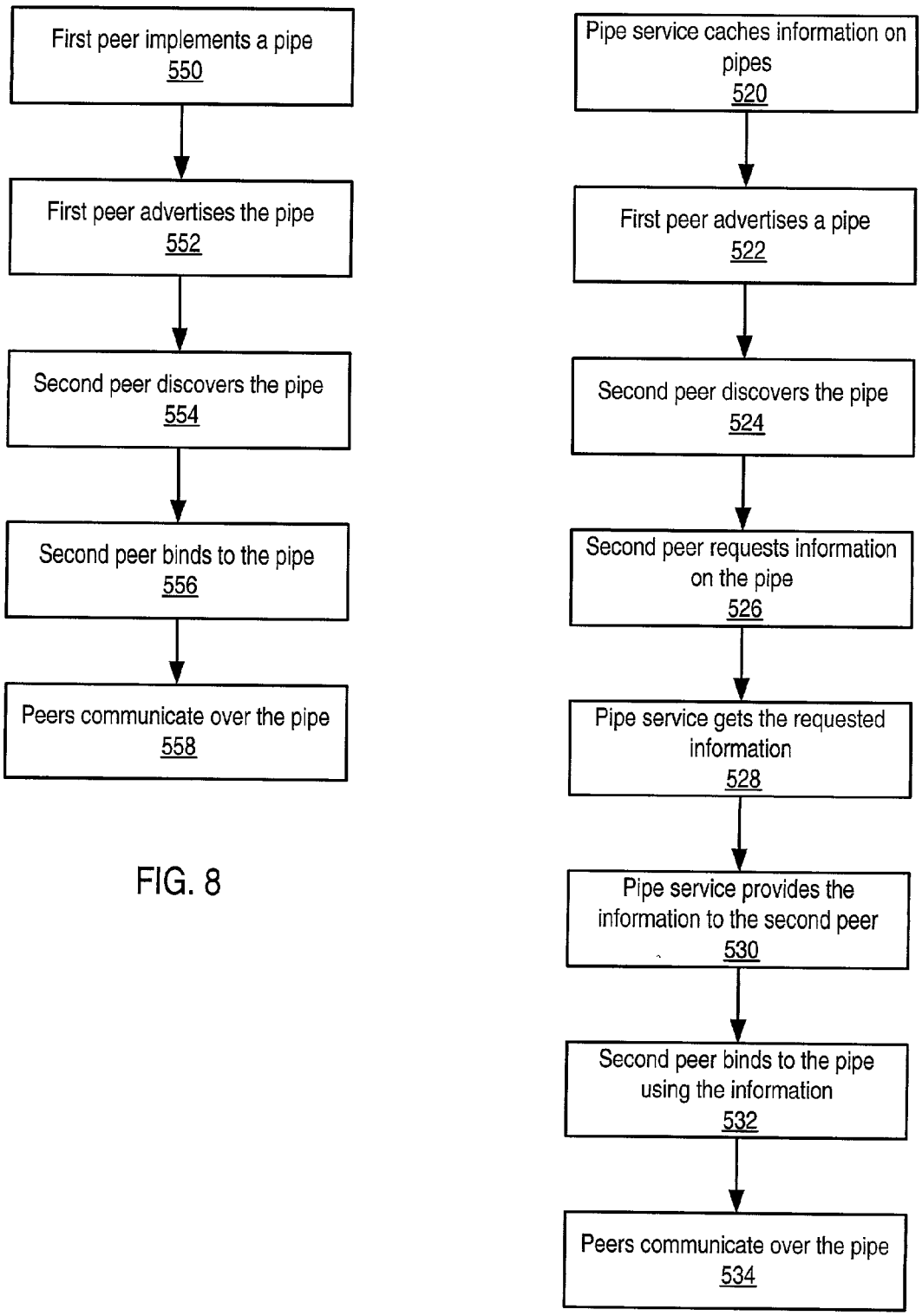

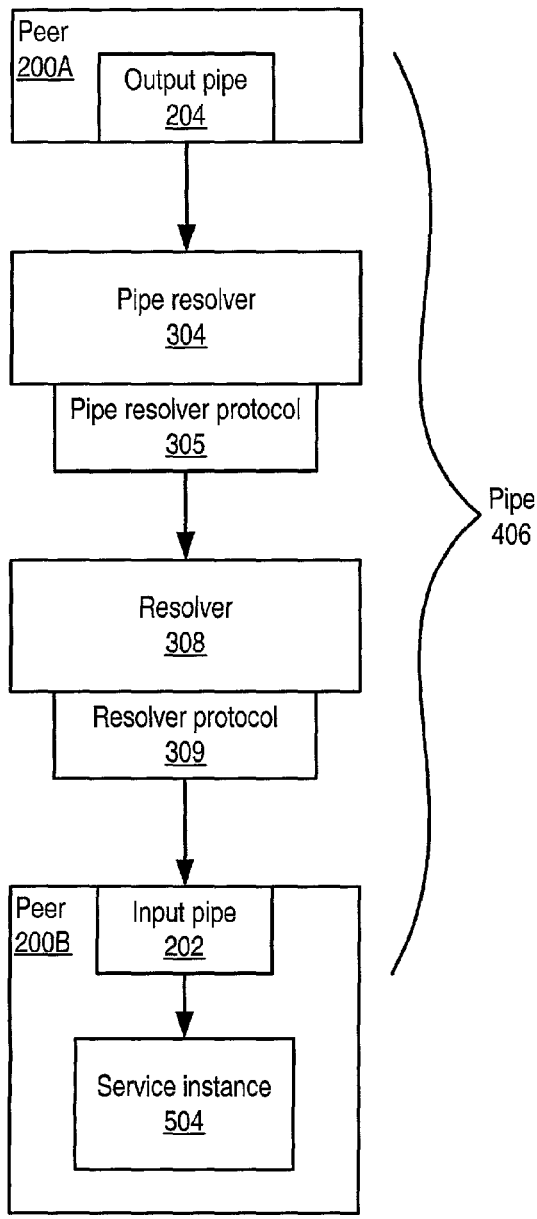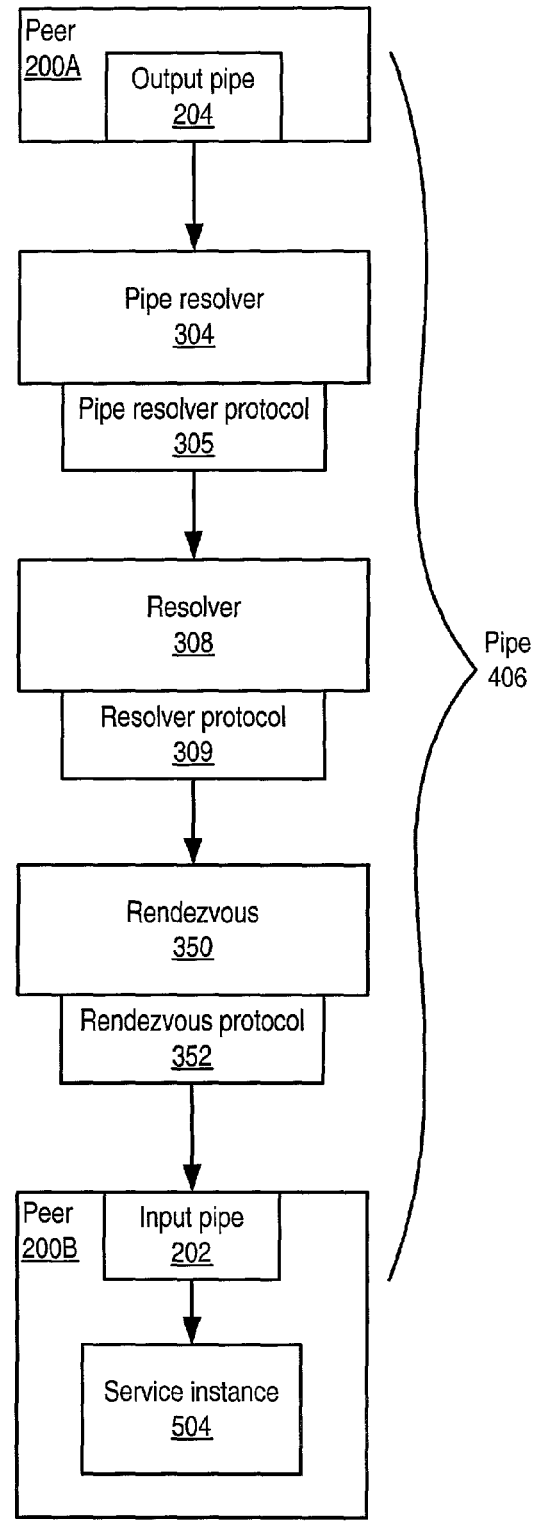
FIG. 22A
FIG. 22B

SYSTEM AND METHOD FOR DYNAMIC, TRANSPARENT MIGRATION OF SERVICES

PRIORITY INFORMATION

This application claims benefit of priority to U.S. Provisional Application Ser. No. 60/308,932 titled "Trust Mechanism For A Peer-To-Peer Network Computing Platform" filed on Jul. 31, 2001.

This application is a continuation-in-part of U.S. patent application Ser. No. 10/055,645 titled "Peer-to-Peer Network Computing Platform" filed on Jan. 22, 2002, which claims benefit of priority to the following U.S. Provisional Applications: Ser. No. 60/263,573 filed Jan. 22, 2001 titled "Peer-to-Peer Network Computing Platform"; Ser. No. 60/268,893 filed Feb. 14, 2001 titled "Peer-to-Peer Network Computing Platform"; U.S. Provisional Application Ser. No. 60/286,225 filed Apr. 24, 2001 titled "Peer-to-Peer Network Computing Platform"; and Ser. No. 60/308,932 filed Jul. 31, 2001 titled "Trust Mechanism For A Peer-To-Peer Network Computing Platform".

This application is a continuation-in-part of U.S. patent application Ser. No. 10/055,773 titled "Peer-to-Peer Computing Architecture" filed on Jan. 22, 2002, which claims benefit of priority to the following U.S. Provisional Applications: Ser. No. 60/263,573 filed Jan. 22, 2001 titled "Peer-to-Peer Network Computing Platform"; Ser. No. 60/268,893 filed Feb. 14, 2001 titled "Peer-to-Peer Network Computing Platform"; U.S. Provisional Application Ser. No. 60/286,225 filed Apr. 24, 2001 titled "Peer-to-Peer Network Computing Platform"; and Ser. No. 60/308,932 filed Jul. 31, 2001 titled "Trust Mechanism For A Peer-To-Peer Network Computing Platform".

This application is a continuation-in-part of U.S. patent application Ser. No. 10/054,809 titled "Advertisements For Peer-To-Peer Computing Resources" filed on Jan. 22, 2002, which claims benefit of priority to the following U.S. Provisional Applications: Ser. No. 60/263,573 filed Jan. 22, 2001 titled "Peer-to-Peer Network Computing Platform"; Ser. No. 60/268,893 filed Feb. 14, 2001 titled "Peer-to-Peer Network Computing Platform"; U.S. Provisional Application Ser. No. 60/286,225 filed Apr. 24, 2001 titled "Peer-to-Peer Network Computing Platform"; and Ser. No. 60/308,932 filed Jul. 31, 2001 titled "Trust Mechanism For A Peer-To-Peer Network Computing Platform".

This application is a continuation-in-part of U.S. patent application Ser. No. 10/055,547 titled "Providing Peer Groups In A Peer-To-Peer Environment" filed on Jan. 22, 2002, which claims benefit of priority to the following U.S. Provisional Applications: Ser. No. 60/263,573 filed Jan. 22, 2001 titled "Peer-to-Peer Network Computing Platform"; Ser. No. 60/268,893 filed Feb. 14, 2001 titled "Peer-to-Peer Network Computing Platform"; U.S. Provisional Application Ser. No. 60/286,225 filed Apr. 24, 2001 titled "Peer-to-Peer Network Computing Platform"; and Ser. No. 60/308,932 filed Jul. 31, 2001 titled "Trust Mechanism For A Peer-To-Peer Network Computing Platform".

This application is a continuation-in-part of U.S. patent application Ser. No. 10/055,641 titled "Rendezvous For Locating Peer-To-Peer Resources" filed on Jan. 22, 2002, which claims benefit of priority to the following U.S. Provisional Applications: Ser. No. 60/263,573 filed Jan. 22, 2001 titled "Peer-to-Peer Network Computing Platform"; Ser. No. 60/268,893 filed Feb. 14, 2001 titled "Peer-to-Peer Network Computing Platform"; U.S. Provisional Application Ser. No. 60/286,225 filed Apr. 24, 2001 titled "Peer-to-Peer Network Computing Platform"; and Ser. No. 60/308,932 filed Jul. 31, 2001 titled "Trust Mechanism For A Peer-To-Peer Network Computing Platform".

This application is a continuation-in-part of U.S. patent application Ser. No. 10/055,741 titled "Peer-To-Peer Resource Resolution" filed on Jan. 22, 2002, which claims benefit of priority to the following U.S. Provisional Applications: Ser. No. 60/263,573 filed Jan. 22, 2001 titled "Peer-to-Peer Network Computing Platform"; Ser. No. 60/268,893 filed Feb. 14, 2001 titled "Peer-to-Peer Network Computing Platform"; U.S. Provisional Application Ser. No. 60/286,225 filed Apr. 24, 2001 titled "Peer-to-Peer Network Computing Platform"; and Ser. No. 60/308,932 filed Jul. 31, 2001 titled "Trust Mechanism For A Peer-To-Peer Network Computing Platform".

This application is a continuation-in-part of U.S. patent application Ser. No. 10/055,662 still pending, titled "Peer-to-Peer Communication Pipes" filed on Jan. 22, 2002, which claims benefit of priority to the following U.S. Provisional Applications: Ser. No. 60/263,573 filed Jan. 22, 2001 titled "Peer-to-Peer Network Computing Platform"; Ser. No. 60/268,893 filed Feb. 14, 2001 titled "Peer-to-Peer Network Computing Platform"; U.S. Provisional Application Ser. No. 60/286,225 filed Apr. 24, 2001 titled "Peer-to-Peer Network Computing Platform"; and Ser. No. 60/308,932 filed Jul. 31, 2001 titled "Trust Mechanism For A Peer-To-Peer Network Computing Platform".

BACKGROUND OF THE INVENTION

1. Field of the Invention

This invention relates to peer-to-peer networking, and more particularly to migrating services in a peer-to-peer network computing environment.

2. Description of the Related Art

The Internet has three valuable fundamental assets—information, bandwidth, and computing resources—all of which are vastly underutilized, partly due to the traditional client-server computing model. No single search engine or portal can locate and catalog the ever-increasing amount of information on the Web in a timely way. Moreover, a huge amount of information is transient and not subject to capture by techniques such as Web crawling. For example, research has estimated that the world produces two exabytes or about $2 \times 10^{18}$ bytes of information every year, but only publishes about 300 terabytes or about $3 \times 10^{12}$ bytes. In other words, for every megabyte of information produced, only one byte is published. Moreover, Google claims that it searches about only 1.3×10^8 web pages. Thus, finding useful information in real time is increasingly difficult.

Although miles of new fiber have been installed, the new bandwidth gets little use if everyone goes to one site for content and to another site for auctions. Instead, hot spots just get hotter while cold pipes remain cold. This is partly why most people still feel the congestion over the Internet while a single fiber's bandwidth has increased by a factor of 10^6 since 1975, doubling every 16 months.

New processors and storage devices continue to break records in speed and capacity, supporting more powerful end devices throughout the network. However, computation continues to accumulate around data centers, which have to increase their workloads at a crippling pace, thus putting immense pressure on space and power consumption.

Finally, computer users in general are accustomed to computer systems that are deterministic and synchronous in nature, and think of such a structure as the norm. For example, when a browser issues a URL request for a Web page, the output is typically expected to appear shortly afterwards. It is also typically expected that everyone around the world will be able to retrieve the same page from the same Web server using the same URL.

The term peer-to-peer networking or computing (often referred to as P2P) may be applied to a wide range of technologies that greatly increase the utilization of information, bandwidth, and computing resources in the Internet. Frequently, these P2P technologies adopt a network-based computing style that neither excludes nor inherently depends on centralized control points. Apart from improving the performance of information discovery, content delivery, and information processing, such a style also can enhance the overall reliability and fault-tolerance of computing systems.

Peer-to-peer (P2P) computing, embodied by applications like Napster, Gnutella, and Freenet, has offered a compelling and intuitive way for Internet users to find and share resources directly with each other, often without requiring a central authority or server. As much as these diverse applications have broken new ground, they typically address only a single function, run primarily only on a single platform, and are unable to directly share data with other, similar applications.

Many peer-to-peer systems are built for delivering a single type of service. For example, Napster provides music file sharing, Gnutella provides generic file sharing, and AIM provides instant messaging. Given the diverse characteristics of these services and the lack of a common underlying P2P infrastructure, each P2P software vendor tends to create incompatible systems—none of them able to interoperate with one another. This means each vendor creates its own P2P user community, duplicating efforts in creating software and system primitives commonly used by all P2P systems. Moreover, for a peer to participate in multiple communities organized by different P2P implementations, the peer must support multiple implementations, each for a distinct P2P system or community, and serve as the aggregation point.

Many P2P systems today offer their features or services through a set of APIs that are delivered on a particular operating system using a specific networking protocol. For example, one system might offer a set of C++ APIs, with the system initially running only on Windows, over TCP/IP, while another system offers a combination and C and Java APIs, running on a variety of UNIX systems, over TCP/IP but also requiring HTTP. A P2P developer is then forced to choose which set of APIs to program to, and consequently, which set of P2P customers to target. Because there is little hope that the two systems will interoperate, if the developer wants to offer the same service to both communities, they have to develop the same service twice for two P2P platforms or develop a bridge system between them. Both approaches are inefficient and impractical considering the dozens of P2P platforms in existence.

Many P2P systems, especially those being offered by upstart companies, tend to choose one operating system as their target deployment platform. The cited reason for this choice is to target the largest installed base and the fastest path to profit. The inevitable result is that many dependencies on platform-specific features are designed into (or just creep into) the system. This is often not the consequence of technical desire but of engineering reality with its tight schedules and limited resources.

This approach is clearly shortsighted. Even though the earliest demonstration of P2P capabilities are on platforms in the middle of the computing hardware spectrum, it is very likely that the greatest proliferation of P2P technology will occur at the two ends of the spectrum—large systems in the enterprise and consumer-oriented small systems. In fact, betting on any particular segment of the hardware or software system is not future proof.

FIGS. 1A and 1B are examples illustrating the peer-to-peer model. FIG. 1A shows two peer devices 104A and 104B that are currently connected. Either of the two peer devices 104 may serve as a client of or a server to the other device. FIG. 1B shows several peer devices 104 connected over the network 106 in a peer group. In the peer group, any of the peer devices 104 may serve as a client of or a server to any of the other devices.

Prior art peer-to-peer systems are generally built for delivering a single type of service, for example a music file sharing service, a generic file sharing service, or an instant messaging service. Given the diverse characteristics of these services and given the lack of a common underlying peer-to-peer infrastructure, each vendor tends to form various peer-to-peer "silos." In other words, the prior art peer-to-peer systems typically do not interoperate with each other. This means each vendor has to create its own peer-to-peer user community, duplicating efforts in creating primitives commonly used by peer-to-peer systems such as peer discovery and peer communication.

Discovery in a peer-to-peer environment may be based on centralized discovery with a centralized index. This method is used by such peer-to-peer applications as Napster and AIM. Discovery based on a centralized index may be efficient, deterministic, and well suited for a static environment. Such a method of discovery may also provide centralized control, provide a central point of failure, and provide easy denial of services. However, such a method of discovery may be expensive to scale and may degrade with aging.

Discovery in a peer-to-peer environment may also be based on net crawling. This method is used by such peer-to-peer applications as Gnutella and FreeNet. Discovery based on net crawling may be simple, adaptive, deterministic, inexpensive to scale, suited for a dynamic environment, and may be difficult to attack. Such a method of discovery may also improve with aging. However, such a method of discovery may provide slower discovery than centralized control.

In a peer-to-peer environment, assume there is a peer-to-peer community offering a search capability for its members, where one member can post a query and other members can hear and respond to the query. One member is a Napster user and has implemented a feature so that, whenever a query is received seeking an MP3 file, this member will look up the Napster directory and then respond to the query with information returned by the Napster system. Here, a member without any knowledge of Napster may benefit because another member implemented a bridge to connect their peer-to-peer system to Napster. This type of bridging is very useful, but when the number of services is large, pair-wise bridging becomes more difficult and undesirable. Thus, it may be desirable to provide a platform bridge that may be used to connect various peer-to-peer systems together.

In another example, one engineering group requires a sizable storage capability, but also with redundancy to protect data from sudden loss. A common solution is to purchase a storage system with a large capacity and mirrored disks. Another engineering group later decides to purchase the same system. Both groups end up with a lot of extra capacity, and have to pay higher prices for the mirroring feature. Thus, it may be desirable to provide a mechanism by which each group may buy a simple storage system without the mirroring feature, where the disks can then discover each other automatically, form a storage peer group, and offer mirroring facilities using their spare capacity.

As yet another example, many devices such as cell phones, pagers, wireless email devices, Personal Digital Assistants (PDAs), and Personal Computers (PCs) may carry directory and calendar information. Currently, synchronization among the directory and calendar information on these devices is very tedious, if not impossible. Often, a PC becomes the central synchronization point, where every other device has to figure out a way to connect to the PC (using serial port, parallel port, IRDA, or other method) and the PC must have the device driver for every device that wishes to connect. Thus, it may be desirable to provide a mechanism by which these devices may interact with each other, without extra networking interfaces except those needed by the devices themselves, utilizing a common layer of communication and data exchange.

SUMMARY OF THE INVENTION

A system and method for the dynamic and transparent migration of services in a peer-to-peer networking environment are described. Member peers in a peer group using a peer-to-peer platform may cooperate to provide redundant instances of services to member peers. The redundant services may help to create an environment of reliability. Redundancy of services may increase data availability, and may decrease the chance of data loss. However, since peers in a peer-to-peer network may become unavailable at any time, redundant services that need to have a persistent presence or instance available to peers may need the topology of the network to be dynamically and transparently reconfigured to continue providing the service to customer peers.

In one embodiment, services are accessed through peer-to-peer platform pipes. Pipes are virtual communication channels that may be used to send and receive messages between services and applications. Peer-to-peer platform pipes may have ends that may be moved around and bound to different peers at different times. Pipe binding may include discovering and connecting the two or more endpoints of a pipe. In one embodiment, pipe endpoints may be non-localized to a physical peer, and may be dynamically bound at creation time or runtime using the pipe binding protocol. In one embodiment, pipe ends may be dynamically bound to a peer endpoint at runtime by a pipe resolver.

In one embodiment, dynamic migration of a service may be performed by unbinding one or more peer-to-peer platform pipes from a peer hosting an instance of the service and binding the pipes to another peer hosting a different instance of the service. One embodiment may allow a service to be migrated so that the peer accessing the service through the pipe (and an application and/or service executing within the peer and accessing the service through the pipe) is not aware of the migration (i.e. the migration is performed transparently to the peer). In one embodiment, the migration mechanism is not centralized (i.e. is not executing within a single peer or set of peers), and thus a third party may not be required to perform the service migration. Using the migration mechanism, migration of services may be performed transparently and dynamically to peers accessing services provided by the collection of peers.

Using the pipe abstraction, developers may build highly available services where pipe connections may be established independently of a peer location. The dynamic binding of pipes may be used in providing redundant implementation of services over a peer-to-peer network. Applications and services may transparently failover from one physical peer endpoint to another in order to mask a service or peer failure, to access a newly published instance of a service, or to provide load balancing. Thus, using pipes as described herein, a collection of peers together may provide a high level of fault tolerance, where, for example, a new peer at a different location may replace a crashed or otherwise unavailable peer, with the new peer taking over the existing pipe to keep the communication going. In some embodiments, this may be performed transparently to peers accessing services or other resources provided by the collection of peers.

In one embodiment, migration of services may be implemented using several layers according to the peer-to-peer platform. Each layer may implement its own protocol for communicating on the network. A pipe resolver may handle the localization of the receiving end (input pipe) of the pipe and may be implemented with a pipe resolver protocol for communicating with the pipe resolver according to the peer-to-peer platform. Pipe resolver may use a resolver for sending messages. The resolver may handle the actual sending of messages (queries) on the pipe. The resolver may be implemented using a resolver protocol for sending simple, generic messages on pipes in accordance with the peer-to-peer platform. In one embodiment, the pipe resolver and resolver may be implemented as services in a peer group by one or more peer group members.

Peer groups may extend across multiple IP subnets. Thus, instances of a service may be located in two or more subnets or on the other side of firewalls, and an instance of a service may or may not be located in a different subnet or may be located across a firewall from peer. In one embodiment, a rendezvous may be used to propagate messages to peers in other subnets. The rendezvous may be implemented using a rendezvous protocol in accordance with the peer-to-peer platform. In one embodiment, the rendezvous may be a service implemented in a peer group by one or more peer group members. In one embodiment, the rendezvous service may propagate queries to other rendezvous services in other peer groups.

BRIEF DESCRIPTION OF THE DRAWINGS

FIG. 8 is a flowchart illustrating a method for creating a connection between peers in a peer-to-peer networking environment according to one embodiment;

FIG. 9 is a flowchart illustrating a method for creating a connection between peers in a peer-to-peer networking environment using a pipe service according to one embodiment;

FIG. 22A illustrates layers and protocols of a peer-to-peer platform that may be used in accessing and migrating services according to one embodiment; and FIG. 22B illustrates using a rendezvous that may be used in accessing and migrating services according to one embodiment.

Figure 1A:
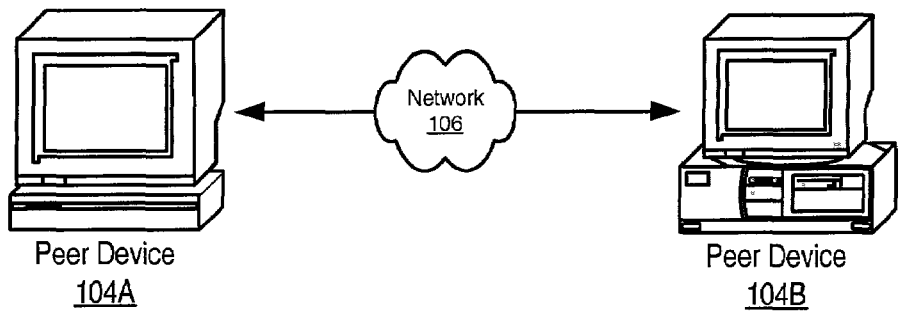
FIG. 1A illustrates a prior art example of two devices that are currently connected as peers.
Figure 1B:
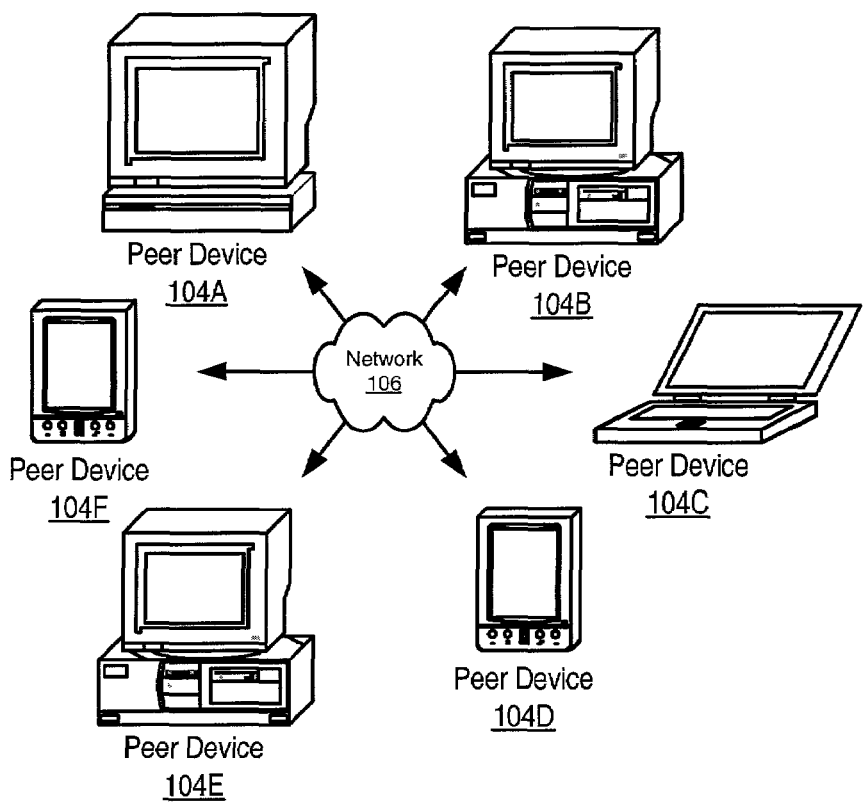
FIG. 1B illustrates a prior art example of several peer devices connected over the network in a peer group.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Embodiments of an open network computing platform designed for peer-to-peer computing are described. The network computing platform may be referred to as a peer-to-peer platform. The peer-to-peer platform may be used to build a wide range of distributed services and applications in which every device is addressable as a peer, and where peers can bridge from one domain into another. The peer-to-peer platform may enable developers to focus on their own application development while easily creating distributed computing software that is flexible, interoperable, and available on any peer on the expanded Web. The peer-to-peer platform may enable software developers to deploy interoperable services and content, further spring-boarding the peer-to-peer revolution on the Internet. The peer-to-peer platform addresses the problems of prior art peer-to-peer systems by providing a generic and service-agnostic peer-to-peer platform that may be defined by a small number of protocols. Each protocol may be easy to implement and easy to be adopted into peer-to-peer services and applications. Thus, service offerings from one vendor may be used, perhaps transparently, by the user community of another vendor's system.

The peer-to-peer platform extends P2P computing to enable a wide range of distributed computing applications and overcome the limitations typically found in prior art P2P applications. The peer-to-peer platform is a network computing technology that provides a set of simple, small, and flexible mechanisms that can support P2P computing on any platform, anywhere, and at any time. The peer-to-peer platform generalizes P2P functionality and provides core technology that addresses the limitations of prior art P2P computing technologies.

The peer-to-peer platform is a modular platform that provides simple and essential building blocks for developing a wide range of distributed services and applications. The peer-to-peer platform specifies a set of protocols rather than an API. Thus, the peer-to-peer platform can be implemented in any language on any Operating System to provide solutions ranging from providing a simple protocol-based wrapper that enables a small device to join a network of peers to developing a fully integrated application that supports metering, monitoring, high-level security and communication across server-class systems.

In one embodiment, the peer-to-peer platform architecture may include, but is not limited to, protocols, advertisements, and core services. Network protocol bindings may be used to ensure interoperability with existing content transfer protocols, network transports, routers, and firewalls. The peer-to-peer platform may be used to combine network nodes (peers) into a simple and coherent peer-to-peer network computing platform. The platform may be directed at providing several benefits including, but not limited to, no single point of failure, asynchronous messaging, the ability for peers to adapt to their network environment, and moving content towards its consumers.

Figure 2:
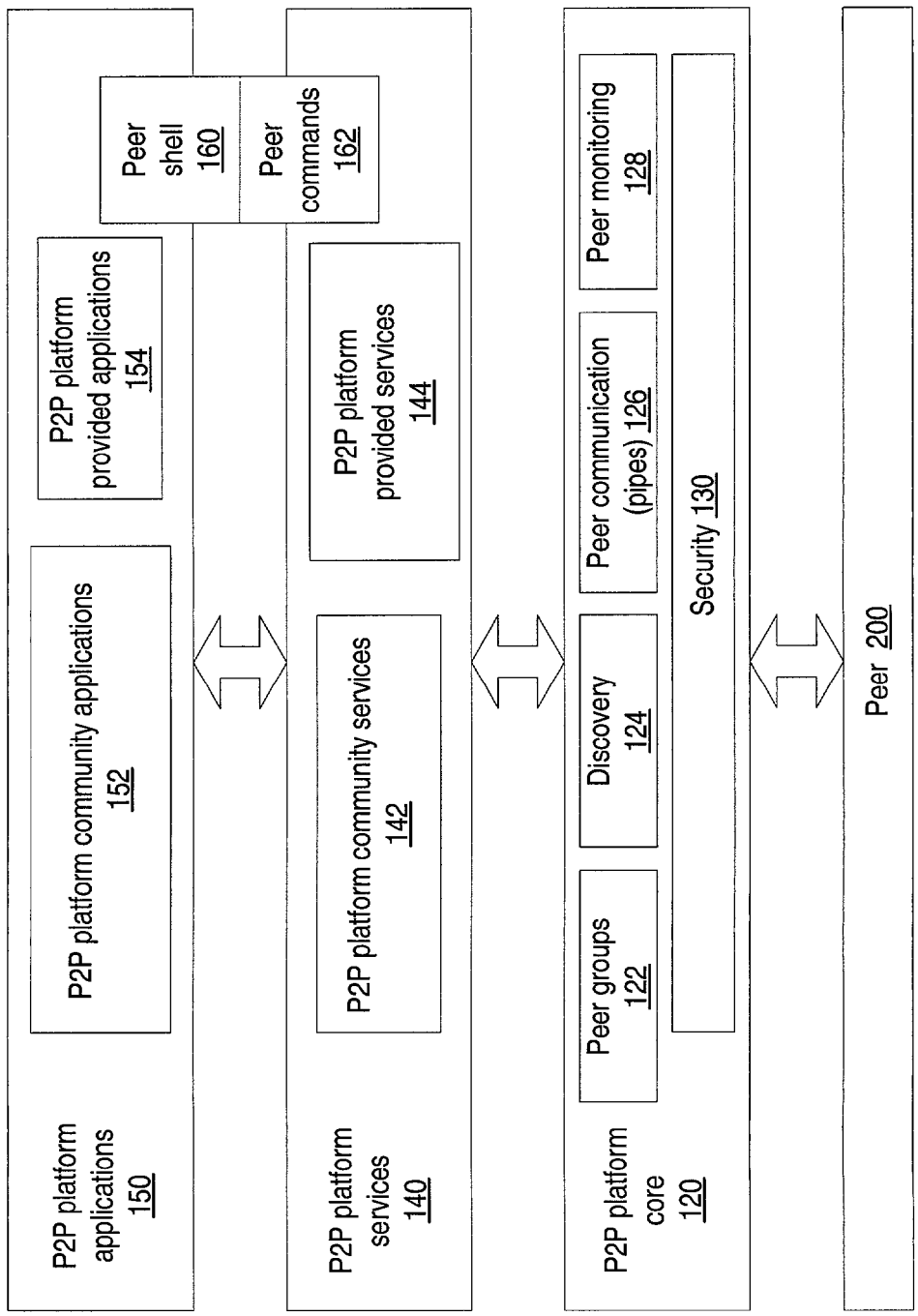
FIG. 2 illustrates one embodiment of peer-to-peer platform software architecture at the conceptual level.

FIG. 2 illustrates one embodiment of peer-to-peer platform software architecture at the conceptual level. The peer-to-peer platform may include several layers. In one embodiment, the software stack may be described using three layers; a peer-to-peer platform (core) layer 120, a service layer 140 and an application layer 150. In one embodiment, the peer-to-peer platform may include a core layer 120 that defines and encapsulates minimal primitives that are common to peer-to-peer networking, including, but not limited to, peers 110, peer groups 122, peer discovery 124, peer communication (e.g. pipes) 126, peer monitoring 128, and associated security primitives 130. This layer may be shared by all peer-to-peer devices so that interoperability becomes possible.

A peer may be defined as any entity that runs some or all of one or more protocols provided by the peer-to-peer platform core layer. As such, a peer may manifest in the form of a processor, a process or a device. A peer may be anything with a digital heartbeat that supports the peer-to-peer platform core, including sensors, servers, PCs, computers up to and including supercomputers, PDAs, manufacturing and medical equipment, phones and cellular phones. In order to interact with other peers (e.g. to form or join peer groups), the peer needs to be connected to some kind of network (wired or wireless), such as IP, Bluetooth, or Havi, among others.

The peer-to-peer platform may provide mechanisms through which peers may discover each other, communicate with each other, and cooperate with each other to form peer groups. Peers may discover each other on the network to form transient or persistent relationships called peer groups. A peer group is a collection of peers connected by a network that share a common set of interests and that have agreed upon a common set of rules to publish, share and access any computer content (code, data, applications, or other collections of computer representable resources), and communicate among themselves. Peer groups may also be statically predefined. The peers in a peer group may cooperate to provide a common set of services. A peer group may be viewed as an abstract region of the network, and may act as a virtual subnet. The concept of a region virtualizes the notion of routers and firewalls, subdividing the network in a self-organizing fashion without respect to actual physical network boundaries. In one embodiment, peer groups implicitly define a region scope that may limit peer propagation requests. Conceptually, a peer group may be viewed as a virtual entity that speaks the set of peer group protocols.

A peer group may theoretically be as large as the entire connected universe. Naming anything uniquely is a challenge in such a large namespace. In one embodiment, the peer-to-peer platform may support and/or provide sophisticated naming and binding services. In one embodiment, the peer-to-peer platform may use a universal unique identifier (UUID), for example, a 64- or 128-bit datum, to refer to an entity (e.g. a peer, peer group, pipe, content, etc.). For example, UUIDs may be embedded in advertisements for internal use. UUIDs may be used to guarantee that each entity has a unique UUID within a local runtime environment and serves as a canonical way of referring to an entity, but because a global state is not assumed, it may not be possible to provide a guarantee of uniqueness across an entire community that may consist of millions of peers. This may not be a problem because a UUID may be used within the peer-to-peer platform as an internal identifier. This may become significant only after the UUID is securely bound to other information such as a name and a network address. In one embodiment, Uniform Resource Name (URN) format may be used for the expression of UUIDs.

The core layer 120 provides core support for peer-to-peer services and applications. In a multi-platform, secure execution environment, the core mechanisms of peer groups, peer pipes and peer monitoring may be provided. Peer groups 122 may establish a set of peers and naming within a peer group with mechanisms to create policies for creation and deletion, membership, advertising and discovery of other peer groups and peer nodes, communication, security, and content sharing. Pipes provide virtual communication channels among peers. Messages sent in pipes may support transfer of data, content, and code in a protocol-independent manner, allowing a range of security, integrity, and privacy options. In one embodiment, messages may be structured with a markup language such as XML. Peer monitoring 128 enables control of the behavior and activity of peers in a peer group and can be used to implement peer management functions including access control, priority setting, traffic metering, and bandwidth balancing.

The core layer 120 may include protocols and building blocks to enable key mechanisms for peer to peer networking, including discovery, transport (including firewall handling and limited security), and the creation of peers and peer groups. The core layer 120 may be thin and small, and may provide interesting and powerful primitives for use by services and applications in the other layers. The core layer 120 may support choices such as anonymous vs. registered users and encrypted vs. clear text content without imposing specific policies on developers. Policy choices may be made, or when necessary, implemented, at the service layer 140 and/or application layer 150. For example, administration services such as accepting or rejecting a peer's membership in a peer group may be implemented using the functionality provided by the core layer 120.

The core components of the peer-to-peer protocol may be used to implement discovery mechanisms for searching, publishing and recovering of core abstractions (e.g. peers, peer group, pipes, endpoints, and advertisements). These mechanisms may be simple, administration free, and do not require special peers to act as "master" peers. These mechanisms may allow processes in the peer-to-peer network, in absence of help from other applications and/or services, to bootstrap and find out the information necessary to access applications and services that can help. Also, the core may "return" to this standalone behavior and still function if helper applications or services fail. In one embodiment, safety mechanisms may be put in place in order to avoid a major overflow of "web-crawling". In one embodiment, applications and/or services that support the peer-to-peer protocol may access, control, and/or override the core components, even to the extreme of implementing a centralized, client-server model based on the core components.

At the highest abstraction level, the peer-to-peer platform may be viewed as a set of protocols provided at the core layer 120. In one embodiment, a common thread among peer-to-peer platform peers is protocols, not APIs or software implementations. The peer-to-peer platform protocols may guarantee interoperability between compliant software components executing on potentially heterogeneous peer runtimes. Thus the peer-to-peer platform may be agnostic to programming languages. The term compliant may refer to a single protocol only. That is some peers may not implement all the core protocols. Furthermore, some peers may only use a portion (client-side or server-side only) of a protocol.

Each protocol may be defined by one or more messages exchanged among participants of the protocol. Each message may have a predefined format, and may include various data fields. In one embodiment the protocols may utilize messaging such as XML messages. The peer-to-peer platform connects peer nodes with each other. The peer-to-peer platform may be platform-independent by virtue of being a set of protocols. As such, the peer-to-peer platform may not require APIs and remains independent of programming languages, so that it can be implemented in C/C++, Java, Java 2ME, Perl, Python or other languages. This means heterogeneous devices with completely different software stacks may interoperate through the peer-to-peer platform protocols. To underpin this set of protocols, the peer-to-peer platform may define a number of concepts including peer, peer group, advertisement, message, pipe, and more.

In one embodiment, peer-to-peer protocols may be embodied as markup language (e.g. XML) messages that may be sent between two peers. In one embodiment, the peer-to-peer platform messages may define the protocols used to discover and connect peers and peer groups, and to access resources offered by peers and peer groups, among others. The use of markup language (e.g. XML) messages to define protocols may allow many different kinds of peers to participate in a protocol. Each peer may be free to implement the protocol in a manner best suited to its abilities and role. For example, not all peers are capable of supporting a Java runtime environment. In one embodiment, the protocol definition does not require nor imply the use of Java on a peer.

Several peer-to-peer platform protocols that may be provided by embodiments of the peer-to-peer platform are described later in this document. The protocols defined in this document may be realized over networks including, but not limited to, the Internet, a corporate intranet, a dynamic proximity network, a home networking environment, LANs, and WANs. The protocols defined in this document may also be realized within a single computer. Thus, the peer-to-peer platform may be transport protocol independent. The size and complexity of the network peers that may support these protocols may include a wide range of peer implementations including peers implemented on, but not limited to, simple light switches, PDAs, cell phones, pagers, laptop and notebook computers, smart appliances, personal computers, workstations, complex, highly-available servers, mainframe computers and even supercomputers.

The peer-to-peer platform may further include a peer-to-peer services layer 140. This layer may provide capabilities that may not be absolutely necessary for a peer-to-peer network to operate but that may be desirable to provided added functionality beyond the core layer 120 in the peer-to-peer environment. The service layer 140 may deal with higher-level concepts such as search and indexing, directory, storage systems, file sharing, distributed file systems, resource aggregation and renting, protocol translation, authentication and PKI (public key infrastructure) systems. These services, which may make use of the protocols and building blocks provided by the core layer 120, may be useful by themselves but also may be included as components in an overall P2P system. Thus, services may include one or more services 144 provided by the peer-to-peer platform. These platform-provided services 144 may include indexing, searching and file sharing services, for example. The services layer 140 may provide hooks for supporting generic services (such as searching, sharing and added security) that are used in many P2P applications. Thus, services may also include one or more services 142 not provided as part of the peer-to-peer platform but rather provided by the peer-to-peer platform community. These services 142 may be user-defined and may be provided, for example, to member peers in a peer group as a peer group service.

Services may expand upon the capabilities of the core layer 120 and may be used to facilitate application development. Facilities provided as services in the service layer 140 may include mechanisms for search and indexing, directory, storage systems, file sharing, distributed file systems, resource aggregation and renting, protocol translation, authentication, PKI services, and caching code and content to enable cross-application bridging and translation of files, among others. Searching capabilities may include distributed, parallel searches across peer groups that are facilitated by matching an XML representation of a query to be processed with representations of the responses that can be provided by each peer. These facilities may be used for simple searches, for example searching a peer's repository, or more complex searches of dynamically generated content that is unreachable by conventional search engines. P2P searches may be conducted across a company's intranet, for example, to quickly locate relevant information within a secure environment. By exercising tight control over peer group membership and enabling encrypted communication between peers, a company may extend this capability to its extranet, including business partners, consultants, and suppliers as peers. The same mechanisms that facilitate searches across the peer group may be used as a bridge to incorporate Internet search results, and to include data outside of the peer's own repository, for example searching a peer's disk. The peer services layer 140 may be used to support other custom, application-specific functions. For example, a secure peer messaging system may be built to allow anonymous authorship and a persistent message store. The peer services layer 140 provides the mechanisms to create such secure tools; the application developers themselves may determine specific tool policies.

The peer-to-peer platform may also include a peer-to-peer application layer 150. The application layer 140 may support the implementation of integrated applications such as file sharing, resource sharing, monetary systems, distributed storage, peer-to-peer instant messaging, entertainment, content management and delivery, peer-to-peer email systems, distributed auction systems, among others. Applications may be "vertical" or they may be developed to interoperate with other distributed applications. One or more applications 154 may be provided as part of the peer-to-peer platform. For example, one embodiment of the peer-to-peer platform may include a shell application 160 as a development environment built on top of the platform. The shell application may provide interactive access to the peer-to-peer platform via a simple command line interface 162.

Applications may also include community applications 152 not provided by the peer-to-peer platform. These community applications 152 may be user-defined and may be provided, for example, to member peers in a peer group as a peer group application.

In one embodiment, the boundary between services and applications is not rigid. An application to one customer can be viewed as a service to another customer. An application may use services. Services may serve as protocols that may be shared among various applications. An application may provide a user interface, a way to define a set of files to share, a way to initiate a search, a way to display the results, and a way to initiate a file transfer, for example. Such an application may make use of a set of services, for example a reliable point-to-point file transfer service, a distributed search service, and a discovery service to locate other peers, among others.

Applications may be built using peer services as well as the core layer 120. The peer-to-peer platform may support the fundamental levels broadly, and rely on the P2P development community to provide additional peer services and applications. Peer applications enabled by both the core layer 120 and peer services layer 140 may include P2P auctions that link buyers and sellers directly, with buyers able to program their bidding strategies using a simple scripting language, for example. Resource-sharing applications, such as SETI@home, may be built more quickly and easily, with heterogeneous, worldwide peer groups supported from day one. Instant messaging, mail, and calendaring services may facilitate communication and collaboration within peer groups that are secure and independent of service provider-hosted facilities. Virtually any other type of application may be build on top of the core layer 120 and services layer 140.

Some features, such as security, may manifest in all three layers and throughout a P2P system, albeit in different forms according to the location in the software architecture. The system may be modular, and may allow developers to pick and choose a collection of services and applications that suits their needs.

A typical peer-to-peer platform network may provide an inherently nondeterministic topology/response structure. In a peer-to-peer platform network, a specific resource request may not return for minutes, hours, or even days; in fact, it may never return at all. In addition, people from different parts of the world requesting the same resource are likely to get different copies of the resource from completely different locations. Peers may obtain content from multiple servers, ideally reaching a nearby one that is up and running. The original source peer need not service every resource request; in fact, it does not even have to be up and running. The nondeterministic structure may also help provide the optimized use of network bandwidth. The concentrated localized traffic congestion typical of today's Web doesn't affect P2P networking. The nondeterministic structure may also help provide a lowered cost of content distribution. The P2P network can absorb contents and replicate it for easy access. The nondeterministic structure may also help provide leveraged computing power from every node in the network. With asynchronous operations, a user may issue many requests for many resources or services simultaneously and have the network do the work. The nondeterministic structure may also help provide unlimited scalability. A properly designed P2P application may span the entire known connected universe without hitting scalability limits; this is typically not possible with centralized schemes. Note, however, that the peer-to-peer platform also may support deterministic, synchronous applications.

The peer-to-peer platform provides the ability to replicate information toward end users. Popular content tends to be replicated more often, making it easier to find as more copies are available. Peers do not have to always go back to the same peer to obtain the information they want, as is typical in the client/server model. Peers may obtain information from neighboring peers that have already cached the information. Each peer may become a provider to all other peers.

In one embodiment the peer-to-peer platform may enable peers to find content that is closest to them. This content may include data (e.g. files) or even services and applications. For example, if a peer node in an office peer-to-peer network using the peer-to-peer platform is moved, the peer-to-peer platform may allow the peer to automatically locate content (e.g. using a discovery service that participates in the discovery protocol) including services (e.g. a printer service and an email service) hosted by other peers closest to the peer's new location, without requiring any manual reconfiguration. Further, at least some content may be copied or moved to the peer in its new location and/or to other peers proximate to the new location.

The peer-to-peer platform may provide a decentralized environment that minimizes single points of failure and is not dependent on any centralized services. Both centralized and decentralized services may be developed on top of the peer-to-peer platform. With the addition of each new network peer, the network platform may become more robust as it expands. In the environment, services may be implemented to interoperate with other services giving rise to new P2P applications. For example, a P2P communications service like instant messaging may easily be added to a resource-sharing P2P application if both support at least the necessary peer-to-peer platform protocols.

The peer-to-peer platform may provide interoperability. The peer-to-peer platform may be used by developers independent of preferred programming languages, development environments, or deployment platforms. Embodiments of the peer-to-peer platform may enable interconnected peers to easily locate each other, communicate with each other, participate in community-based activities, and offer services to each other seamlessly across different P2P systems and different communities. The peer-to-peer platform may also provide platform independence. Embodiments of the peer-to-peer platform may be independent of programming languages (such as C/C++, Java, Perl, and KVM), system platforms (such as the Microsoft Windows, UNIX®, Solaris, Linux and Macintosh platforms), and networking platforms (such as TCP/IP, Bluetooth and Havi). Thus, heterogeneous devices with completely different software stacks may interoperate through the peer-to-peer platform protocols. Embodiments of the peer-to-peer platform may be implementable on any device with a digital heartbeat, including, but not limited to, sensors, consumer electronics, Personal Digital Assistants (PDAs), appliances, network routers, desktop computers, data-center servers, and storage systems. Embodiments of the peer-to-peer platform may enable peers, independent of software and hardware platform, to benefit and profit from being connected to millions of other peers.

In one embodiment, the peer-to-peer platform may run on any of various operating systems including embedded operating systems (with the appropriate level of Java runtime support, if required) such as Windows95, 98, 2000, ME, and NT, Solaris, Unix, Macintosh, Linux, Java 2 Platform, Micro Edition (J2ME) and PersonalJava Technology. The peer-to-peer platform may be implemented in any of a variety of development environments using any of a variety of programming languages, or combinations of programming languages, including, but not limited to, Java, Java 2ME, C/C++, Perl, Python and KVM. In one embodiment, the peer-to-peer platform may be implemented in Java. In one embodiment, a peer-to-peer platform may be implemented in C/C++ on some devices, for example, to support devices without Java support. In one embodiment, a peer-to-peer platform may be implemented in KVM on some devices, for example, so that all KVM capable devices such as PDAs and cell phones can be peer-to-peer platform peers. Programming languages other than those listed may also be used in various embodiments.

A minimal device with the ability to generate a text string may theoretically participate in a peer-to-peer platform network (though not necessarily in every P2P application). The simplistic device may need a surrogate peer on the P2P network. This surrogate peer may perform discovery, advertisement, and communications on behalf of the simplistic device (or many simplistic devices). The location of the surrogate may be hard-wired into the simplistic device. In this way, the simplistic device with the help of the surrogate can be a full-fledged peer on the peer-to-peer platform network. For example, a GPS locator, strapped to a sea turtle and sending out peer-to-peer platform messages wirelessly with location information, may become a peer on a peer-to-peer platform network.

The peer-to-peer platform may be independent of transport protocols. For example, the peer-to-peer platform may be implemented on top of TCP/IP, HTTP, Bluetooth, Home- PNA, and other protocols. Thus, a system built on top of the peer-to-peer platform may function in the same or similar fashion when the system is expanded to a new networking environment or to a new class of devices, as long as there is a correct transport protocol handler for the new networking protocol.

In one embodiment, the peer-to-peer platform may use XML as the encoding format. XML may provide convenience in parsing and extensibility. Other embodiments of the peer-to-peer platform may use other encoding formats. The use of XML does not imply that all peer-to-peer platform peer nodes must be able to parse and to create XML documents. For example, a cell phone with limited resources may be programmed to recognize and to create certain canned XML messages and can still participate in a peer-to-peer platform network of peers. In one embodiment, a lightweight XML parser may be used that supports a subset of XML. This may help reduce the size of the peer-to-peer platform.

There may be areas in a peer-to-peer environment where there is not one correct way to do something or where what should be done depends on the nature and context of the overriding application. For example, in the area of security, every P2P application may choose a different authentication scheme, a different way to ensure communication security, a different encryption algorithm for data security, a different signature scheme for authenticity, and a different access control policy. Therefore, for these areas, the peer-to-peer platform may focus on mechanisms instead of policy, so that application developers can have the maximum freedom to innovate and offer competitive solutions.

Implementations of the peer-to-peer platform may be illustrated with a few application or usage scenarios. For example, assume there is a peer-to-peer community offering a search capability for its members, where one member can post a query and other members can hear and respond to the query. One member is a Napster user and has implemented a feature so that, whenever a query is received seeking an MP3 file, this member will look up the Napster directory and then respond to the query with information returned by the Napster system. Here, a member without any knowledge of Napster may benefit because another member implemented a bridge to connect their peer-to-peer system to Napster. The peer-to-peer platform may provide a platform bridge that may be used to connect the various peer-to-peer systems together.

In another example, one engineering group requires a sizable storage capability, but also with redundancy to protect data from sudden loss. Using the peer-to-peer platform, each group may buy a simple storage system without a mirroring feature, where the disks can then discover each other automatically, form a storage peer group, and offer mirroring facilities using their spare capacity.

As yet another example, many devices such as cell phones, pagers, wireless email devices, Personal Digital Assistants (PDAs), and Personal Computers (PCs) may carry directory and calendar information. Using the peer-to-peer platform, these devices may be able to interact with each other, without extra networking interfaces except those needed by the devices themselves, using the peer-to-peer platform as the common layer of communication and data exchange.

Peers

Network nodes (peers) of various kinds may join the peer-to-peer networking platform by implementing one or more of the platform's protocols. Each peer operates independently and asynchronously of any other peer, providing a degree of reliability and scalability not typically found in current distributed systems. Some peers may have more dependencies with other peers due to special relationships (e.g. gateways or routers). In one embodiment, a peer does not need to understand all of the protocols of the peer-to-peer platform. The peer can still perform at a reduced level if it does not support one or more of the protocols.

Peers may publish and provide network resources (e.g. CPU, storage and routing resources) that may be used by other peers. Peers typically interact with a small number of other peers (network neighbors or buddy peers). Peers that provide the same set of services tend to be inter-changeable. Thus, it may not matter which peers a peer interacts with. Generally, assumptions should not be made about peer reliability or connectivity, as a peer may appear or leave the network at any time. Peers may have persistent storage. A peer may optionally cache information.

Peers may have multiple network interfaces, though a peer may not need to publish all of its interfaces for use with the peer-to-peer protocols. Each published interface may be advertised as a peer endpoint. In one embodiment, a peer endpoint is an identifier (e.g. a URN or URI) that uniquely identifies a peer network interface. Peer endpoints may be used by peers to establish direct point-to-point connection between two peers. Peers may not have direct point-to-point network connection between themselves, either due to lack of physical network connections, or network configuration (NATs, firewalls, proxies, etc.), and thus a peer may have to use one or more intermediary peers to route a message from an endpoint to another peer endpoint.

Peers may be identified by their unique ID (UUID) rather than by a fixed address. When a peer boots, it attempts to contact other peers. In one embodiment, contacted peers may include variable-sized caches that map nearby peers' UUID to their current address. This allows embodiments of the peer-to-peer platform to be run over a dialup connection, for example.

In one embodiment, a peer may be assigned a unique string as a name. Any naming scheme may be used. In one embodiment, names are not unique unless a coordinated naming service is used to guarantee name uniqueness. A naming service is typically a centralized service that guarantees the uniqueness of name and can be used to register name mapping. Examples of naming services are DNS and LDAP. Use of a naming service may be optional.

Peer Groups

Figure 3:
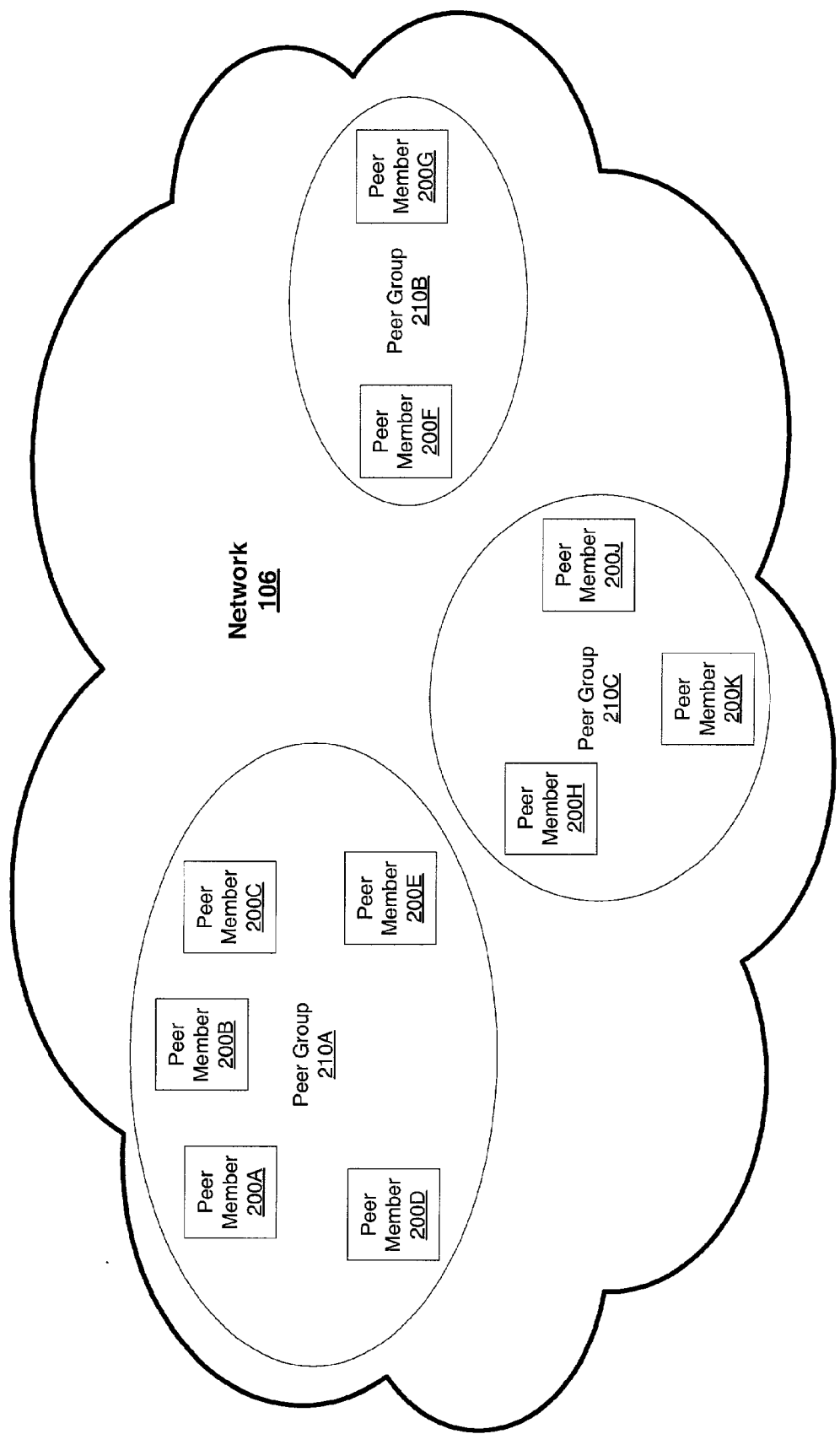
FIG. 3 illustrates an exemplary network with peer groups according to one embodiment.

FIG. 3 illustrates an exemplary network with peer groups according to one embodiment. Network 106 may include, but may not be limited to, the Internet, a corporate intranet, a dynamic proximity network, a home networking environment, LANs, and WANs supporting standards such as IP, Bluetooth, and Havi, among others. The peer groups may divide the network into virtual networks. For example, peer member 200F and peer member 200G are members of the same virtual network provided by peer group 210B. The peer groups may define limited domains of message and service availability thereby providing scope for communications and service access. For example, peer member 200H may broadcast a message over the virtual network provided by peer group 210C. This message may reach peer member 200J and peer member 200K, but may be restricted from reaching (or may be ignored by) peers in peer group 210A and 210B.

The peer-to-peer platform may describe how to create and discover peer groups, but does not dictate when, where, or why to create a peer group, the type of the group, or the membership of the group. A peer group may provide a common membership definition. Each peer group may establish its own membership policy in a range from open (any peer can join) up to highly secure and protected (a peer may join only if it possesses sufficient credentials).

In one embodiment, peers wishing to join a peer group may first locate a current member, and then request to join the peer group. The peer-to-peer platform may define how to discover peer groups, e.g. using a peer discovery protocol. The application to join may be rejected or accepted by the collective set of current members in accordance with the peer group's membership policy. In one embodiment, a peer group core membership service may be used to enforce a vote among one or more group members. Alternatively, one or more group representative member peers may be elected or appointed to accept or reject new membership applications.

In one embodiment, the peer-to-peer platform is not concerned with what sequence of events a peer or a peer group comes into existence. Moreover, in one embodiment, the peer-to-peer platform does not limit how many groups a peer can belong to. In one embodiment, nested and/or overlapping peer groups may be formed.

Figure 4:
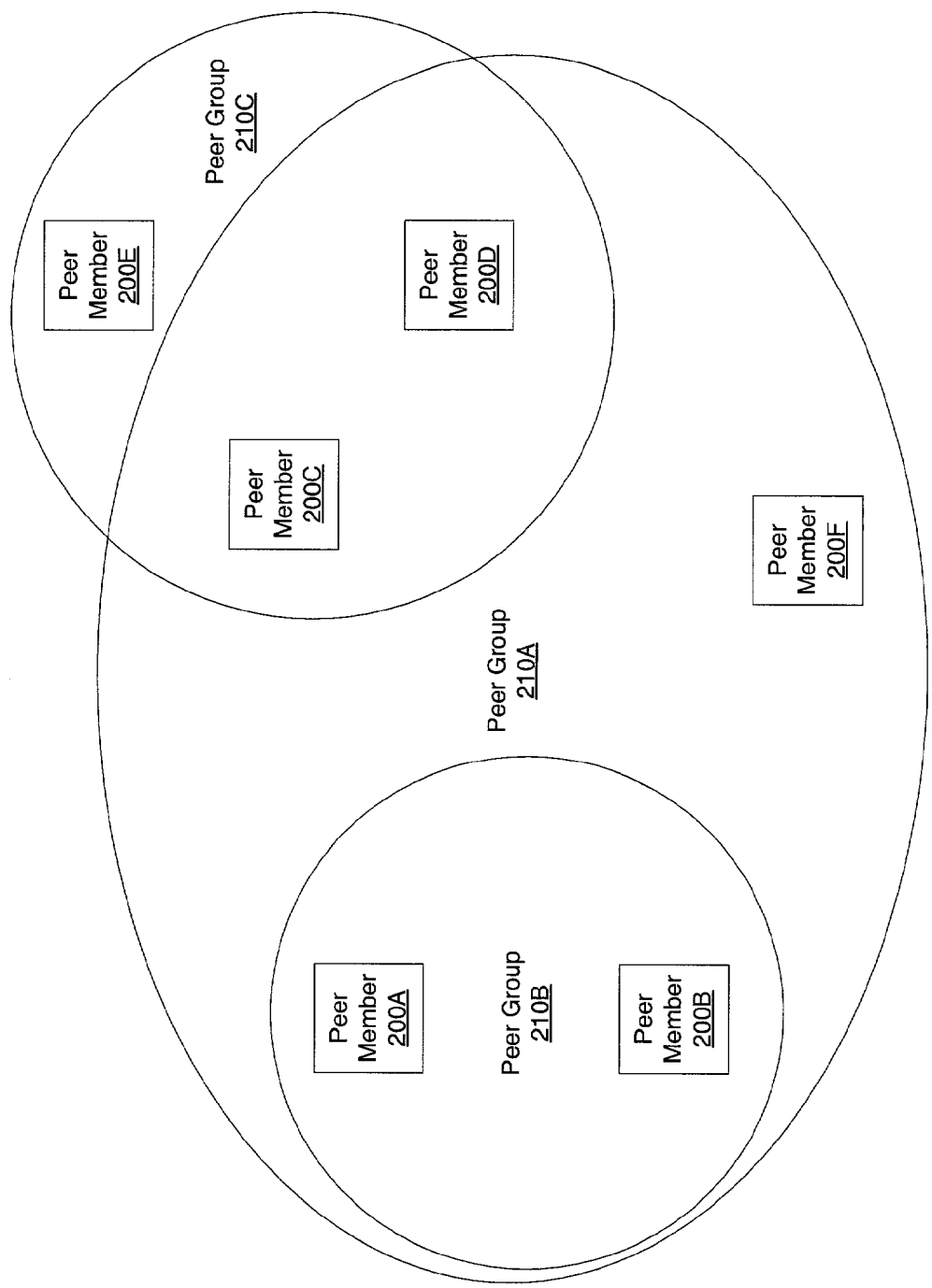
FIG. 4 illustrates nested peer groups and overlapping peer groups according to one embodiment.

FIG. 4 illustrates nested peer groups according to one embodiment. Peer group 210B may be nested within peer group 210A by virtue of all of peer group 210B's members, peer member 200A and peer member 200B, also being members of peer group 210A. Peer member 200A and peer member 200B may access services provided by both peer group 210A and peer group 210B, but peer member 200F may not have access to services provided by peer group 210B.

FIG. 4 further illustrates overlapping peer groups according one embodiment. Peer group 210A and peer group 210C may overlap by virtue of having peer member 200C and peer member 200D in common. Peer member 200C and peer member 200D may access services provided by peer group 210A and peer group 210C. Peer member 200E may access services provided by peer group 210C, but may not have access to services provided by peer group 210A. Likewise, peer member 200F of peer group 210A may not have access to services provided by peer group 210C.

In one embodiment, there may be a special group, called the World Peer Group, which may include all peer-to-peer platform peers. The world peer group may provide the minimum seed for every peer to potentially find each other and form new groups. In one embodiment, the world peer group has an open membership policy (e.g. has a null membership authenticator service). Some peers inside the world peer group may not be able to discover or communicate with each other—e.g., they may be separated by a network partition. In one embodiment, participation in the World Peer Group is by default.

The peer-to-peer platform may use the concept of a peer group as an implicit scope of all messages originated from within the group. Peer groups may serve to subdivide the network into abstract regions providing an implicit scoping mechanism. Peer groups may provide a limited scoping environment to ensure scalability. Peer groups may be formed and self organized based upon the mutual interest of peers. In one embodiment, no particular rules are imposed on the way peer groups are formed, but peers with the same interests may tend to join the same peer groups.

In one embodiment, a scope may be realized with the formation of a corresponding peer group. Peer group boundaries may define the search scope when searching for a group's content. For example, a peer in San Francisco looking to buy a used car is normally not interested in cars available outside of the Bay Area. In this case, the peer may want to multicast a message to a subset of the current worldwide peer group, and a subgroup may be formed especially for this purpose. In one embodiment, the multicast may be done without the formation of a new peer group. In one embodiment, all messages may carry a special scope field, which may indicate the scope for which the message is intended. Any peer who receives this message may propagate the message based on the scope indicator. Using this approach, a sending peer may be bootstrapped with some well-defined scopes, and additional scopes may be discovered.

Peer groups may also be formed based upon the proximity of the member peers. Proximity-based peer groups may serve to subdivide the network into abstract regions. Regions may serve as a placeholder for general communication and security configurations that deal with existing networking infrastructure, communication scopes and security requirements. Peer groups may provide a scoping mechanism to reduce traffic overload.

Peer groups may provide a secure cooperative environment. Peer group boundaries permit member peers to access and publish protected contents. Peer groups form virtual secure regions which boundaries limit access to the peer group resources. Secure services may be provided to peers within a secured peer group. Their boundaries may or may not reflect any underlying physical network boundaries such as those imposed by routers and firewalls. The concept of a region may virtualize the notion of routers and firewalls, subdividing the network into secure regions in a self-organizing fashion without respect to actual physical network boundaries.

Peer groups may also create a monitoring environment. Peer groups may permit peers to monitor a set of peers for any special purpose (heartbeat, traffic introspection, accountability, etc.). Peer groups may also provide a controlled and self-administered environment. Peer groups may provide a self-organized structure that is self-managed and that may be locally managed.

Peer groups using the peer-to-peer platform may provide several capabilities including, but not limited to, the ability to, find nearby peers, find named peers anywhere on the network, find named peer groups anywhere on the network, join and resign from a peer group, establish pipes between peer group members and find and exchange shared content.

Peers may be grouped into peer groups to share content. A content is published and shared among the peer members of a peer group. In one embodiment, content may be shared among group members, but not between groups. In this embodiment, no single item of content may belong to more than one group. If the same content is published in two different peer groups, two different contents may be created. In one embodiment, a content item may be published to make the item's existence known and available to group members using advertisements. A content may be any computer content (e.g. code, data, applications, active content such as services, or other collection of computer-representable resources). Examples of content include, but are not limited to, a text file, a structured document (e.g. a PDF or a XML file), a Java ".jar" or loadable library, code or even an executable process (checkpointed state).

Pipes

One embodiment may provide pipes as a mechanism for establishing communication between peers. Pipes may provide the primary channels for communication among peers. Pipes may be used as communication channels for sending and receiving messages between services or applications over peer endpoints. A pipe instance is, logically speaking, a resource within a peer group. The actual implementation of a pipe instance is typically through a pipe service. In one embodiment, at each endpoint, software to send, or receive, as well as to manage optional associated pipe message queues is assumed, but not mandated.

In one embodiment, pipes are a mechanism for interacting with services on the peer-to-peer network. Rather than assuming a specific naming system such as DNS or a specific network addressing system such as IP, the peer-to-peer platform may abstract these concepts via several mechanisms. Pipes provide a virtual abstraction of the network service using a pipe identifier that is bound to a peer identifier via a pipe advertisement, which in turn is bound to an endpoint address via a peer advertisement and an endpoint advertisement. Pipes can thus be moved from one peer to another providing flexibility in the way a service is deployed and consumed. The location of a machine (node) on the network is abstracted via the concept of the peer that binds to an endpoint. This provides support for dynamic movement of endpoint addresses for a specific peer.

In one embodiment, pipes may be implemented as a service on a peer. In one embodiment, in order for a peer to send a message to another peer's pipe, both peers must be part of the same peer group. This allows groups of peers to potentially implement different kinds of pipes, allowing for a flexible approach to communication.

In one embodiment, to connect to a pipe, a peer may send a discovery request for a pipe advertisement containing specific keywords. The peer may then receive the requested pipe advertisement. The peer may then send a pipe resolver request for a peer matching the pipe identifier and may then receive the peer advertisement, for example from a pipe service that handles the request. The peer may then send data down the pipe, for example using a URL addressing scheme.

Pipes in the peer-to-peer platform are preferably asynchronous, unidirectional, stateless and unreliable to provide the lowest overhead. Asynchronous pipes may enable developers to build large-scale interconnected distributed services and applications. Pipes are preferably unidirectional, and thus in one embodiment there are input pipes (sending end) and output pipes (receiving end). Pipes are preferably indiscriminate and may support binary code, data strings, Java technology-based objects, and/or applets, among others. The peer-to-peer platform preferably does not define how the internals of a pipe work. Any number of unicast and multicast protocols and algorithms, and combinations thereof, may be used on pipes.

Pipes may connect peers that have a direct physical link and peers that do not have a direct physical link. In the latter case, one or more intermediary peer endpoints may be used to route messages between two pipe endpoints. In one embodiment, a pipe may be a chain of sections, with each section of the chain using a different transport protocol.

Figure 5:
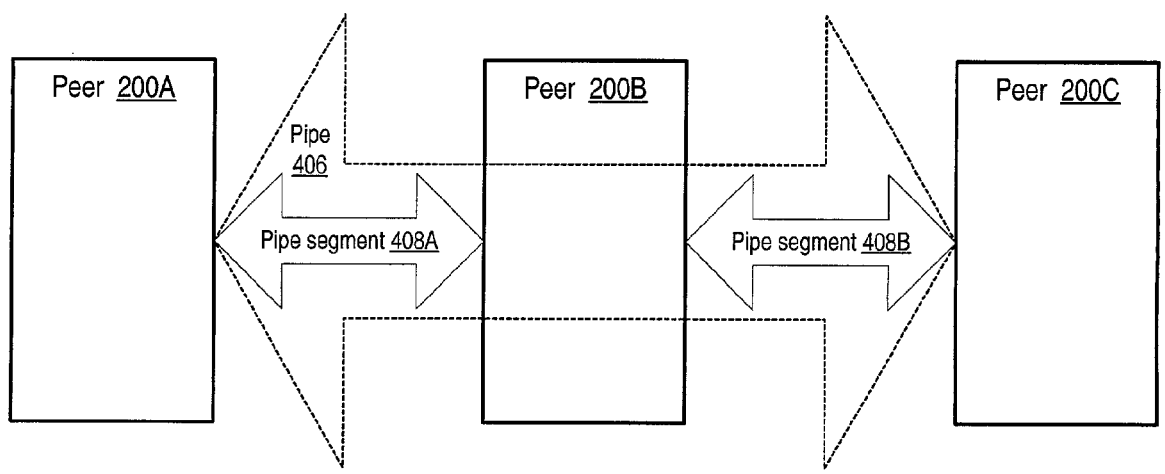
FIG. 5 illustrates a pipe between peer nodes passing through an intermediary peer node according to one embodiment.

FIG. 5 illustrates a pipe between peer nodes 200A and 200C passing through an intermediary peer node 200B according to one embodiment. Peers 200A and 200C may not have a direct physical link. Pipe segment 408A may be bound to an endpoint of peer 200A and to an endpoint of peer 200B. Pipe segment 408B may be bound to another endpoint of peer 200B and to an endpoint of peer 200C. In one embodiment, pipe segments 408A and 408B may use different network transport protocols. Thus, peer 200B may act as a relay for messages sent between peers 200A and 200C on pipe 406. There may be more than one intermediary peer node 200 between peer nodes 200A and 200C, and thus more than two pipe segments 408 in pipe 406.

The pipe endpoints may be referred to as input pipes (sending end) and output pipes (receiving end). Pipes may provide the illusion of a virtual in and out mailbox that is independent of any single peer location. Services and applications may communicate through pipes without knowing on which physical peer a pipe endpoint is bound. When a message is sent into a pipe, the message is sent to all peer endpoints currently connected (listening) to the pipe. The set of currently connected pipe endpoints (input pipes) may be obtained using the pipe binding protocol.

In one embodiment, enhanced pipes with additional properties such as reliability, security, and quality of service may be supported. In embodiments where the peer-to-peer platform runs on top of transports that have such properties, an implementation may optimize and utilize the transports. For example, when two peers communicate with each other and both have TCP/IP support, then an implementation may use the bidirectional capabilities of TCP/IP to create bidirectional pipes. Other data transfer methods that may be implemented by pipes as provided at the service layer to provide different quality of service include, but are not limited to: synchronous request-response (the endpoint sends a message, and receives a correlated answer), streaming (efficient control-flow data transfer) and bulk transfer (bulk reliable data transfer of binary data).

Figure 6:
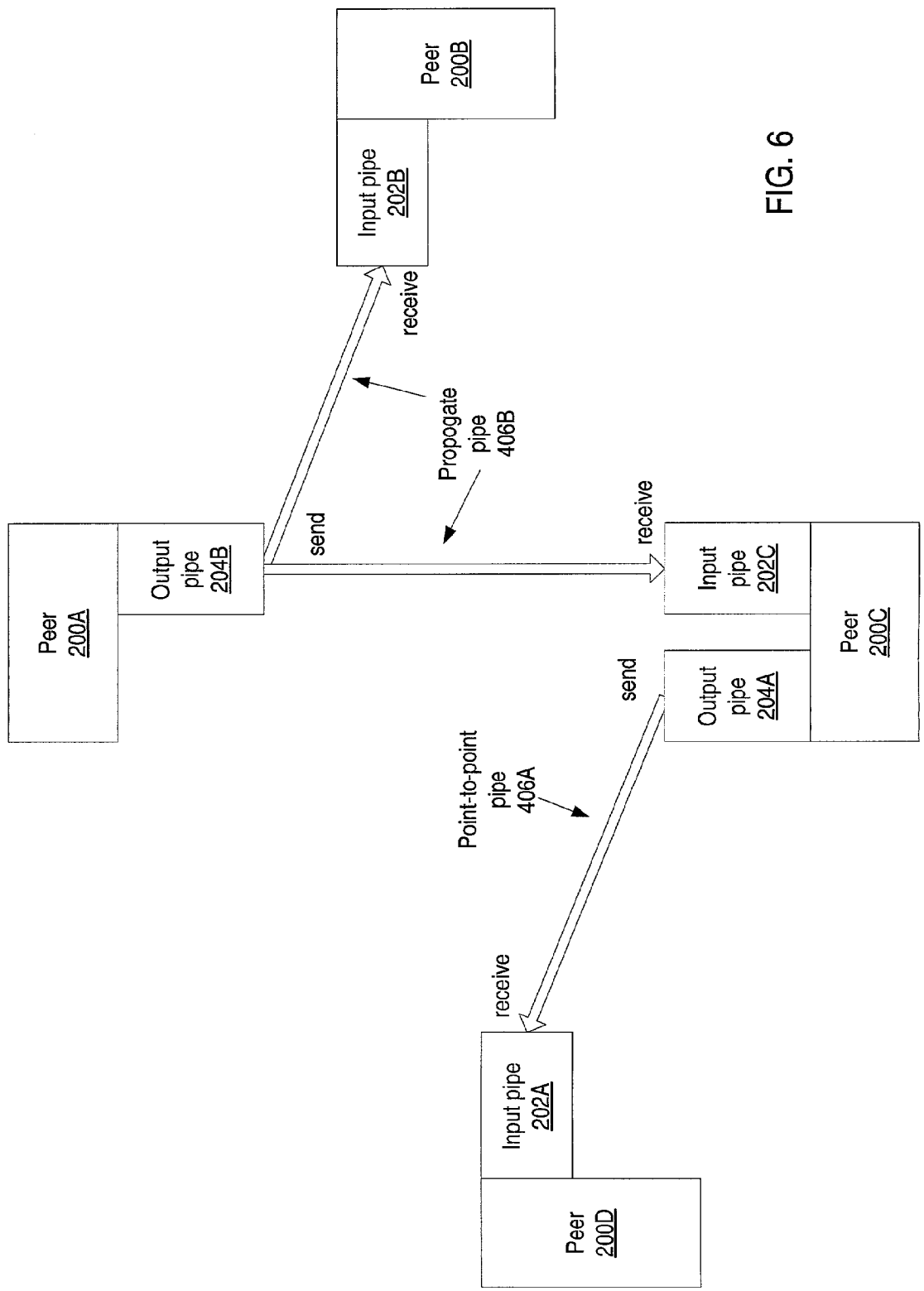
FIG. 6 illustrates a point-to-point pipe connection between peers according to one embodiment.

Pipes may offer several modes of communication. FIG. 6 illustrates a point-to-point pipe connection between peers 200C and 200D according to one embodiment. In one embodiment, a point-to-point pipe connects exactly two peer endpoints together, an input pipe 202A that receives messages sent from an output pipe 204A. The pipe appears as an input pipe to the sender and as an output pipe to the receiver, with traffic going in one direction only—from the input pipe of the sender to the output pipe of the receiver. In one embodiment, no reply or acknowledgement operation is supported. In one embodiment, additional information in the message payload (for example, a unique identifier) may be required to thread message sequences. The message payload may also contain a pipe advertisement that can be used to instantiate or open a pipe to reply to the sender (send/response).

FIG. 6 also illustrates a propagate pipe with peer 200A as a propagation source and peers 200B and 200C with listening input pipes according to one embodiment. A propagate pipe may connect two or more peer endpoints together, from one output pipe 204B to one or more input pipes (e.g. 202B and 202C). The result is that any message sent into the output pipe is sent to all input pipes. Messages flow into the input pipes from the output pipe (propagation source). A propagate message may be sent to all listening input pipes. This process may create multiple copies of the message to be sent. On transports that provide multicast (e.g. TCP/IP), when the propagate scope maps to underlying physical subnets in a one-to-one fashion, transport multicast be may used as an implementation for propagate. Propagate may be implemented using point-to-point communication on transports that do not provide multicast such as HTTP.

Figure 7:
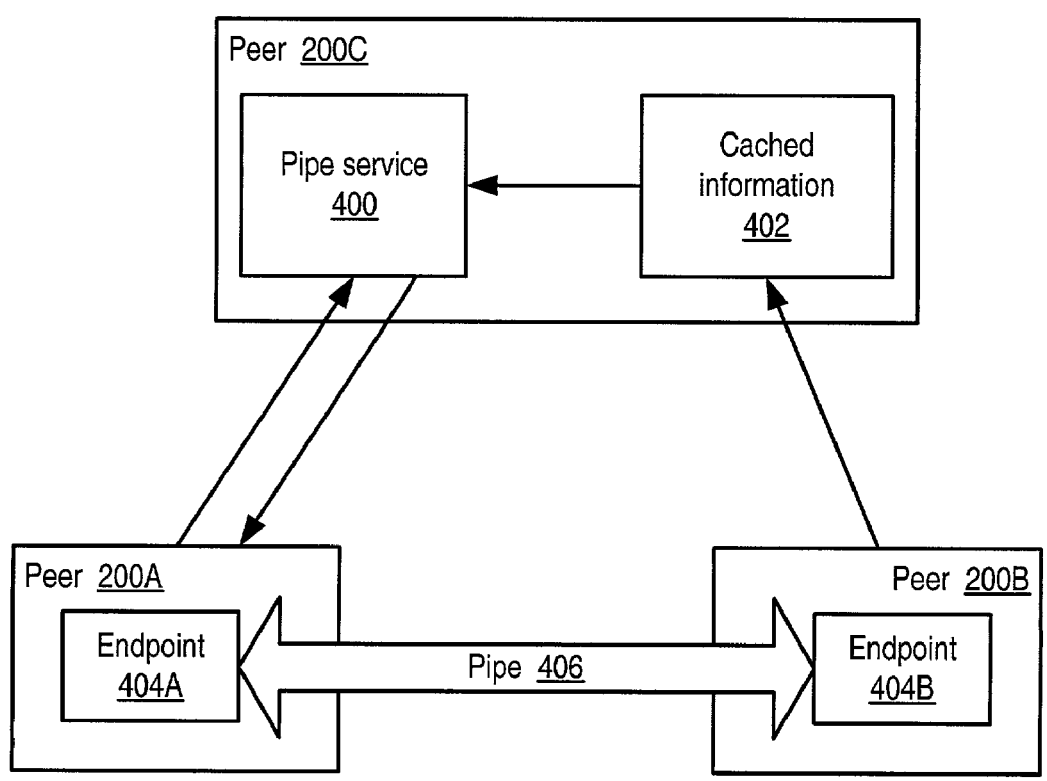
FIG. 7 illustrates a pipe service for creating and managing pipe connections among peers according to one embodiment.

FIG. 7 illustrates a pipe service that may manage and create pipe connections among peers according to one embodiment. Peers 200A, 200B and 200C may be member peers in a peer group. Peer 200C may host a pipe service 400 for use by peers 200 in the peer group. The pipe service 400 may discover or otherwise obtain information about pipes 406 in the peer group and may cache information about peer endpoints 404 currently bound to one or more pipes 406 in the peer group in a cache 402. The cached information 402 for each pipe may include, but is not limited to, a pipe identifier corresponding to the pipe, one or more peer identifiers corresponding to peers 200 with endpoints 404 currently bound to the pipe, and descriptive information about the endpoints 404. In one embodiment, the endpoints 404 described in the cached pipe information are input pipes for receiving messages and other data over the pipe 406. Note that, in one embodiment, the pipe service 400 may be hosted by any peer in the peer group, including peer nodes 200A and 200C.

Peer 200A may get a pipe advertisement for pipe 406. For example, the pipe advertisement may be discovered by the peer 200A through a discovery mechanism as described elsewhere in this document. Alternatively, the pipe advertisement may be included in an advertisement for a different type of peer resource (e.g. a peer advertisement, service advertisement, or peer group advertisement) discovered by the peer 200A. The pipe advertisement may include, but is not limited to, the pipe name, the pipe identifier, and the pipe type (e.g. reliable, unreliable, or secure).

Peer 200A may include one or more network interfaces each supporting one or more network transport protocols. Peer 200A may implement one or more endpoints 404 each corresponding to one of the network interfaces. Peer 200A may bind a particular endpoint 404A that corresponds to a network transport protocol compatible with the pipe 406 to the pipe 406. Peer 200A may then communicate with pipe service 400 on peer 200C to locate endpoints 404 bound to pipe 406. In one embodiment, peer 200A may broadcast a query message requesting information on endpoints 404 bound to pipe 406 in accordance with a pipe binding protocol. In one embodiment, the query message may specify a particular peer node (e.g. peer node 200C) to respond to the request. In one embodiment, the query message may specify a particular peer 200 (e.g. peer 200B) that peer 200A is interested in locating endpoints 404 for. In one embodiment, the query message may include the pipe advertisement. The query message may also indicate if the information about the pipe 406 is to be retrieved from the cached information 402 or, to insure the information is up-to-date, discovered by the peer service 400.

The peer service 400 may then resolve the query by locating the requested information. If the query message indicates that the information about pipe 406 may be retrieved from cached information 402 and the cached information 402 include the information about pipe 406, the peer service 400 may locate and retrieve the information from the cached information 402. Otherwise, the peer service 400 may discover the information on the network, for example by using a discovery mechanism as described elsewhere in this document. Cached information 402 may be updated with the newly discovered information for pipe 406. The peer service 400 may then send a query response message to peer 200A. In one embodiment, the query response message may include, but is not limited to a pipe identifier for pipe 406, one or more peer identifiers (e.g. a URI or URN) where a corresponding endpoint 404 is bound to the pipe 406, and an indicator of whether an endpoint 404 exists on a specified peer 200. The identified endpoint(s) 404 may correspond to network interface(s) on the corresponding peer node(s) that support the particular network transport protocol used on pipe 406.

If pipe 406 is a unidirectional pipe, then endpoint 404A may be an output pipe on peer 200A for sending messages and endpoint 404B may be an input pipe on peer 200B for receiving messages. If pipe 406 is a point-to-point pipe, then peers 200A and 200B are the only peers 200 bound to the pipe 406, and messages may be sent from peer 200A to peer 200B (if pipe 406 is unidirectional) and vice versa (if pipe 406 is bidirectional). If pipe 406 is unidirectional, a second pipe connection may be established to provide bidirectional communications between the peer nodes 200 using a mechanism similar to that described above, if so desired. If pipe 406 is a propagate pipe, then one or more endpoints 404 on other peer nodes 200 may be bound to the pipe 406. On a point-to-point pipe, messages send from an output pipe are sent to all input pipes currently bound to the pipe. In one embodiment, endpoint 404B on peer 200B may be associated with a service or application hosted by peer 200B, and thus peer 200A may communicate with the service or application over pipe 406. Likewise, endpoint 404A on peer 200A may be associated with a service or application hosted by peer 200A, thus allowing the service or application on peer 200A to communicate with a service or application on peer 200B over pipe 406.

FIG. 8 is a flowchart illustrating a method for creating a connection between peers in a peer-to-peer networking environment according to one embodiment. In one embodiment, a first peer and a second peer may be member peers in a peer group. As indicated at 550, the first peer may implement a pipe. The peer may bind an endpoint to the pipe. In one embodiment, the peer may generate and publish a pipe advertisement for the pipe as indicated at 552. The endpoint may be associated with a service or application hosted by the first peer. The pipe advertisement may be included in a resource advertisement such as a peer advertisement for the first peer, peer group advertisements for one or more peer groups that the first peer is a member peer of, and/or a service or application advertisement for a service or application hosted by the first peer and which is associated with and accessible via the pipe endpoint. As indicated at 554, the second peer may discover or otherwise obtain the pipe advertisement; for example, the second peer may find the pipe advertisement in a resource advertisement discovered by the second peer. The second peer then may bind an endpoint of the second peer to the pipe advertisement as indicated at 556. The endpoint of the second peer node may be associated with a service or application hosted by the second peer node. Binding the pipe advertisement to the endpoint may include connecting the endpoint to the pipe, and also may include discovering one or more endpoints (e.g. input pipes) currently bound to the pipe, including the endpoint of the second node.

After binding to the pipe advertisement, the second peer may communicate with the first peer over the pipe as indicated at 558. Communicating over the pipe may include sending messages formatted in accordance with one or more peer-to-peer platform protocols over the pipe. In one embodiment, if the pipe is a unidirectional pipe, the endpoint of the second peer node may be an output pipe for sending messages, and the endpoint of the first peer node may be an input pipe. If the pipe is a bi-directional pipe, both endpoints may act as input pipes and output pipes. If the pipe is a propagate pipe, there may be one or more other endpoints bound to the pipe, and messages sent on the pipe from the output pipe may be received by all the endpoints currently bound to the pipe. If the endpoint of the first peer node is associated with a service or application hosted by the first peer node, the second peer node may use the pipe to access the service or application. If the endpoint of the second peer node is associated with a service or application hosted by the second peer node, then the service or application on the first peer node may use the pipe to communicate with the service or application on the first peer node.

FIG. 9 is a flowchart illustrating a method for creating a connection between peers in a peer-to-peer networking environment using a pipe service according to one embodiment. In one embodiment, a peer group may include two or more peers. As indicated at 520, at least one peer in the peer group may host a pipe service. The pipe service may cache information about one or more pipes, which may be considered resources in the peer group. As indicated at 522, a first peer in the peer group may implement and advertise a pipe. In one embodiment, the pipe may be bound to an endpoint of the first peer. The endpoint may be associated with a service or application hosted by the first peer, and the service or application may be accessible to other peers in the peer group over the pipe. The pipe service may get information about the pipe implemented by the first peer and cache the information. The information about the pipe may identify all endpoints bound to the pipe.

As indicated at 524, a second peer in the peer group may discover the advertised pipe. The second peer may discover the pipe advertisement, or alternatively may receive the pipe advertisement in a message received on the network or in an advertisement for a resource (e.g. the first peer, the peer group, or the service or application hosted by the first peer associated with the endpoint of the first peer). The second peer may then request information about the pipe as indicated at 526. In one embodiment, the second peer may send a query message formatted in accordance with a pipe binding protocol to the pipe service to discover information about the advertised pipe including endpoints bound to the pipe. The pipe service may then get the requested information as indicated at 528 and send the requested information, for example in a response message formatted in accordance with the pipe binding protocol, to the second peer as indicated at 530. The pipe service may attempt to locate the requested information in the cache. If the requested information is in the cache, the pipe service may send the cached information about the pipe to the second peer. If the requested information is not in the cache, or if the query message indicates that the cached information is not to be used, the pipe service may attempt to obtain the information on the network using a discovery method as described elsewhere in this document. The pipe service may cache the newly discovered information about the pipe in the cache, replacing information about the pipe that is already cached, if any.

The second peer may bind the pipe advertisement to an endpoint of the second peer as indicated at 532. In one embodiment, this binding may be done at any time after the second peer receives the pipe advertisement. After binding to the pipe and receiving information about one or more other endpoints bound to the pipe, the second peer may communicate with the other endpoints bound to the pipe over the pipe, including the endpoint of the first peer.

Services

Peers may cooperate and communicate to publish, discover and invoke network services. A service denotes a set of functions that a provider offers. In one embodiment, a peer-to-peer platform peer can offer a service by itself or in cooperation with other peers. In one embodiment, a peer may publicize a service by publishing a service advertisement for the service. Other peers may then discover the service using the peer discovery protocol (through the advertisement) and make use of it. A peer may publish as many services as it can provide.

In one embodiment, services may either be pre-installed into a peer or loaded from the network. The process of finding, downloading and installing a service from the network may include performing a search on the network for the service, retrieving the service, and then installing the service. Once a service is installed and activated, pipes may be used to communicate with the service. In one embodiment, peer-to-peer platform-enabled services may publish pipe advertisements as their main invocation mechanism. The service advertisement may specify one or more pipe advertisements that may be used by a peer to create output pipes to invoke the service. The service advertisement may also include a list of predetermined messages that may be sent by a peer to interact with the service. The service advertisement may describe all messages that a client may send or receive.

Several methods may be provided by various embodiments to publish a service. Services may be published before creating a new peer group by adding the service advertisement to the peer group advertisement. Services may also be published by adding the services in a separate peer service advertisement. The discovery service may also allow new advertisements to be added at runtime. The new advertisement will belong to a predefined peer group. Other methods of publishing services may be provided. Note that service advertisements may be placed in the peer group advertisement of any group. Since all peers belong to the global peer group, a peer may publish the service in the global peer group advertisement to make it available to any peer.

In one embodiment, services advertised in a peer group advertisement are instantiated for a peer when the peer joins the group. In one embodiment, all the services are instantiated. In another embodiment, none, one or more of the advertised services may be instantiated when the peer joins the peer group. Service advertisements in the peer group advertisement may include resolver, discovery, membership, peer information and pipe service advertisements. In one embodiment, services advertised in a peer group advertisement are loaded on the peer when the peer boots. In one embodiment, this automated loading is not mandatory but is part of the Java Binding. One embodiment may provide a mechanism to force a service in a peer group advertisement to be instantiated by a peer.

In one embodiment, when a peer boots, any services advertised in the peer advertisement are loaded. The peer advertisement corresponds to the platform advertisement. These services may include the minimal set of services to bootstrap the creation of new peers: discovery service, membership service, resolver service, peer information service and pipe service.

In one embodiment, when a peer switches from one peer group to another, the first group's services remain active. In one embodiment, a peer may call a stop method on the service application interface to stop an instance of a local service. A peer that is a member of one peer group that refers to a service may join a second peer group that also refers to the service while still a member of the first. Whether the service is instantiated once or twice may depend on the service implementation. Some service implementations may use a static instantiation that is done once. In this case, all groups share the same instance. Other service implementations are local to a peer group and are not aware of the state of any other peer groups on the same node.

In one embodiment, services may use a "time to live" indicator that defines when the service was created, and also may define the lifetime of the service. After its lifetime has expired, the stale service may be purged.

A service may be well defined and widely available so that a peer can use it directly. Other services may require special code in order to access the service. For example, the way to interface with the service provider may be encoded in a piece of software. In this case, it is preferable if a peer can locate an implementation that is suitable for the peer's specific runtime environment. In one embodiment, if multiple implementations of the same service are available, then peers hosted on Java runtimes can use Java programming language implementations while native peers to use native code implementations. In one embodiment, service implementations may be pre-installed into a peer node or loaded from the network. In one embodiment, once a service is installed and activated, pipes may be used to communicate with the service.

In one embodiment, each service may have a unique identifier. In one embodiment, a service may have a name that may include a canonical name string that may indicate the type and/or purpose of the service. A service may also provide optional information (e.g. a set of descriptive keywords) that further describes the service. The unique identifier, name and optional information may be stored within a service advertisement. The advertisement may also include other information needed to configure and instantiate a service.

In one embodiment, the peer-to-peer platform may recognize two levels of services, peer services and peer group services. A service that executes only on a single peer may be referred to as a peer service. A peer service is accessible only on the peer that is publishing the service. If that peer happens to fail, then service also fails. This level of service reliability may be acceptable for an embedded device, for example, providing a calendar and email client to a single user. Multiple instances of the service may be run on different peers, but each instance publishes its own advertisement. A service that is composed of a collection of cooperating instances (potentially cooperating with each other) of the service running on multiple peers in a peer group may be referred to as a peer group service. A peer group service may employ fault tolerance algorithms to provide the service at a higher level of availability than that a peer service can offer. If any one peer fails, the collective peer group service may not be affected, because the service may still be available from at least one other peer member. Peer group services may be published as part of the peer group advertisement.

In one embodiment, the peer-to-peer platform may include a set of default peer group services such as peer discovery, as well as a set of configurable services such as routing. In one embodiment, a peer-to-peer platform peer may not be required to have one or all of these services. For example, a cell phone peer may be pre-configured with enough information to contact a fixed server provided by the telecom operator. This may be enough to bootstrap the cell phone peer without requiring it to independently carry with it additional services.

In one embodiment, although the concept of a service is orthogonal to that of a peer and a peer group, a peer group formed using the peer-to-peer platform may require a minimum set of services needed to support the operation of the group. Some services may be well known and may be referred to as peer-to-peer platform core services. Embodiments of the peer-to-peer platform may define a set of core peer group services that may be used to form and support peer groups. In one embodiment, the core peer group services may provide the minimum services required to form a peer group (e.g. membership and discovery services). The peer-to-peer platform core services are preferably 100% decentralized and thus may enable pure peer-to-peer network computing. In one embodiment, it is not required that all core services be implemented by every peer group.

In one embodiment, the peer-to-peer platform may define peer group core services including, but not limited to, a discovery service, a membership service, an access service, a pipe service, a resolver service and a monitoring service. A discovery service may be used to search for peer group resources such as peers, peer groups, and pipes. The search criteria may include a resource name. Discovery and discovery services are described more fully later in this document.

In one embodiment, most peer groups will have at least a membership service. Current peer group members may use the membership service during the login process to reject or accept a new peer group membership application. The membership service may be a "null" authenticator service that imposes no real membership policy. Peers wishing to join a peer group first locate a current member, and then request to join. The application to join may be either rejected or accepted by the collective set of current members. The membership service may enforce a vote of peers or alternatively elect a designated group representative to accept or reject new membership applications.

An access service may be used to validate, distribute, and authenticate a group member's credentials. The access service may define the type of credential used in the message-based protocols used within the peer group. The access service may be used to validate requests made by one peer to another. The peer receiving the request provides the requesting peer's credentials and information about the request being made to the access service to determine if the access is permitted. In one embodiment, not all actions within the peer group need to be checked with the access service, only those actions which only some peers are permitted to use.

A pipe service may be used to establish and manage pipe connections between the different peer group members. A resolver service may be used to send query strings to peers to find information about a peer, a peer group, a service or a pipe. A monitoring service is used to allow one peer to monitor other members of the same peer group.

In on embodiment, not all the above services are required to be implemented by a peer group. Each service may implement one or more of the peer-to-peer platform protocols. A service preferably implements one protocol for simplicity and modularity reasons, but some services may not implement any protocols.

Other services may be user-defined and provide application dependent services such as content searching and indexing. A user-defined service may provide additional APIs. User-defined services may be implemented that may offer the ability to mix-in centralization as a means of increasing performance. In one embodiment, the peer-to-peer platform core services may provide a reference implementation for user-defined services. Examples of user defined services may include, but are not limited to:

Efficient long-distance peer lookup and rendezvous using a peer naming and discovery service.

Simple, low-cost information search and indexing using a content sharing service.

Interoperability with existing centralized networking infrastructure and security authorities in corporate, public, private, or university networks using administration services.

A resolver service may be implemented to find active (running on some peer) and inactive (not yet running) service instances.

An FTP service that allows file transfers among peers over pipes using FTP.

Advertisements

In one embodiment, the peer-to-peer protocols may use advertisements to describe and publish the existence of peer resources. An advertisement may be defined as a structured, language neutral metadata structure that names, describes, and publishes the existence of a peer-to-peer platform resource, such as a peer, a peer group, a pipe, or a service. Information exchanged between peers may include advertisement documents. The peer-to-peer platform may include advertisement documents to represent all of the peer-to-peer platform resources managed by the core platform, such as peers, peer groups, pipes and services. In one embodiment, the peer-to-peer platform may define core advertisement types including, but not limited to, one or more of peer advertisements, peer group advertisements, pipe advertisements, service advertisements, content advertisements, and endpoint advertisements. In one embodiment, user-defined advertisement subtypes (for example, using XML schemas) may be formed from these basic types.

In one embodiment, a pipe advertisement may be used to describe an instance of a pipe communication channel. A pipe advertisement may be used by a pipe service to create associated input and output pipe endpoints. In one embodiment, a pipe advertisement document may be published and obtained either by using a discovery service (e.g. the core discovery service) or by embedding it within other advertisements such as the peer or peer group advertisement. Each pipe advertisement may include an optional symbolic name that names the pipe and a pipe type to indicate the type of the pipe (point-to-point, propagate, secure, etc).

Embodiments of a pipe advertisement may include, but are not limited to, the following fields:
  Name: an optional name that may be associated with a pipe. In one embodiment, the name is not required to be unique unless the name is obtained from a centralized naming service that guarantee name uniqueness.
  Pipe identifier: uniquely identifies the pipe. In one embodiment, this is a required element. Each pipe has a unique id.
  Type: An optional pipe type that may be provided to specify the quality of services implemented by the pipe. Pipe types may include, but are not limited to:
    RELIABLE (guaranteed delivery and ordering, and deliver only once)
    UNRELIABLE (may not arrive at the destination, may be delivered more than once to the same destination, may arrive in different order)
    SECURE (reliable and encrypted transfer)

In one embodiment, a service advertisement may be used to describe a peer-to-peer platform-enabled service. Service advertisements may describe how to activate and/or use the service. In one embodiment, a peer-to-peer platform-enabled service is a service that uses pipes as primary invocation mechanism. To invoke the service, a peer may a message to the associated service pipe. In one embodiment, the core peer group services that each peer group preferably implements in order to respond to the messages described for the peer-to-peer platform protocols are peer-to-peer platform-enabled services and thus may be published using service advertisements. The service advertisement document may be published and obtained using the peer information protocol for peer services, or alternatively using the peer group discovery protocol for peer group services.

In one embodiment, a pipe advertisement and access method fields may provide a placeholder for any kind of service invocation schema that defines the valid set of XML messages accepted by the service and the associated message flow. Thus, the peer-to-peer platform protocols may be agnostic of service invocation and interoperate with any existing framework. A service advertisement access method field may refer to a WSDL (e.g. www.w3.org/TR/wsdl), ebXML (e.g. www.ebxml.org), UPnP (e.g. www.upnp.org) or a client-proxy schema, among others. For example, a WSDL access method may define messages that are abstract descriptions of the data being exchanged and the collections of operations supported by the service using a WSDL schema. In one embodiment, a service advertisement may include multiple access method tags, as there may be multiple ways to invoke a service. Thus, the peer may ultimately decide which invocation mechanism to use. For example, small devices may want to use a small-footprint mechanism or a service framework they already have the code for, and larger devices may decide to download a client-proxy code.

In one embodiment, the access method for services is a schema of valid XML messages accepted by the service. In one embodiment, a service advertisement may contain a URL or URI tag to point to a jar file, DLL, or loadable library. A peer may use this to download the code to run the service, for example if the peer joins the peer group and does not have the required code to run the service.

In one embodiment, once a service advertisement is sent out into the world there is no method of pulling it back in. However, each individual peer may have the ability to purge the set of cached advertisements that reside locally, and a rendezvous peer may purge its cache periodically (e.g. daily).

Embodiments of a service advertisement may include, but are not limited to, the following fields:
  Name: an optional name that may be associated with a service. In one embodiment, the name is not required to be unique unless the name is obtained from a centralized naming service that guarantees name uniqueness.
  Keywords: an optional string that may be used to index and search for a service. In one embodiment, the string is not guaranteed to be unique. Two services may have the same keywords.
  Service identifier: uniquely identifies a service. In one embodiment, each service has a unique id. In one embodiment, this element may be required.
  Version: specifies the service version number. In one embodiment, this element may be required.
  Provider: gives information about the provider of the service. This will typically be a vendor name. In one embodiment, this element may be required.
  Pipe: an optional element that specifies a pipe advertisement to be used to create an output pipe to connect to the service. In one embodiment, services are not required to use pipes.
  Parameters: a list of configuration parameters available to the peer when invoking the service. In one embodiment, the parameter field is optional. Parameters may be defined as a list of strings.
  URI (Universal Resource Indicator): This optional parameter may be used to specify the location of where the code for the service may be found.
  Access Methods: In one embodiment, at least one access method is required to specify how to invoke the service. Multiple access method tags may be used when multiple access methods are available. The access method tag allows any kind of service invocation representation to be specified. For example, the access method may be a placeholder for a WSDL or uPnP document that describes a web service access method.

Peer-to-Peer Platform Protocols

The peer-to-peer platform protocols may provide and support ad hoc, pervasive, and multi-hop peer-to-peer (P2P) network computing. Using the protocols, peers may cooperate to form self-organized and self-configured peer groups independently of their positions in the network (e.g. edges, firewalls), and without the need of a centralized management infrastructure. The peer-to-peer platform protocols may have very low overhead, make few assumptions about the underlying network transport and limited requirements of the peer environment, and may be used to deploy a wide variety of P2P applications and services in a highly unreliable and changing network environment.

In one embodiment, the peer-to-peer platform may include core protocols including, but not limited to, a peer membership protocol, a peer discovery protocol, a peer resolver protocol, a peer information protocol, a pipe binding protocol, and a peer endpoint protocol. These protocols may be implemented using a common messaging layer. This messaging layer binds the protocols to various network transports. In one embodiment, the peer-to-peer platform protocols may be specified as a set of markup language (e.g. XML) messages exchanged between peers. Each software platform binding describes how a message is converted to and from a native data structures such as a Java object or 'C' structure. In one embodiment, the use of markup language messages to define protocols allows many different kinds of peers to participate in a protocol. Each peer is free to implement the protocol in a manner best suited to its abilities and role. Peer-to-peer platform messages are described previously in this document.

In one embodiment, each of the protocols is independent of the others. A peer may not be required to implement all of the networking protocols. A peer may implement only the protocol that it requires. For example, a device may have all the advertisements it uses pre-stored in memory, so that peer does not need to implement the Peer Discovery Protocol. As another example, a peer may use a pre-configured set of peer routers to route all its messages, hence the peer does not need to implement the Peer Endpoint protocol. Instead, the peer sends messages to the routers to be forwarded. As yet another example, a peer may not need to obtain or wish to provide status information to other peers, hence the peer does not to implement the peer information protocol. The same can be said about all of the other protocols. In one embodiment, a peer may implement only a portion (client-side or server-side only, for example) of a protocol.

Peers may use the peer-to-peer platform protocols to advertise their resources and to discover network resources (services, pipes, etc.) available from other peers. Peers may form and join peer groups to create special relationships. The peer-to-peer platform protocols may allow peers to communicate without needing to understand or manage the potentially complex and dynamic network topologies that are becoming common. Peers may cooperate to route messages allowing for full peer connectivity. The peer-to-peer platform protocols allow peers to dynamically route messages across multiple network hops to any destination in the network (potentially traversing firewalls). Each message may include either a complete or a partial ordered list of gateway peers through which the message might be routed.

If route information is incorrect, an intermediate peer may assist in dynamically finding a new route. A peer-to-peer platform protocol message that is routed through multiple hops may not be assumed to be reliably delivered, even if only reliable transports such as TCP/IP are used through all hops. A congested peer may drop messages at any time rather than routing them.

The peer-to-peer platform protocols may be implemented on a variety of networks including, but not limited to, the Internet, corporate intranets, dynamic proximity networks, home networking environments, LANs and WANs. The peer-to-peer platform protocols may allow the peer-to-peer platform to be easily implemented on unidirectional links and asymmetric transports. In particular, many forms of wireless networking do not provide equal capability for devices to send and receive. The peer-to-peer platform permits any unidirectional link to be used when necessary, improving overall performance and network connectivity in the system. Thus, the peer-to-peer platform protocols may be easy to implement on any transport. Implementations on reliable and bidirectional transports such as TCP/IP or HTTP may provide efficient bidirectional communications. Even on bidirectional transports, communication ability between any pair of peers may at times not work equally well in both directions. That is, communications between two peers will in many cases be able to operate bidirectionally, but at times the connection between two peers may be only unidirectional, allowing one peer to successfully send messages to the other while no communication is possible in the reverse direction. The peer-to-peer platform unidirectional and asymmetric transport also plays well in multi-hop network environments where the message latency may be difficult to predict. Furthermore, peers in a P2P network tend to have nondeterministic behaviors and thus may appear or leave the network very frequently.

In one embodiment, the peer-to-peer platform protocols do not require a broadcast or multicast capability of the underlying network transport. Messages intended for receipt by multiple peers (propagation) may be implemented using point-to-point communications. The peer-to-peer platform protocols may not require periodic messages of any kind at any level to be sent within the network, and thus may not require periodic polling, link status sensing, or neighbor detection messages, and may not rely on these functions from any underlying network transport in the network. This entirely on-demand behavior of the protocols and lack of periodic activity may allow the number of overhead messages generated by the peer-to-peer platform to scale all the way down to near or at zero, when all peers are stationary with respect to each other and all routes needed for current communication have already been discovered.

In one embodiment, the peer-to-peer platform protocols are defined as idempotent protocol exchanges. The same messages may be sent/received more than once during the course of a protocol exchange. In one embodiment, no protocol states are required to be maintained at both ends. Due to the unpredictability of P2P networks, assumptions may not be made about the time required for a message to reach a destination peer, and thus the peer-to-peer platform protocols may not impose any timing requirements for message receipt.

The peer-to-peer platform protocols may take advantage of additional optimizations, such as the easy ability to reverse a source route to obtain a route back to the origin of the original route.

Figure 10:
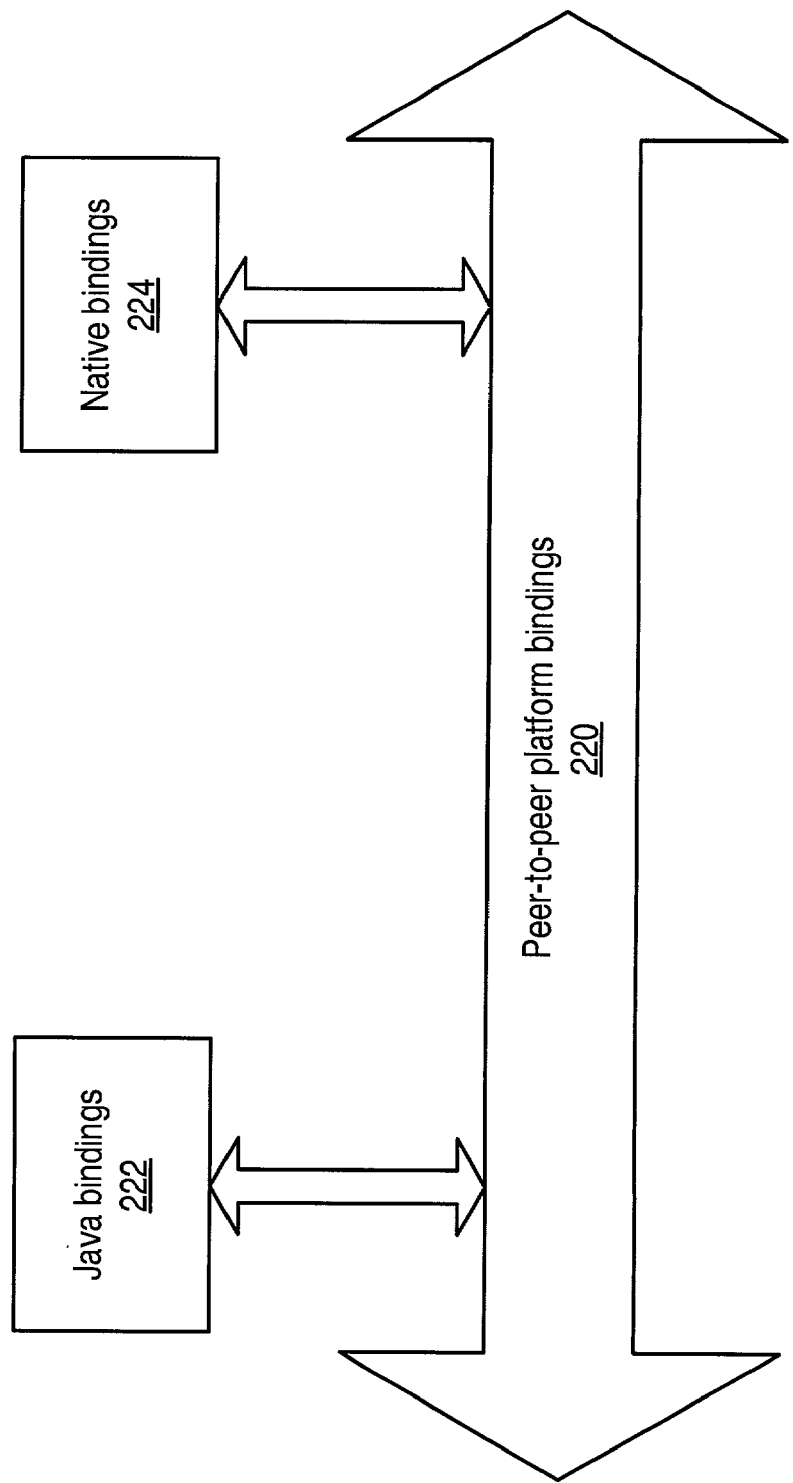
FIG. 10 illustrates protocols and bindings in a peer-to-peer platform according to one embodiment.

FIG. 10 illustrates protocols and bindings in a peer-to-peer platform according to one embodiment. When the peer-to-peer platform protocols are implemented using a particular programming language and over a particular transport protocol, the implementation is an instance of a peer-to-peer platform binding 220, where the peer-to-peer platform protocols are bound to the language and the transport layer. In one embodiment, protocol and peer software implementation issues may be defined in documents specific to the binding. A binding document describes how the protocols are bound to an underlying network transport (such as TCP/IP or UDP/IP) or to a software platform 222 such as Java or a native software platform 224 such as UNIX.

Peer Discovery Protocol

In one embodiment, the peer-to-peer platform may include a peer discovery protocol that may allow a peer to find advertisements on other peers. The peer discovery protocol may be used to discover any published peer resources including other peers, peer groups, pipes, services and any other resource that has an advertisement in the peer-to-peer network. This protocol may be used to find members of any kind of peer group, presumably to request membership. In one embodiment, the peer discovery protocol is the default discovery protocol for all peer groups, including the world peer group. The discovery protocol may be used as a default discovery protocol that allows all peer-to-peer platform peers to understand each other at a very basic level.

The peer discovery protocol may provide, at the lowest level, the minimum building blocks for propagating discovery requests between peers. Thus, the peer discovery protocol may provide the essential discovery infrastructure for building high-level discovery services. In many situations, discovery information is better known by a high-level service, because the service may have a better knowledge of the topology (firewall traversal), and the connectivity between peers. The peer discovery protocol may provide a basic mechanism to discover advertisements while providing hooks so high-level services and applications can participate in the discovery process. Services may be able to give hints to improve discovery (i.e. decide which advertisements are the most valuable to cache).

In one embodiment, the peer discovery protocol may be based on web crawling and the use of rendezvous peers. Rendezvous peers are peers that offer to cache advertisements to help others peers discover resources, and propagate requests they cannot answer to other known rendezvous peers. Rendezvous peers and their use in the discovery process are discussed later in this document.

In one embodiment, custom discovery services may choose to leverage the peer discovery protocol. If a peer group does not have its own discovery service, the peer discovery protocol may be used to probe peers for advertisements. Rendezvous peers may keep a list of known peers and peer groups. This list may or may not be exhaustive or timely. A custom discovery service (if it knew that the region's rendezvous did keep a timely exhaustive list), for example, may discover all peers in the region by sending a single message to the rendezvous peer.

In one embodiment, peer discovery may be done with, or alternatively without, specifying a name for the peer to be located and/or the group to which peers belong. When no name is specified, all discovered advertisements of the requested type may be returned. If a probing peer provides the name of the peer to be located, a simple translation may be requested that returns that peer's advertisement. Once a peer is discovered, ping, status, and capability messages may be sent to its "main" endpoint(s) using a peer information protocol. Peers may export more than one endpoint. Each peer may designate at least one primary endpoint to handle the low-level housekeeping protocols such as the peer discovery protocol and the peer information protocol.

In one embodiment, the peer discovery protocol may be used to probe network peer groups looking for peers that belong to specified peer groups. This process may be referred to as screening. Peers may be screened for membership by presenting each candidate member with a peer group name (string matched with the peer group advertisement canonical name). In one embodiment, peers claiming to belong to this group may respond, while other peers do not respond. The peer discovery protocol may be used to discover any type of core advertisement including, but not limited to: peer advertisements, peer group advertisements, pipe advertisements and service advertisements.

Peer groups may need customizable and adaptable discovery policies. In one embodiment, the peer-to-peer platform may be policy-agnostic, and may only provide the basics for discovery. The basics may include one or more core discovery protocols including, but not limited to, a propagate protocol (broadcast within a scope range (subnet or peer group members)), a rendezvous protocol (unicast to a trusted discovery peer) and an invite protocol (reverse discovering).

A discovery policy may be implemented in a discovery service based on the core discovery protocol. In one embodiment, a discovery service in the core peer-to-peer platform may be used to discover abstractions and/or entities in the peer-to-peer network including, but not limited to, peers, peer groups, peer group policies (group defined services) and pipe endpoints.

In some embodiments of a peer-to-peer platform, the discovery service may rely on trusted peers (discovery proxies). The discovery service may leverage local neighbors (local propagate). The discovery service may use rendezvous peers (indexes). The discovery service may leave traces in discovery proxies (cache). The discovery service may use net crawling as a last resort (propagate between trusted discovery proxies). In one embodiment, a discovery service may not discover some entities in the peer-to-peer network including, but not limited to, content (large scale; in one embodiment, a content management service may be used for content discovery), metadata (maintain relationship between data), users, and applications.

Embodiments of a peer-to-peer platform discovery service may leverage surrounding peers and peer groups, provide meetings points for far away peers and groups, use an asynchronous protocol and provide reverse discovery. The discovery service may be used to find new neighbor peers and provide the ability for a peer to learn about other peer's abilities. Embodiments of a discovery service in the peer-to-peer platform may provide extensibility, spontaneous configuration, adaptive connectivity, a dynamic (i.e. no fixed) network topology, and the ability to reach the "edge of the Internet" (firewall, and NAT).

Embodiments of a discovery method in the peer-to-peer platform may not require centralized naming (e.g. no DNS). A discovery service may provide predefined meeting points that may be used in platform bootstrapping. The discovery service may support a dynamic environment (peers may come and go). The discovery service may support an unreliable environment (peers may fail). The discovery service may help to adapt to a changing environment through viral behavior. The discovery service may be used to improve performance as a system ages (increase locality). The discovery service may be used in support of security (change of physical location). The discovery service may be used that provides administrationless discovery (zero-admin).

Embodiments of the peer-to-peer platform discovery service may allow a peer to learn about other peers that discover it. In one embodiment, the peer-to-peer platform discovery service may provide application-managed rendezvous. In one embodiment of the peer-to-peer platform, a peer discovery protocol may support a discovery query message and a discovery response message to be used in the peer discovery process.

Peer groups need customizable and adaptable discovery policies. One approach to implementing a discovery policy is to start simple and build policies that are more complex. Embodiments of the peer-to-peer platform discovery service may support discovery methods including, but not limited to: Propagate Discovery (unicast to predefined rendezvous; leverage transport dependent multicast (e.g. IP)) and; Unicast Discovery (unicast to known rendezvous for forward propagation; may be used for reverse Discovery).

The peer-to-peer platform may not mandate exactly how discovery is done. Discovery may be completely decentralized, completely centralized, or a hybrid of the two. Embodiments of the peer-to-peer platform may support discovery mechanisms including, but not limited to:

LAN-based discovery. This is done via a local broadcast over the subset.
  Discovery through invitation. If a peer receives an invitation (either in-band or out-of-band), the peer information contained in the invitation may be used to discover a (perhaps remote) peer.
  Cascaded discovery. If a peer discovers a second peer, the first peer may, with the permission of the second peer, view the horizon of the second peer to discover new peers, groups, and services.
  Discovery via rendezvous peers. A rendezvous peer is a special peer that keeps information about the peers it knows about. A peer that can communicate via a rendezvous peer, for example via a peer-to-peer protocol pipe, may learn of the existence of other peers. Rendezvous points may be helpful to an isolated peer by quickly seeding it with lots of information. In one embodiment, a web site or its equivalent may provide information of well-known peer-to-peer protocol rendezvous points.

In one embodiment, a peer-to-peer platform web of trust may be used. In a web of trust, a peer group creator may select initial discovery proxies, and may delegate to new peer members. Any peer, when trusted, can become a discovery proxy. Discovery proxies may propagate requests between each other for net-crawling discovery. New peers may be untrusted or low-trust peers, and may be typically difficult to find and have limited discovery range (this may help protect against misbehaviors and denial of service attacks). Trusted members are easier to discover. Peers may increase their discovery range as they become more trusted (discovery credential). Some peers may not need to discover beyond their initial net peer group range.

In one embodiment, a peer may go through a proximity network, which also may be referred to as a subnet or region, to try to find (discover) surrounding peers. The Internet includes the concept of subnets that are physically defined by physical routers that define regions in which computer systems are connected to one another. Within one of these regions, the peer-to-peer protocol uses multicast or other propagate mechanism to find peers. In one embodiment, a propagate discovery mechanism may be provided where one peer can propagate a discovery request through a local subnet. Peers that are in the subnet may respond to the discovery request. The propagate discovery mechanism may provide primarily close range discovery. In one embodiment, only peers that are in the same physical subnet (region) may respond. "Propagate" is at the conceptual level. Multicast is implemented by TCP/IP to provide propagate capabilities. Other transports may use other methods to implement propagate. For example, Bluetooth provides a different implementation of propagate which is not multicast.

The core discovery protocol may provide a format for a local peer to send a propagate message (a request to find information about other peers or peer groups in its local region or subnet) and also a format for a response message. A propagate may ask who's there (what peers are in the subnet). One or more peers may decide to respond. Other peers on the subnet may choose not to respond if they don't want to be discovered by the requesting peer. The response message may indicate that a peer is there and that the requesting peer may communicate with it if it wants more information. In one embodiment, the core peer-to-peer platform may define the format of the discovery requests and responses as part of the peer discovery protocol. In one embodiment, the messages may be XML messages.

One embodiment of a peer-to-peer platform may provide a bootstrapping process for peers. In one embodiment, a new peer may not know any peers or peer groups when bootstrapped. When bootstrapping, the peer may issue a peer discovery propagate message. The new peer is looking for one or more peers in the subnet. The new peer needs to reach some level of connectivity in order to support higher-level operations. From discovered peers, the new peer may acquire information needed to allow the new peer to go further in its bootstrapping process. For example, the new peer may send messages to another peer requesting information on services that the other peer may be aware of that the new peer needs for bootstrapping.

When the new peer discovers another peer or peers, it may attempt to discover peer groups. This process may be similar to the peer discovery process described above. The new peer may send (e.g. propagate) another discovery message that is configured to discover peer groups. Peers in the proximity network (region) that are aware of a peer group or peer groups may respond to the peer group discovery message, and may return information on the peer group(s) (e.g. peer group advertisements) of which they are aware. The new peer may use this information to determine a peer group or peer groups that it may be interested in joining.

In one embodiment, a peer group may be configured so that only a subset of peers within a group may have the capabilities to respond to peer group discovery messages and to provide information about the peer group to inquiring peers.

Peer and peer group discovery may both be implemented by the peer discovery protocol. Peer and peer group discover are more or less at the same level in the P2P platform. In one embodiment, peer discovery may use a message that indicates the discovery is looking for peers, and peer group discovery may use a similar message that indicates the discovery is looking for peer groups.

In one embodiment, the peer discovery protocol may be required to be implemented in a peer platform, and thus all peers will have the service running. When one peer sends (e.g. propagates) a request, then a receiving peer must send a response, unless it is configured to not respond to at least some requests from at least some peers based upon configuration parameters. In another embodiment, peers may be implemented without the peer discovery protocol. In other words, in this embodiment, peers are not required to implement the peer discovery platform. For example, on some smart devices, peer information and/or peer group information may be preconfigured into the device, and so bootstrapping may be performed on these devices without having to initiate a peer discovery.

Embodiments of the peer-to-peer platform may implement a discovery mechanism that is more suited for long-range discovery than the propagate method described above. In one embodiment, rendezvous peers may be used in discovery. A rendezvous peer may be described as a meeting point where peers and/or peer groups may register to be discovered, and may also discover other peers and/or peer groups, and retrieve information on discovered peers and/or peer groups. In one embodiment, a peer (any peer) in a peer group may decide to become or may be appointed or elected as a rendezvous peer in the group. The rendezvous peer may be advertised as a meeting point, and may be predefined on peers so that, for example, the peers, when starting up, may know to go to the rendezvous peer to find information about the peer-to-peer network. Rendezvous peers may act as information brokers or centralized discovery points so that peers can find information in an easy and efficient manner. As a peer group grows, a peer may become a rendezvous peer in the group. In one embodiment, a network of rendezvous peers may be constructed that may help to provide long-range discovery capabilities. A rendezvous peer may be aware of at least some of the other rendezvous peers in the network, and a discovery message from a peer may be forwarded from a first rendezvous peer to a second, and so long, to discover peers and/or peer groups that are "distant" on the network from the requesting peer.

Rendezvous peers may offer to cache advertisements to help others peers discover resources, and may propagate (forward) requests they cannot answer to other known rendezvous peers. A rendezvous peer may implement at least one of these two functions. The services provided by a rendezvous peer may be different than message routing. Message routing is performed at a lower level involving multi-hops connections to send a message between any peers in the network. In one embodiment, the forwarding of a request between two rendezvous peers may involve routing to propagate a request between two rendezvous, but this is transparent to the rendezvous service and done underneath.

In one embodiment, rendezvous peers may forward requests between each other. A rendezvous may be typically connected to a few other rendezvous peers. There may be as many rendezvous peers as peers in a peer group. Not every peer may be a rendezvous (e.g. if a peer has no caching capabilities or is isolated behind a firewall). In one embodiment, only rendezvous peers may forward a discovery request to another rendezvous peer. This restriction may serve to limit and control the exponential growth of request propagations within the network. Rendezvous peers may thus provide a simple throttle mechanism to control the propagation of requests. In one embodiment, sophisticated rendezvous peers may be deployed to filter and distribute requests for the best usage of network resources.

In one embodiment, a peer may be pre-configured with a pre-defined set of rendezvous peers. These bootstrapping rendezvous may help the peer discover enough network resources (peers, rendezvous, services) as it needs to support itself. In one embodiment, the pre-configured rendezvous are optional. A peer may be able to bootstrap by finding rendezvous or enough network resources in its proximity environment. If a peer does not know the information, it may ask the surrounding peers (hop of 1) if they know the answer. One or more peers may already have the answer. If no surrounding peers know the answer, the peer may ask its rendezvous peers to find advertisements. Peers are recognized as rendezvous peers in their peer advertisements. When a peer discovers a new peer, it can determine if this peer is a rendezvous. A peer may not be required to use all the rendezvous peers that it has discovered.

Rendezvous peers may forward requests among themselves. The discovery process continues until one rendezvous peer has the answer or the request dies. In one embodiment, there may be a Time To Live (TTL) associated with the request, so that the request is not propagated indefinitely. As an example, suppose a peer A is attempting to discover a resource R on the network. Peer A issues a discovery request specifying the type (peer, peer group, pipe, service) of advertisements it is looking for. To initiate the discovery, peer A sends a discovery request message as a single propagate packet to all its available endpoints. The packet may contain the requested peer advertisement, so the receiving peer can respond to the requester. Each discovery request identifies the initiator, and a unique request identification specified by the initiator of the request. When another peer receives the discovery request (assume peer B in this example), if it has the requested R advertisement, it will return to peer A the advertisement for R in a discovery response message. If Peer A does not get response from its surrounding peers (hop of 1), Peer A may send the request to its known rendezvous peers. If the rendezvous peers do not have the advertisement, they can propagate the request to all other rendezvous peers they know. When a rendezvous receives a respond to a request, the rendezvous may cache the R advertisement for future usage, before sending it to the requester.

Figure 11:
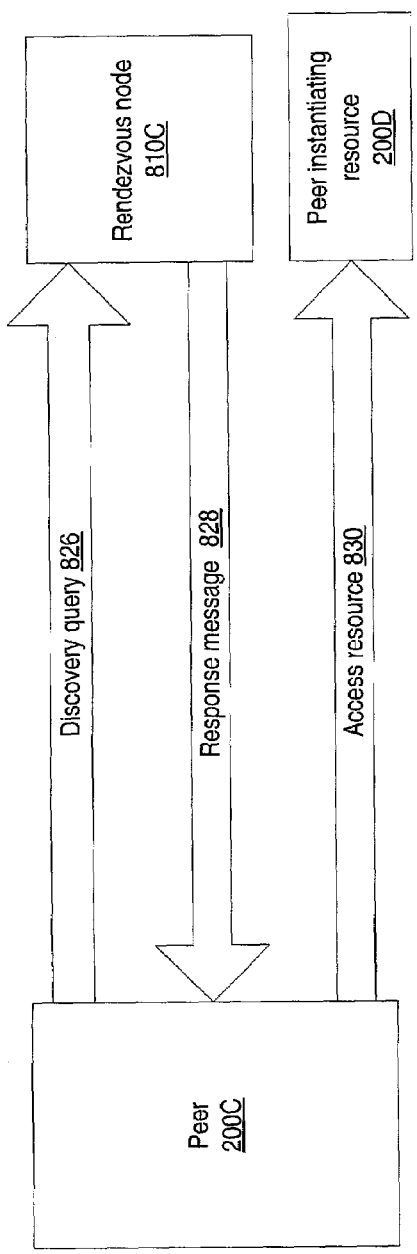
FIG. 11 illustrates a peer node locating and using network resources via a rendezvous node according to one embodiment.

FIG. 11 illustrates a peer node locating and using network resources via a rendezvous node according to one embodiment. Network resources may include, but may not be limited to, for example, other peer nodes, peer groups, services, content, pipes and pipe endpoints. Peer node 200C may broadcast discovery query message 826. Rendezvous node 810C may receive discovery query message 826 and may send a response message to peer node 200C that may include one or more resource advertisements as indicated at 828. The resource advertisements may include information on how to access corresponding network resources. After receiving the resource advertisements, peer node 200C may access a network resource instantiated on peer node 200D corresponding to one of the one or more advertisements.

Figure 12:
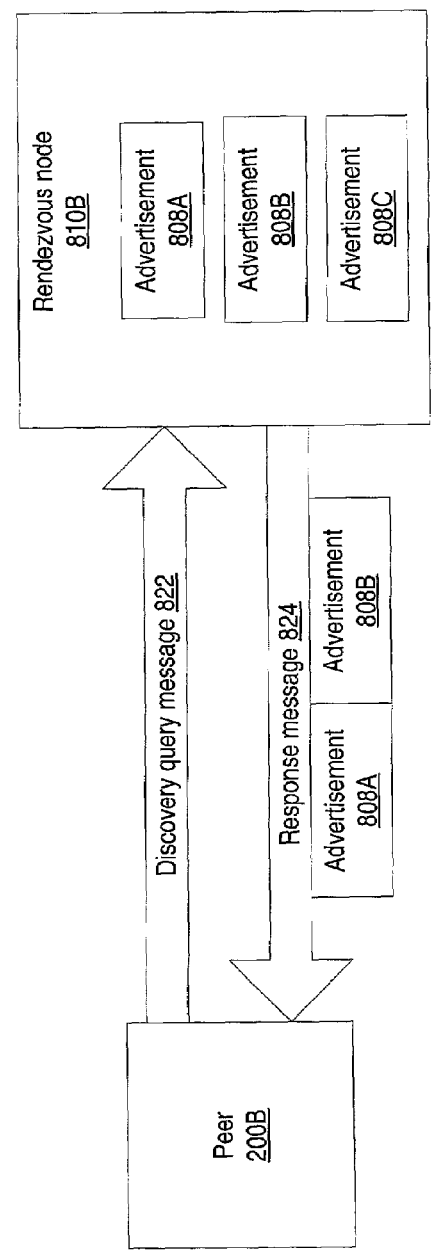
FIG. 12 illustrates discovering advertisements using a rendezvous node according to one embodiment.

FIG. 12 illustrates discovering advertisements using a rendezvous node according to one embodiment. Peer node 200B may broadcast discovery query message 822. Discovery query message 822 may be formatted in accordance with a peer-to-peer platform discovery protocol. Discovery query message 822 may include criteria specifying a particular type of network resource in which peer node 200B is interested. When discovery query message 822 reaches rendezvous node 810B that has advertisements 808A and 808B for resources that satisfy the criteria in the discovery query message, rendezvous node 810B may respond by sending peer node 200B response message 824 that may include advertisements 808A and 808B. Peer node 200B may also receive one or more response messages from one or more other peer nodes and one or more other rendezvous nodes. Each of these response messages may include advertisements for resources that satisfy the criteria in the discovery query message.

Rendezvous node 810B may not currently have advertisements cached that satisfy the discovery query message. In this case, in one embodiment, rendezvous node 810B may broadcast a discovery query message on the peer-to-peer network to discovery advertisements satisfying the peer node's discovery query message. In another embodiment, rendezvous node 8101B may forward discovery query message 822 to one or more other rendezvous nodes on the peer-to-peer network. Alternatively, rendezvous node 8101B may forward discovery query message 8101B to one or more rendezvous nodes specializing in caching advertisements on a particular topic specified by discovery query message 822. The one or more other rendezvous nodes may respond with one or more response messages including advertisements of the type specified by discovery query message 822. Rendezvous node 810B may forward the one or more response messages to peer node 200B.

Figure 13:
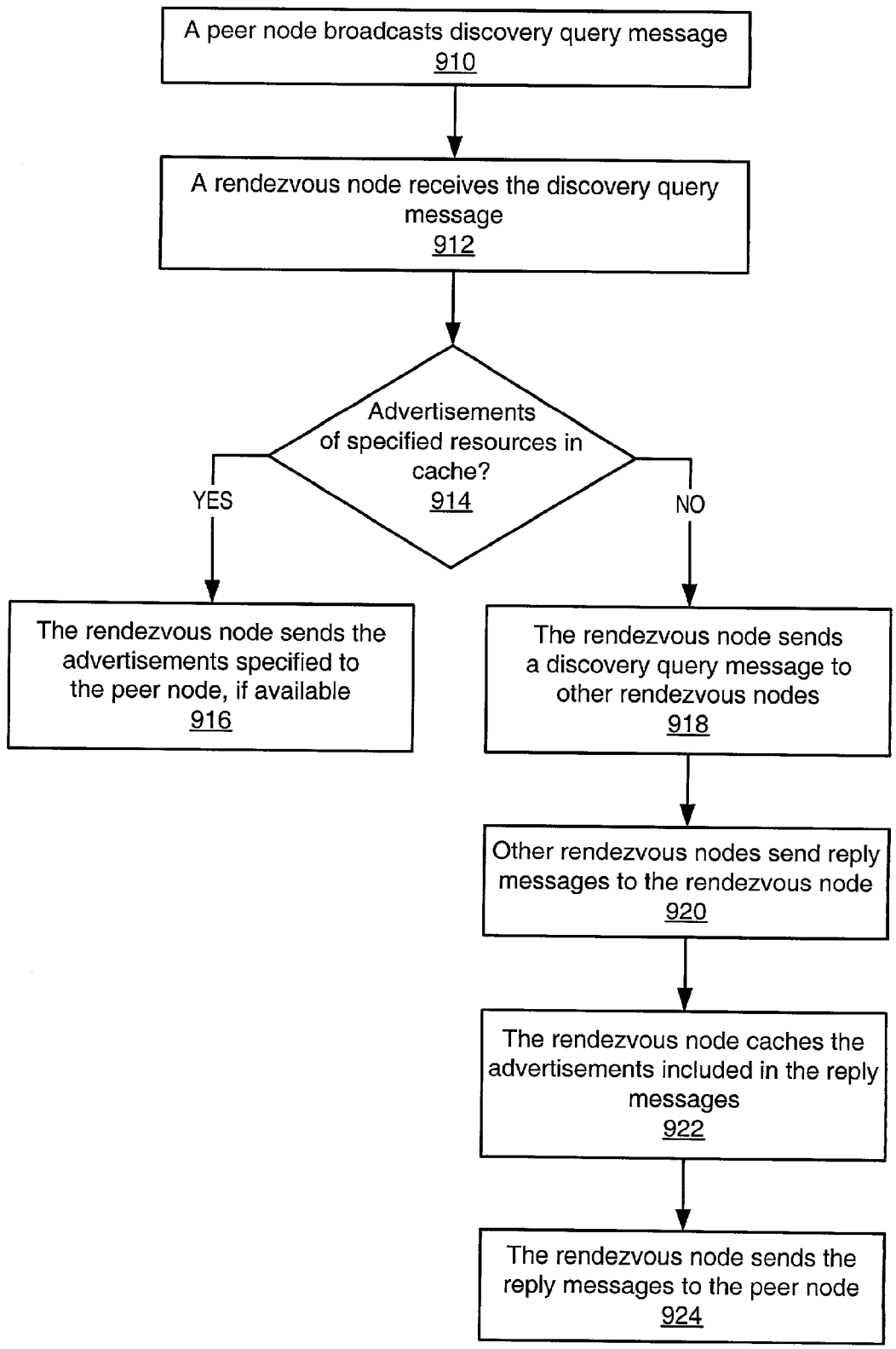
FIG. 13 is a flowchart illustrating a method of handling a discovery query message according to one embodiment.

FIG. 13 is a flowchart illustrating a method of handling a discovery query message according to one embodiment. A peer node may broadcast a discovery query message that may specify desired types of network resources on a peer-to-peer network as indicated at 910. A rendezvous node on the peer-to-peer network may receive the discovery query message as indicated at 912.

The rendezvous node may attempt to locate, in the rendezvous node's cache of advertisements, advertisements for resources of the types that may be specified by the discovery query message as indicated at 914. If the rendezvous node locates advertisements for the specified resources, the rendezvous node may send a response message that may include advertisements for specified resources to the peer node as indicated at 916. If the rendezvous node does not locate advertisements for the specified resources, the rendezvous node may forward the discovery query message to one or more other rendezvous nodes on the peer-to-peer network as indicated at 918. In another embodiment, the rendezvous node may attempt to discover the specified resources itself.

The one or more other rendezvous nodes may send response messages that may include advertisements for specified resources to the rendezvous node as indicated at 920. The rendezvous node may include routing information in each response message and may cache the advertisements that may be included in each response message as indicated at 922. The rendezvous node may forward each response message to the peer node as indicated at 924. In one embodiment, the one or more other rendezvous nodes may send the response messaged directly to the peer node.

In one embodiment, the peer rendezvous capabilities may be embedded in the core discovery protocol of the peer-to-peer platform. Rendezvous peers may be protocol-based, and may broker more information than name servers that typically only broker names of entities. In one embodiment, a rendezvous peer may maintain indexes for entities in the peer-to-peer platform including peers, peer groups, and advertisements. These indexes are dynamic which are created as the peer group community grows and more peers join. As a group joins, some peers may decide to become rendezvous peers to help peers connect with other peers in the group.

The rendezvous peer is at the peer level. A rendezvous peer is not a "service." A rendezvous peer may be used as part of an infrastructure to construct services such as a DNS or other centralizing and index services. In one embodiment, services may interact with a rendezvous peer to obtain and/or manipulate information stored on the rendezvous peer to perform some task to make the system act more efficiently.

Figure 14:
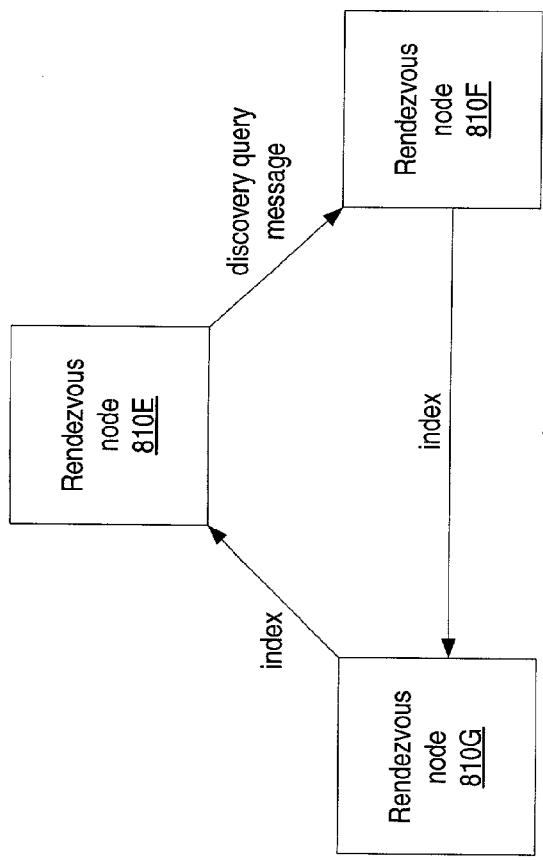
FIG. 14 illustrates a network of cooperating rendezvous nodes according to one embodiment.

FIG. 14 illustrates a network of cooperating rendezvous nodes according to one embodiment. Rendezvous nodes 810A, 810B, and 810C may each generate indexes of cached advertisements. Rendezvous nodes 810A, 810B, and 810C may each send one or more indexes to the other rendezvous nodes. For example, rendezvous node 810B may send its index to rendezvous node 810C, and rendezvous node 810C may send its index to rendezvous node 810A. Rendezvous nodes 810A, 810B, and 810C may forward discovery query messages to each other. For example, rendezvous node 810A may receive a discovery query message and may forward the discovery query message to rendezvous node 810B. Rendezvous nodes 810A, 810B, and 810C may all cache only advertisements on a particular topic or for a particular type of resource.

The exchanged indexes allow peer nodes that may have access to one of the rendezvous nodes 810A, 810B, and 810C, but may not have access to all of the rendezvous nodes 810A, 810B, and 810C, to discover resources advertised on any of the rendezvous nodes 810A, 810B, and 810C. For example, the rendezvous nodes 810A, 810B, and 810C, may each belong to different regions of the peer-to-peer network or different peer groups. A peer node that lies in the same region as rendezvous node 810A may not have access to rendezvous node 810C. Since rendezvous node 810C may share indexes with 810A, the peer node may discover network resources advertised on rendezvous node 810C via rendezvous node 810A regardless of the peer node's ability to access rendezvous node 810C.

In a network of peers, some peers may elect themselves, through the discovery protocol, to become rendezvous peers. A rendezvous peer may act as a broker or discovery message router to route discovery messages to the right place. In other words, a rendezvous may act to route discovery requests to the right rendezvous peers. For example, a rendezvous peer may receive a message requesting information about peers that are interested in baseball. The rendezvous peer may know of another rendezvous peer that specializes in information about baseball. The first rendezvous peer may forward or route the message to the second rendezvous peer. In one embodiment, rendezvous peers may maintain connections to other rendezvous peers in order to provide discovery and routing functionality.

Rendezvous peers may support long-range discovery. For example, a first peer is at a remote location from a second peer. For one of these peers to find the other with a mechanism such as web crawling may be time consuming, since there maybe a lot of "hops" between the two peers. Rendezvous peers may provide a shortcut for one of the peers to discover the other. The rendezvous peer, thus, may serve to make the discovery process, in particular long-range discover, more efficient.

A peer-to-peer network may be dynamic. Peers and peer groups can come and go. Dynamic identifiers (addresses) may be used. Thus, routes between peers need to be dynamic. Rendezvous peers may provide a method for route discovery between peers that allows routing in the peer-to-peer network to be dynamic. In this method, the rendezvous peers may perform route discovery for peers when the peers send discovery messages to the rendezvous peers or when a peer is attempting to connect to another peer or peer group that is not in the local region of the peer. This method may be transparent to the requesting peer.

In one embodiment, the rendezvous peers may be able to cache advertisements. An advertisement may be defined as metadata or descriptions of a resource. An advertisement may include information necessary for an entity to connect to or use the resource, for example a service advertisement may include information for connecting to and using the service. Advertisements may be published to allow other entities to discover them. The rendezvous peer may provide the ability for services and applications to store and cache temporary, e.g. via a lease mechanism, advertisements. This may used, for example, when one service needs to connect to another service, and needs the pipe endpoint or communication channel that may be used to connect to the service. The pipe endpoint may be included in a service advertisement published on a rendezvous peer. Thus, in one embodiment, the rendezvous peer provides the ability for peers, peer groups, services and applications to advertise pipe endpoints and to discover pipe endpoints of services and applications.

Figure 15:
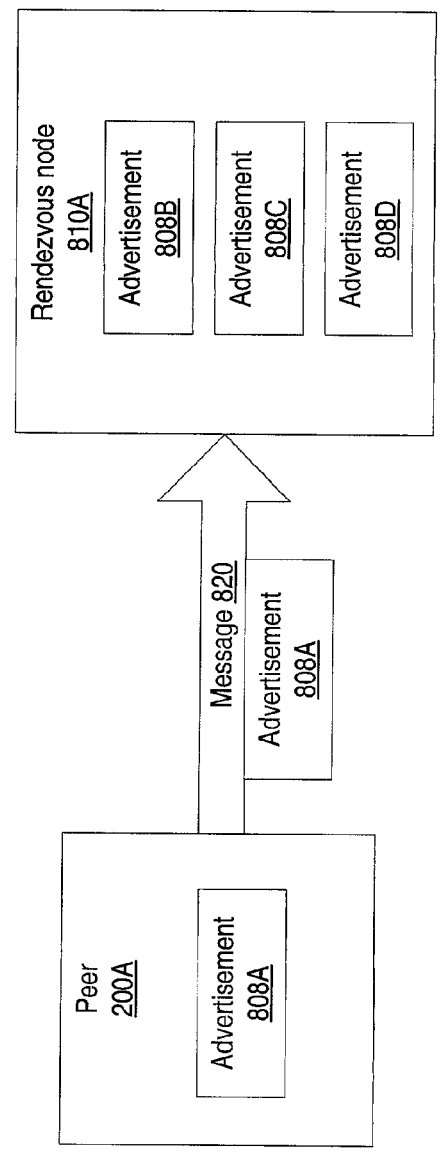
FIG. 15 illustrates a peer node publishing a network resource advertisement to a rendezvous node according to one embodiment.

FIG. 15 illustrates a peer node publishing a network resource advertisement to a rendezvous node according to one embodiment. Peer node 200A may include or may have access to network resources that peer node 200A may publish. Network resources may include, but are not limited to, peer nodes, peer groups, services, content, pipes and pipe endpoints. Peer node 200A may generate advertisement 808A that may include information on how to access the network resource. Peer node 200A may send message 820 that may include advertisement 808A to rendezvous node 810A for discovery by other peer nodes on the peer-to-peer network. Rendezvous node 810A may cache advertisement 808A along with other advertisements 808B, 808C, and 808D for discovery by the other peer nodes.

In one embodiment, advertisement 808A may include a time-to-live indicator (TTL). The TTL may indicate a length of time during which the resource advertisement is valid. When the TTL expires, peer nodes may no longer have access to the resource advertisement. Rendezvous node 810A may decrement the TTL. A peer node may discover advertisement 808A by sending a discovery query message to rendezvous peer 810A that may specify advertisements of the type corresponding to advertisement 808A. Rendezvous peer 810A may send to the peer node a response message that may include advertisement 808A.

Figure 16:
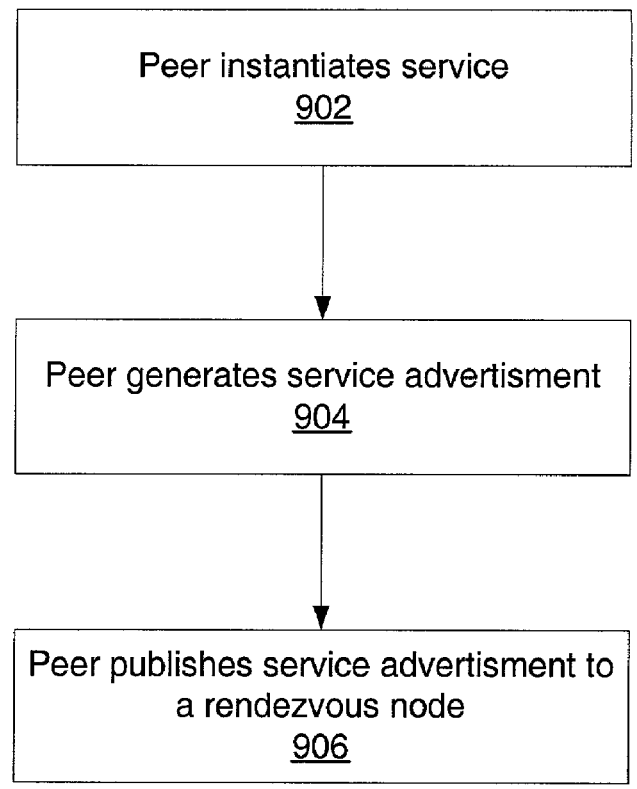
FIG. 16 is a flowchart illustrating a method of publishing a service advertisement according to one embodiment.

FIG. 16 is a flowchart illustrating a method of publishing a service advertisement according to one embodiment. A peer node may instantiate a service as indicated at 902. The peer may generate a service advertisement to allow access to the service to other peer nodes in a peer-to-peer network as indicated at 904.

In one embodiment, the service advertisement may include a pipe advertisement for a pipe to communicate with the service and activation instructions to allow the other peer nodes access to the service. The service advertisement may also include a time-to-live indicator (TTL). The TTL may indicate a length of time during which the service advertisement is valid. When the TTL expires, peer nodes may no longer have access to the service advertisement.

The peer node may publish the service advertisement as indicated at 906. The peer node may send the service advertisement to one or more rendezvous nodes. The one or more rendezvous nodes may decrement the TTL if included in the service advertisement and may delete or invalidate the service advertisement when the TTL runs out. Peer nodes on the network may then discover the published advertisement on the one or more rendezvous nodes by sending discovery query messages to the one or more rendezvous nodes. The discovery query messages may each specify a type of advertisement that the service advertisement satisfies. Upon receiving one of the discovery query messages, one of the one or more rendezvous nodes may send a response message including the service advertisement to a requesting peer node.

In one embodiment, the rendezvous protocol may use an index cache (e.g. on a peer serving as a rendezvous proxy). In one embodiment, the rendezvous protocol may be used across subnets (configurable at the peer group level). In one embodiment, the rendezvous protocol may be used across/ through firewalls (e.g. gateways).

In one embodiment, the peer-to-peer platform may include a propagate policy for use in discovery. In one embodiment, propagation may be controlled using TTL (time to live). In another embodiment, propagation may be controlled using message counts. In one embodiment, the propagate policy may be used for subnet TCP/multicast (platform configurable). In one embodiment, the propagate policy may support HTTP gateways (platform configurable). In one embodiment, the propagate policy may be used through firewalls (e.g. need peer activation behind firewalls).

In one embodiment, the peer-to-peer platform may include an invite policy. In one embodiment, the invite policy may support the adding of new peers and peer groups (e.g. publish advertisements).

In one embodiment, the peer-to-peer platform may allow the persistent local peer caching of discovery information. In this embodiment, a peer may be allowed to cache advertisements discovered via the peer discovery protocol for later usage. Caching may not be required by the peer-to-peer platform, but caching may be a useful optimization. The caching of advertisements by a peer may help avoid performing a new discovery each time the peer is accessing a network resource. In a highly transient environment, performing the discovery may be necessary. In a static environment, caching may be more efficient.

In one embodiment, the peer-to-peer platform may support trusted discovery peers. In one embodiment, the peer-to-peer platform may use discovery credentials. In one embodiment, the peer-to-peer platform may allow credential delegation. In one embodiment, the peer-to-peer platform may support propagate proxies. In one embodiment, a propagate proxy may support TTL/message counts. TTL stands for Time To Live (how long the request lives in the system). In one embodiment, a propagate proxy may support net crawling. In one embodiment, a propagate proxy may provide "smart above" routing.

In one embodiment, a peer may not initiate a new discovery request until the minimum allowable interval between discoveries is reached. This limitation on the maximum rate of discoveries may be similar to the mechanism required by Internet nodes to limit the rate at which ARP requests are sent for any single target IP address. The maximum rate may be defined by each specific implementation transport bindings and exported to the application.

A message or messages may be used to get all known, reachable advertisements within a region on the network. This list may not be exhaustive, and may be empty. Named peers may also be located using the peer discovery protocol. A message may include a peer group credential of the probing (requesting) peer that may identify the probing peer to the message recipient. The destination address may be any peer within a region (a propagate message) or alternatively a rendezvous peer (a unicast message). A response message may return one or more advertisements (e.g. peer advertisements and/or peer group advertisements) that may include "main" endpoint addresses that may be converted to a string in the standard peer endpoint format (e.g. URI or URL) and may include a network transport name. It may not be guaranteed that a response to a query request will be made. The peer discovery protocol may not require a reliable transport. Multiple discovery query requests may be sent. None, one or multiple responses may be received.

In one embodiment, a discovery query message may be used to send a discovery request to find advertisements (e.g. for peers or peer groups). The discovery query may be sent as a query string (attribute, value) form. A null query string may be sent to match any results. A threshold value may be included to indicate the maximum number of matches requested by a peer. In one embodiment, a discovery response message may be used to send a discovery response message to answer a discovery query message.

Reverse Discovery

Reverse discovery means that, in a peer-to-peer network, when a first entity (e.g. a peer) discovers a second entity (e.g. another peer), the second entity may also discover the first entity from the discovery initiated by the first entity. This may also be referred to as "mutual discovery." In most traditional systems, discovery is typically one-directional. In the peer-to-peer world, reverse discovery is important because, by definition, all "peers" are equal (i.e. it is typically not a hierarchical system). In one embodiment, there may be different levels of discovery for peers. For example, a peer may be configured to remain anonymous when discovering other peers or to always support reverse discovery. In one embodiment, a peer initiating a discovery may also be configured to deny discovery to another peer if the other peer is configured or chooses to remain anonymous. In one embodiment, a peer may also be configured to or may choose to deny discovery by other peers that wish to remain anonymous.

Invitations

One embodiment of the discovery protocol may also provide methods by which a peer can "advertise" itself, for example when joining a peer-to-peer network. For example, a peer may send an email message, by telephone, by "traditional" mail, or by other methods to other peers it discovers or is preconfigured to know about to advertise its presence and willingness to be contacted by other peers. This is done outside of the discovery method, and may be performed by any external medium. A peer who receives an invitation from a peer may have a capability to add or enter the new peer to a list or database of peers that it knows about. When the peer later restarts, these peers may be among the preconfigured peers that the peer knows about. In one embodiment, a peer may have a "notify" or "invitation" interface to allow a user to initiate invitations. In one embodiment, the peer-to-peer platform may provide import and export capabilities for invitations. In one embodiment, the invitations may be implemented as documents external to the peer-to-peer system that may be exported from one peer and imported into another peer. In one embodiment, the invitations may be in a format that enables the exporting and importing. In one embodiment, the invitations may be in XML format. In one embodiment, an interface may be provided to allow the manual entering of invitation information. Importing the invitation may create a peer-to-peer platform document that may then be used by the peer. The format of exported documents may depend on the platform on which the peer is implemented.

Peer Resolver Protocol

In one embodiment, the peer-to-peer platform may include a peer resolver protocol that may allow a peer to send simple, generic search queries to one or more peer services. In one embodiment, only those peers that have access to data repositories and that offer advanced search capabilities typically implement this protocol. Each service may register a handler in the peer group resolver service to process resolver query requests. Resolver queries may be demultiplexed to each service. Each service may respond to a peer via a resolver response message. It is important to point the differences between the peer discovery protocol and the peer resolver protocol. The peer discovery protocol is used to search for advertisements to bootstrap a peer, and discover new network resources. The peer resolver protocol is a generic service that services query protocols. The peer resolver protocol may be used by a service on a peer to interact with a service on another peer.

The peer resolver protocol may enable each peer to send and receive generic queries to find or search for peer, peer group, pipe or service specific information such as the state of a service or the state of a pipe endpoint. Each resolver query may have a unique service handler name to specify the receiving service, and a query string to be resolved by the service. The peer resolver protocol may provide a generic mechanism for peers to send queries and receive responses. The peer resolver protocol may remove the burden for registered message handlers by each service and set message tags to ensure uniqueness of tags. The peer resolver protocol may ensure that messages are sent to correct addresses and peer groups. The peer resolver protocol may perform authentication and verification of credentials and the dropping of rogue messages. In one embodiment, there is no guarantee that a response to a resolver query request will be made. In one embodiment, a peer may not be required to respond to a resolver query request. In one embodiment, a reliable transport is not required by the peer resolver protocol. In one embodiment, multiple resolver query messages may be sent. None, one or multiple responses may be received.

In one embodiment, propagating a query to the next set of peers may be delegated to the peer rendezvous protocol. The rendezvous service may be responsible for determining the set of peers that may receive a message being propagated, but may not repropagate an incoming propagated message. The decision of propagating a message one step further may be left to the service handling the message. The peer rendezvous protocol's policy may be that if the query handler does not instruct the peer rendezvous protocol to discard the query, and if the local peer is a rendezvous, then the query is repropagated (within the limits of loop and time-to-live rules that may be enforced by the rendezvous service). In addition, if instructed by the query handler, an identical query may be issued with the local peer as the originator.

In one embodiment, a resolver query message may be used to send (unicast) a resolver query request to a service on another member of a peer group. In one embodiment, the resolver query may be sent as a query string to a specific service handler. Each query may include a unique identifier. The query string may be any string that may be interpreted by the targeted service handler. A resolver response message may be sent (unicast) to the requesting peer by the service handler. A resolver response message may be returned in response to a resolver query message.

Peer Information Protocol

Once a peer is located, its capabilities and status may be of interest. In one embodiment, the peer-to-peer platform may include a peer information protocol that may allow a peer to learn about other peers' capabilities and status. For example, a peer can send a ping message to see if another peer is alive. A peer may also query another peer's properties where each property has a name and a value string. A peer may not be required to respond to a peer information protocol request.

In one embodiment, messages may be used to get a list of named control "properties" exported by a peer. A property is a "knob" used to get information or configuration parameters from the peer. All properties may be named (e.g. using a string), and may be "read-only." In one embodiment, higher-level services may offer "read-write" capability to the same information, given proper security credentials. Each property may have a name and a value string. Read-write widgets may allow the string value to be changed, while read-only widgets may not. In one embodiment, the peer information protocol may only provide read access. The destination address is a peer's main endpoint that may have been returned in a discovery response message.

A reliable transport may not be required by the peer information protocol. In one embodiment, multiple peer information messages may be sent. None, one or multiple responses may be received. In one embodiment, a ping message may be sent to a peer to check if the peer is alive and/or to get information about the peer. The ping option may define the response type returned. In one embodiment, a full response (peer advertisement) or a simple acknowledge response (alive and uptime) may be returned. In one embodiment, a peer information response message may be returned in response to a ping message.

Peer Membership Protocol

In one embodiment, the peer-to-peer platform may include a peer membership protocol that may allow a peer to join or leave peer groups, and to manage membership configurations, rights and responsibilities. This protocol may allow a peer to obtain group membership requirements (such as an understanding of the necessary credential for a successful application to join the group), to apply for membership and receive a membership credential along with a full group advertisement, to update an existing membership or application credential, and to cancel a membership or an application credential. In one embodiment, authenticators and/or security credentials may be used to provide the desired level of protection.

In one embodiment, the process of joining a peer group may include obtaining a credential that is used to become a group member. In one embodiment, the process of joining a peer group may include obtaining a form listing the set of requirements asked of all group members. In one embodiment, this form may be a structured document (e.g. a peer group advertisement) that lists the peer group membership service.

In one embodiment, the peer membership protocol may define messages including, but not limited to, an apply message, a join message, an acknowledgement (ACK) message, a renew message, and a cancel message. A peer membership protocol apply message may be sent by a potential new group member to the group membership application authenticator. The authenticator's endpoint may be listed in the peer group advertisement of every member. In one embodiment, a successful response from the group's authenticator may include an application credential and a group advertisement that may list, at a minimum, the group's membership service. In one embodiment, the apply message may include, but is not limited to, the current credential of the candidate group member and the peer endpoint for the peer group membership authenticator to respond to with an acknowledgement (ACK) message.

A peer membership protocol join message may be sent by a peer to the peer group membership authenticator to join a group. The peer may pass an application credential (from an apply response ACK message) for authentication purposes. A successful response from the group's authenticator may include a full membership credential and a full group advertisement that lists, at a minimum, the group's membership configurations requested of full members in good standing. The message may include a credential (application credential of the applying peer: see ACK message). This credential may be used as the application form when joining. The message may also include the peer endpoint for the authenticator to respond to with an ACK message.

A peer membership protocol ACK message is an acknowledge message that may be used for both join and apply operations. A peer membership protocol ACK message may be sent back by the membership authenticator to indicate whether or nor the peer was granted application rights to the peer group if the peer is applying, or full membership to the peer group if peer is attempting to join. In one embodiment, an ACK message may also be sent in response to peer membership protocol renew messages and cancel messages. The message may include a credential (an application or membership credential allocated to the peer by the peer group authenticator). The message may also include a more complete peer group advertisement that may provide access to further configurations. In one embodiment, not all configuration protocols are visible until the peer has been granted membership or application rights. Some configurations may need to be protected. In addition, depending on the peer credential, the peer may not have access to all the configurations.

A peer membership protocol renew message may be sent by a peer to renew its credential (membership or application) access to the peer group. An ACK (acknowledgement) message may be returned with a new credential and lease if the new is accepted. The renew message may include, but is not limited to, a credential (a membership or application credential of the peer) and the peer endpoint to which an ACK response message may be sent. A peer membership protocol cancel message may be sent by a peer to cancel the peer's membership or application rights in a peer group. The message may include, but is not limited to, a credential (a membership or application credential of the peer) and the peer endpoint to send an ACK message. In one embodiment, an ACK to a cancel may include a response status indicating the cancel was accepted.

Pipe Binding Protocol

In one embodiment, the peer-to-peer platform may include a pipe binding protocol that may allow a peer to find the physical location of a pipe endpoint and to bind a pipe advertisement to the pipe endpoint, thus indicating where messages actually go over the pipe. A pipe is conceptually a virtual channel between two pipe endpoints (input and output pipes) and may serve as a virtual link between two or more peer software components (e.g. services or applications).

A pipe may be viewed as an abstract, named message queue that supports a number of abstract operations such as create, open, close, delete, send, and receive. The pipe virtual link (pathway) may be layered upon any number of physical network transport links such as TCP/IP. Each end of the pipe may work to maintain the virtual link and to reestablish it, if necessary, by binding endpoints or finding the pipe's currently bound endpoints.

Actual pipe implementations may differ, but peer-to-peer platform-compliant implementations preferably use the pipe binding protocol to bind pipes to pipe endpoints. In one embodiment, during the abstract create operation, a local peer binds a pipe endpoint to a pipe transport. In another embodiment, bind may occur during the open operation. Unbind occurs during the close operation. In one embodiment, each peer that "opens" a group pipe may make an endpoint available (binds) to the pipe's transport. Messages are preferably only sent to one or more endpoints bound to the pipe. Peers that have not opened the pipe preferably do not receive or send any messages on that pipe. In one embodiment, when some peer software wants to accept incoming pipe messages, the receive operation may remove a single message in the order it was received, not in the order it was sent. In one embodiment, a peek operation may be used as a mechanism to see if any message(s) has arrived in the pipe's queue.

In one embodiment, the pipe binding protocol may define messages including, but not limited to, a query message and a response message. In one embodiment, a pipe binding protocol query message may be sent by a peer pipe endpoint to find a pipe endpoint bound to the same pipe advertisement. The following is an example of one embodiment of a pipe binding protocol query message in XML, and is not intended to be limiting:

<?xml version="1.0" encoding="UTF-8"?>
<PipeBindingQuery>
  <Credential> query credential </Credential>
  <Peer> optional tag. If present, it may include the peer identifier of the only peer that should answer the request.
  </Peer>
  <Cached>true if the reply can come from a cache </Cached>
  <PipeID>pipe identifier to be resolved </PipeID>
</PipeBindingQuery>

In one embodiment, the requester may ask that the information not be obtained from a cache. This is to obtain the most up-to-date information from a peer to address stale connection. The Peer field specifies a peer identifier. This peer is the one that should respond to the query. There is preferably no guarantee that a response to a pipe binding request will be made. Preferably, a peer is not required to respond to a binding request. Preferably, a reliable transport is not required. In one embodiment, multiple binding query messages may be sent. None, one or multiple responses may be received.

In one embodiment, a pipe binding protocol response message may be sent to the requesting peer by each peer bound to the pipe in response to a query message. The following is an example of one embodiment of a pipe binding protocol response message in XML, and is not intended to be limiting:

<?xml version="1.0" encoding="UTF-8"?>
<PipeBindingAnswer>
  <Credential> credential </Credential>
  <PipeID> pipe identifier resolved </PipeID>
  <Peer> peer identifier (e.g. URI, URN) where a corresponding endpoint (e.g. Input Pipe) has been created
  </Peer>
  <Found> true: the Input Pipe does exist on the specified peer (ACK)
    false: the Input Pipe does not exist on the specified peer (NACK)
  </Found>
</PipeBindingAnswer>

Endpoint Routing Protocol

In one embodiment, the peer-to-peer platform may include an endpoint routing protocol. The endpoint routing protocol may be used by peers to send messages to router peers requesting available routes for sending message(s) to destination peers.

A peer-to-peer platform network is typically an ad hoc, multi-hops, and adaptive network by nature. Connections in the network may be transient, and message routing may be nondeterministic. Routes may be unidirectional and change rapidly. Peers may appear and leave frequently. Two communicating peers may not be directly connected to each other. Two communicating peers may need to use router peers to route messages depending on the network topology. For example, the two peers may be on different network transports, or the peers may be separated by a firewall or a NAT (Network Address Translation) router. A peer behind a firewall may send a message directly to a peer outside a firewall. However, a peer outside the firewall cannot establish a connection directly with a peer behind the firewall.

The endpoint routing protocol may define a set of request/query messages that is processed by a routing service to help a peer route messages to its destination. When a peer is asked to send a message to a given peer endpoint address, it may look in its local cache to determine if it has a cached route to this peer. If the peer does not find a route, it may send a route resolver query message to available peer routers requesting route information. A peer may have access to as many peer routers as it can find, or optionally a peer may be pre-configured to access certain routers.

Peer routers provide the low-level infrastructures to route a message between two peers in the network. Any number of peers in a peer group may elect themselves to become peer routers for other peers. Peers routers offer the ability to cache route information, as well as bridging different physical (different transport) or logical (firewall and NAT) networks. A peer may dynamically find a router peer via a qualified discovery search. A peer may find out if a peer it has discovered is a peer router via the peer advertisement properties tag.

When a peer router receives a route query, if it knows the destination (a route to the destination), it may answer the query by returning the route information as an enumeration of hops. The message may be sent to the first router and that router may use the route information to route the message to the destination peer. The route may be ordered from the next hop to the final destination peer. At any point the routing information may be obsoleted, requiring the current router to find a new route.

The peer endpoint may add extra routing information to the messages sent by a peer. When a message goes through a peer, the endpoint of that peer may leave its trace on the message. The trace may be used for loop detection and to discard recurrent messages. The trace may also be used to record new route information by peer routers.

In one embodiment, the endpoint routing protocol may provide the last resort routing for a peer. More intelligent routing may be implemented by more sophisticated routing services in place of the core routing service. High-level routing services may manage and optimize routes more efficiently than the core service. In one embodiment, the hooks necessary for user defined routing services to manipulate and update the route table information (route advertisements) used by the peer router may be provided by the endpoint routing protocol. Thus, complex route analysis and discovery may be performed above the core by high-level routing services, and those routing services may provide intelligent hints to the peer router to route messages.

Router peers may cache route information. Router peers may respond to queries with available route information. Route information may include a list of gateways along the route. In one embodiment, any peer may become a router peer by implementing the endpoint routing protocol.

The time-to-live parameter specifies how long this route is valid. The creator of the route can decide how long this route will be valid. The gateways may be defined as an ordered sequence of peer identifiers that define the route from the source peer to the destination peer. The sequence may not be complete, but at least a first gateway may be sufficient to initially route the messages. The remaining gateway sequence may be optional.

The endpoint routing protocol may provide messages including, but not limited to, a route request message and a route answer message from the router peer. In one embodiment, a peer may send a route request message to a router peer to request route information. Route information may be cached or not cached. In some cases, the route query request message may indicate to bypass the cache content and thus to search dynamically for a route. In one embodiment, it is not guaranteed that a route response will be received after a query is sent. In one embodiment, a router peer may send a route answer message to a peer in response to a route information request.

Routing

A peer-to-peer platform may provide a mechanism or mechanisms for searching and accessing peers, peer groups, content, services and other information in a dynamic topology of peers and peer groups, where peers and peer groups can come and go. In one embodiment, peers and peer groups may come and go potentially with limited or no control and notification. Peers may connect to a peer-to-peer network through various wired and wireless protocols, including "not connected" protocols such as may be used by mobile consumer devices such as pagers and PDAs. Peers may also have to cross boundaries, for example boundaries created by firewalls and NAT (Network Address Translation) routers, to connect to other peers.

In one embodiment, in order to bootstrap the system, and also in order to have a fallback mechanism if an application cannot or does not support one or more of the tasks, the core peer-to-peer protocols may be used in providing a discovery and router mechanism for discovering peers and other core abstractions such as advertisements, pipes, and peer groups. The discovery and routing mechanism of the peer-to-peer platform may use as few protocols as possible, is simple, and makes use of underlying optimizations when available. Hooks into the core discovery and router mechanism may be provided so that applications and services may participate in the discovery and router mechanisms, for example, by passing information to the core discovery and router mechanism. In one embodiment, an application or service may be allowed to override the core discovery and router mechanism with its own custom mechanism.

Figure 17:
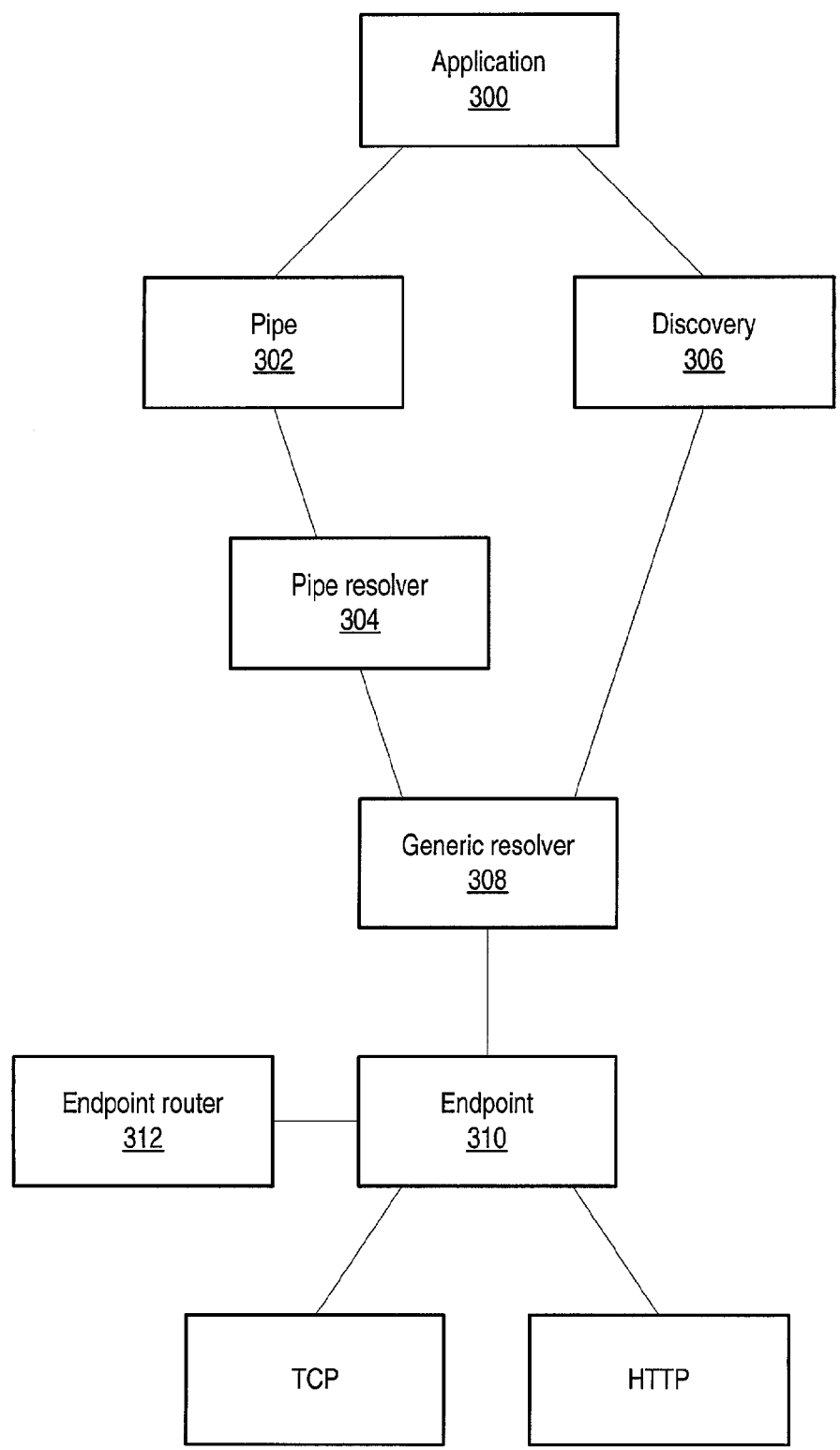
FIG. 17 illustrates several core components and how they interact for discovery and routing according to one embodiment.

FIG. 17 illustrates several core components and how they interact for discovery and routing according to one embodiment. Application 300 may use discovery 308 to find peers, peer groups, advertisements, and other entities on the peer-to-peer network, and may also publish pipe, peer, peer group, service, and other advertisements for access by other peers, applications and services on the peer-to-peer network. In one embodiment, the endpoint 310 may be responsible for exchanging messages between peers that are directly connected to each other (i.e. the peers can reach each other without any routing and/or discovering). When available, multicast may be used to discover peers that the endpoint can reach (multicast is a mechanism which has been introduced in IP in order to optimize this kind of process). In addition to that, or when multicast is not available, A rendezvous and invitation mechanism may also be provided. The rendezvous and invitation method may be used, for example, if multicast is not available. For example, HTTP does not provide multicast capabilities.

The endpoint router 312 may manage a cache of routes, for example routes to remote peers. In one embodiment, the endpoint router 312 may be configured from caching no routes to caching all routes it is aware of, depending on what the configuration wizard has decided with user control. The endpoint router 312 may also forward (route) messages depending on what is found in the cache, and what has been configured. For example, the endpoint router 312 may be configured to route search (propagate) requests or to not route the requests.

In one embodiment, the generic resolver 308 is a protocol that implements a sort of RPC (query/response) protocol on top of the endpoint(s) 310. Discovery 306 and pipe resolver 304 may use the generic resolver 308. In one embodiment, discovery 306 may be responsible for searching, caching and generating core advertisements (e.g. peer, peer group, and pipe advertisements). Discovery 306 may use the generic resolver 308 to send query messages and to receive answers. In one embodiment, discovery 306 may be aware of rendezvous peers and may have an invitation mechanism that may be used to assist the generic resolver 308. In one embodiment, the pipe resolver 304 may be responsible for localizing the receiving end of a pipe 302 given a pipe advertisement. In one embodiment, the pipe resolver 304 does not search for a pipe advertisement. In one embodiment, the pipe resolver 304 may be configured to manage a cache of the locations of the receiving ends (i.e. receiving peers) of the pipe 302.

The pipe protocol may use the endpoint 310 for transferring messages (with the potential help of the endpoint router 312) between the sending end of the pipe 302, and the receiving end of the pipe 302. In one embodiment, a pipe 302 may be viewed as an endpoint 310 that has not been bound to a particular peer. In one embodiment, a pipe 302 may be moved seamlessly from one peer to another. In one embodiment, a pipe 302 may also provide uniqueness that may not be provided by an endpoint 310 since a pipe identifier is unique in time and space, and an endpoint 310, being a network address, may not be.

A discovery and router mechanism based on web crawling may be time-expensive, and higher level protocols (such as applications) may have information that the core is not aware of that may help in the web crawling process. In one embodiment, to enable applications to participate in the process, components of the core mechanism may provide hooks that enable the applications to assist in the process (e.g. by providing information). Some transport protocols such as HTTP may be configured for and/or dynamically learn about web rendezvous peers it can use. An application may be provided access to the list of rendezvous peers. In one embodiment, an application may be allowed to set/unset routes in an endpoint router 312. Each route may be qualified to route or not route propagate messages such as web crawling messages and/or unicast messages. The endpoint router 312 may be viewed as a route cache manager, which is may be controlled by an endpoint 310 and/or other entities that may need to control it. In one embodiment, an endpoint router 312 may be able to discover unknown routes from applications. In one embodiment, discovery 308 may be configured (statically and/or dynamically) to control the nature and the amount of data that it manages. In one embodiment, discovery 308 may be taught where to go search, or where not to go search. In one embodiment, discovery 308 may make an "upcall" to a search/retrieve mechanism. In one embodiment, a pipe resolver 304 may manage a cache of input pipes (receiving ends). In one embodiment, pipe resolver 304 may be accessed by applications to set/unset entries in the cache.

Security

Embodiments of the peer-to-peer platform protocols may be compatible with widely accepted transport layer security mechanisms for message-based architectures such as Secure Sockets Layer (SSL) and Internet Protocol Security (IPSec). However, secure transport protocols such as SSL and IPSec only provide the integrity and confidentiality of message transfer between two communicating peers. In order to provide secure transfer in multi-hops network, a trust association may be established among all the intermediary peers. Security is compromised if anyone of the communication links is not secured. Thus, the peer-to-peer platform security model may be implemented to provide a P2P "web of trust." The web of trust may be used, for example, to exchange public keys among its members. Each peer group policy may permit some members to be trusted to the extent that they have the authority to sign public keys for other members as well as to do things like authenticate, add new members, and remove or revoke membership. Embodiments may implement security classes for the RSA public key exchange, the RC4 byte stream cipher, and the SHA-1 hash algorithm, among others. These classes may enable privacy by the means of a P2P TLS implementation; integrity with signed hashes; non-repudiation using the web of trust; and MACs for data authenticity. Combinations of these classes may form security suites, and the peer-to-peer platform provides the mechanism to add new customized suites as required.

The security module may be available to the core level, and thus services, applications and advanced services and applications may plug in their own security components and protocols. For example, the web of trust may be defined by a policy that requires authorized peer group members to be well-known certificate authorities, and that peers exchange X509v3 CA signed certificates.

The term "codat" as used herein refers to any computer content—code, data, applications, or other collection of computer representable resources. The peer-to-peer protocol may not distinguish among different types of resources that can be stored on a computer and shared among peers in a peer group. Examples of "codat" include text files, photographs, applets, executable files, serialized Java objects, SOAP messages, etc. Codats are the elementary unit of information that is exchanged among peers. In this embodiment, given that codats may have arbitrary forms and properties, it may not be clear what sets of actions should be defined for them. In one embodiment, the codats may carry or include definitions of how they should be accessed. Such codats are analogous to objects, which define for themselves access methods others can invoke.

Peers communicate through pipes. As an example, suppose both confidentiality and integrity in the communications channel are desired. In one embodiment, Virtual Private Networks (VPNs) may be used to move all network traffic. In one embodiment, a secure version of the pipe may be created, similar to a protected tunnel, such that any message transmitted over this pipe is automatically secured. In one embodiment, regular communications mechanisms may be used, and specific data payloads may be protected with encryption techniques and digital signatures. Embodiments of the peer-to-peer platform may accommodate one or more of these and other possible solutions.

In one embodiment, peers, configurations, peer groups, and pipes form the backbone of the peer-to-peer platform. Security in some embodiments of the peer-to-peer platform may use credentials and authenticators (code (e.g. computer-executable instructions) that may be used to receive messages that either request a new credential or request that an existing credential be validated). A credential is a token that when presented in a message body is used to identify a sender and can be used to verify that sender's right to send the message to the specified endpoint and other associated capabilities of the sender. The credential is an opaque token that must be presented each time a message is sent. The sending address placed in the message envelope may be crosschecked with the sender's identity in the credential. In one embodiment, each credential's implementation may be specified as a plug-in configuration, which allows multiple authentication configurations to co-exist on the same network.

In some embodiments, for peer group authentication a separate Pluggable Authentication Module (PAM) may be provided. Embodiments may provide anonymous or guest login, and login with user name and password. A login session may be in clear or cipher-text as per the peer group security policy. In one embodiment, a peer-to-peer platform-based naming service may bind a peer to a human user. The user's anonymity may be ensured through the naming service, or the authentication service, or a proxy service, or any combination of these. The peer-to-peer platform may be independent of the solution chosen by a particular application. In one embodiment, all messages include, at a minimum, a peer group credential that identifies the sender of the message as a full member peer in the peer group in good standing. Membership credentials may be used that define a member's rights, privileges, and role within the peer group. Content access and sharing credentials may also be used that define a member's rights to the content stored within the group.

In one embodiment, the peer-to-peer platform may provide different levels of security. In one embodiment, APIs may be provided to access well known security mechanisms such as RCA. In one embodiment, the peer-to-peer platform may provide a distributed security mechanism in a peer-to-peer environment. In one embodiment, this distributed security may not depend on certificates administered by a central authority. The distributed security mechanism may allow a peer group "web of trust" to be generated. In the distributed security mechanism, peers may serve as certificate authorities (security peers). Each peer group may include one or more peers that may serve as a certificate authority in the group. In one embodiment, the creator of a peer group may become the default security authority in the group. In one embodiment, if there is more than one creator, the creator peers may choose one of the peers to be the security authority in the group. In one embodiment, the peer or peers that create a peer group may define the security methods that are to be used within the group (anywhere from no security to high levels of security). In one embodiment, more than one peer in a peer group may serve as a security peer. Since peers are not guaranteed to be up at all times, having multiple security peers in a peer group may help insure that at least one security peer is available at all times. In one embodiment, the peer group's certificate peer may verify keys to provide a weak level of trust. In one embodiment, peer-to-peer platform advertisements may include information to describe the security mechanism(s) to be used in a peer group. For example, the advertisement may include information to do public key exchange, information to indicate what algorithms are to be used, etc. The advertisement may also include information that may be used to enforce secure information exchange on pipes (e.g. encryption information).

In one embodiment, peer group security may establish a "social contract". The role of security is distributed across peer groups, and across members of peer groups, that all agree to participate by the rules. A peer group may establish the set of rules by which security in the group is enforced. A peer may join the peer group with a low level of security clearance (low trust). If the peer stays in the group and behaves (follows the rules), the peer may build up its level of trust within the group, and may eventually be moved up in its security level. Within peer groups operating under a social contract, certificates and/or public keys may be exchanged without the participation of a strict certificate authority; i.e. the members may exchange certificates based upon their trust in each other. In one embodiment, a peer group may use an outside challenge (e.g. a secret group password) that may be encrypted/decrypted with public/private keys, as a method to protect and verify messages within the group. In one embodiment, peer groups may be configured to use other types of security, including a high level of security, for example using a strict certificate authority, and even no security. In one embodiment, peer-to-peer platform messages exchanged within a group may have a "placeholder" for security credentials. This placeholder may be used for different types of credentials, depending upon the security implementation of the particular group. In one embodiment, all peer-to-peer messages within the group may be required to have the embedded credential. One embodiment may support private secure pipes.

Migration of Services

Member peers in a peer group using a peer-to-peer platform may cooperate to provide redundant instances of services to member peers. The redundant services may help to create an environment of reliability. An example of a redundant service may be a network storage system in which the stored data is duplicated across multiple peers. As another example, a peer that wants to use a spell checker service man connect to a peer group's spell checker that is implemented as a redundant peer group service via a pipe. The peer may be serviced as long as there is at least one single instance of a spell checker service running somewhere within the peer group. In these and other redundant services, redundancy may increase data availability and may decrease the chance of data loss, among other benefits.

In a peer-to-peer networking environment, peers may join and leave the network at any time. Since peers may host instances of services, and any peer may become unavailable at any time, services that need to have a persistent presence or instance available to peers may need the topology of the network to be dynamically reconfigured to continue providing the service to customer peers. Further, peer nodes hosting redundant services may experience different levels of activity (e.g. network traffic and processing). A peer node may host any number of other services or applications in addition to the redundant instance of the service, and may be used to access services or applications on other peer nodes. Further two or more peers may access an instance of a service via separate pipes. The level of activity on a particular peer node may be referred to as the "load" on the peer node. Load balancing among a collection of peer nodes may be performed to prevent one or more peer nodes from being heavily loaded and thus risking degradation of service. In load balancing, if the load on a particular peer node exceeds a load threshold for the peer threshold, it may be desirable to transfer some activities of the peer node to other peer nodes. Thus, a service implemented as a plurality of redundant instances may need the topology of the network to be dynamically reconfigured to provide load balancing among the peers hosting the instances. At least some services may desire or require reconfiguration of the topology of the network to be performed, when possible, transparently to peers accessing the service.

In one embodiment, dynamic migration of a service may be performed by unbinding one or more peer-to-peer platform pipes from a peer hosting an instance of the service and binding the pipes to another peer hosting a different instance of the service. One embodiment may allow a service to be migrated so that the peer accessing the service through the pipe (and an application and/or service executing within the peer and accessing the service through the pipe) is not aware of the migration (i.e. the migration is performed transparently to the peer). In one embodiment, the migration mechanism is not centralized (i.e. is not executing within a single peer or set of peers), and thus a third party may not be required to perform the service migration. Using the migration mechanism, migration of services may be performed transparently and dynamically to peers accessing services provided by the collection of peers.

In one embodiment, services are accessed through peer-to-peer platform pipes. Pipes are virtual communication channels used to send and receive messages between services and applications. Pipes provide a virtual abstraction over the peer endpoints to provide the illusion of virtual in and out mailboxes that are not physically bound to a specific peer location. Pipes may connect two or more peer endpoints. The pipe ends are referred to as output pipes (sending end) and input pipes (receiving end). When a message is sent into a pipe, the message is sent by the local output pipe to the destination input pipe(s) currently listening to this pipe.

Unlike conventional mechanisms, peer-to-peer platform pipes may have ends that may be moved around and bound to different peers at different times, or not connected at all. In one embodiment, pipes may be virtual, in that a pipe's endpoint may be bound to one or more peer endpoints. The pipe binding process may include discovering and connecting the two or more endpoints of a pipe. In one embodiment, pipe endpoints may be non-localized to a physical peer, and may be dynamically bound at creation time or runtime using the pipe binding protocol. In one embodiment, pipe ends may be dynamically bound to a peer endpoint at runtime by a pipe resolver. In one embodiment, pipes may be published and discovered using pipe advertisements, and may be uniquely identified by a pipe identifier.

Using the pipe abstraction, developers may build highly available services where pipe connections may be established independently of a peer location. The dynamic binding of pipes may be used in providing redundant implementation of services over a peer-to-peer network. Applications and services may transparently failover from one physical peer endpoint to another peer endpoint in order to mask a service or peer failure, to access a newly published instance of a service, for load balancing, or for other reasons. A peer may logically "pick up" a pipe at any point in time. Thus, using pipes as described herein, a collection of peers together may provide a high level of fault tolerance, where, for example, a new peer at a different location may replace a crashed or otherwise unavailable peer, with the new peer taking over the existing pipe to keep the communication going. In some embodiments, this may be performed transparently to peers accessing services or other resources provided by the collection of peers.

Figure 18A:
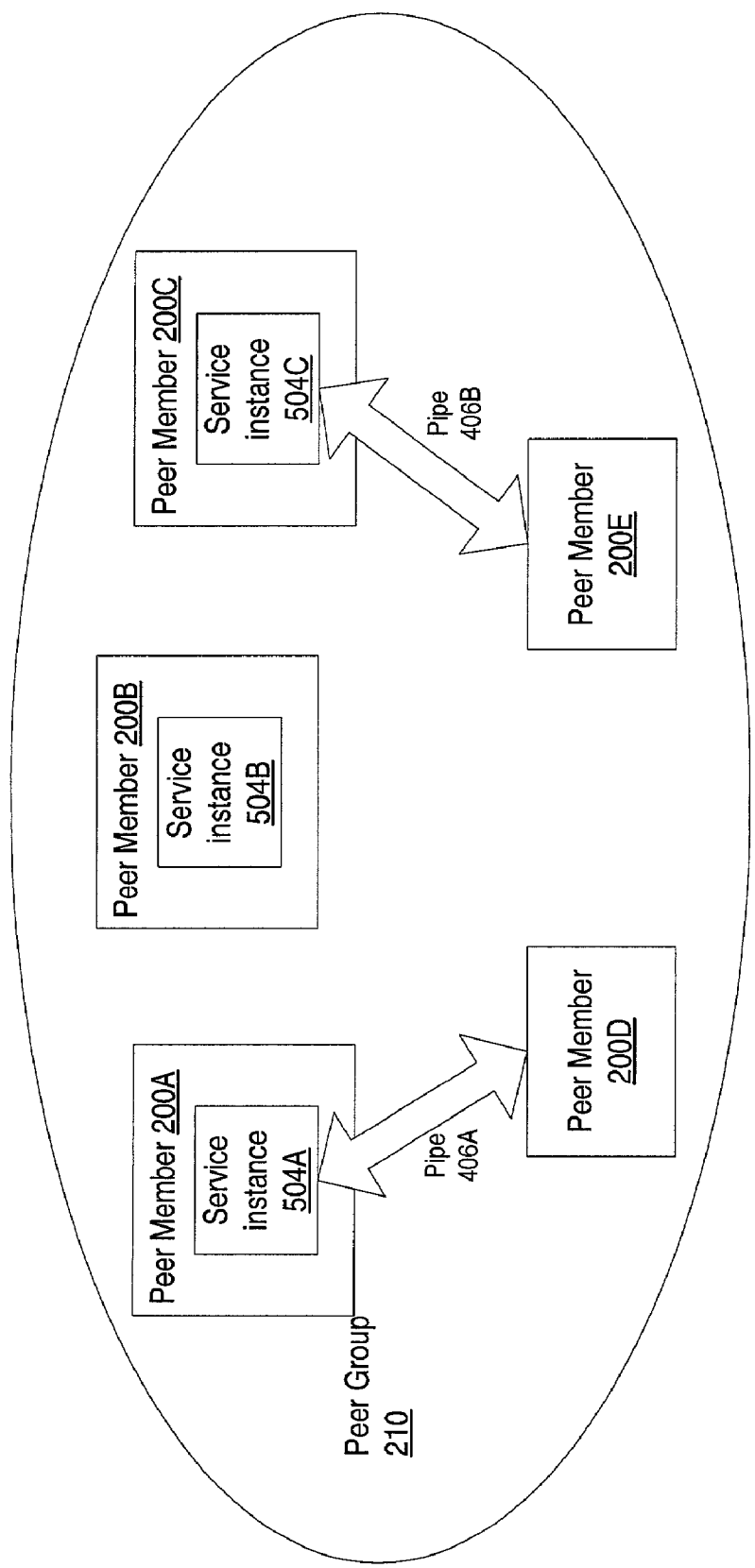
FIG. 18A illustrates a peer group with a redundant service accessible by member peers according to one embodiment.

FIG. 18A illustrates a peer group providing a redundant service to member peers using a point-to-point pipe according to one embodiment. In this example, three instances of a service 504 provided by peers 200A, 200B and 200C are available to members of peer group 210A. Peer 200D is shown accessing service instance 504A on peer 200A through pipe 406A, and peer 200E is shown accessing service instance 504C on peer 200C through pipe 406B.

In one embodiment, if an instance of a service 504 becomes unavailable (e.g. the service instance is no longer provided by the peer, the peer disconnects from the network or leaves the peer group, or load balancing is desired or required), redirection of a peer 200 to another instance of a service 504 may be accomplished by binding one or more communication pipes that bound the peer 200 to the service instance 504 that is no longer available to a different, currently available service instance 504 hosted by another peer 200. For example, if the service instance 504C hosted by peer member 200C becomes unavailable, communication pipe 406B may be redirected and bound to a service instance 506 hosted by peer member 200A or 200B.

In one embodiment, two or more peers 200 hosting service instances 506 may be initially bound to the pipe 406, and instead of binding a new service instance 506 to the pipe when needed, messages for the service may be transparently (to the sending peer) routed to any of the service instances 506 bound to the pipe 406 as necessary. In one embodiment, a pipe resolver may handle the determination of service instances 506 to which messages are to be routed.

Figure 18B:
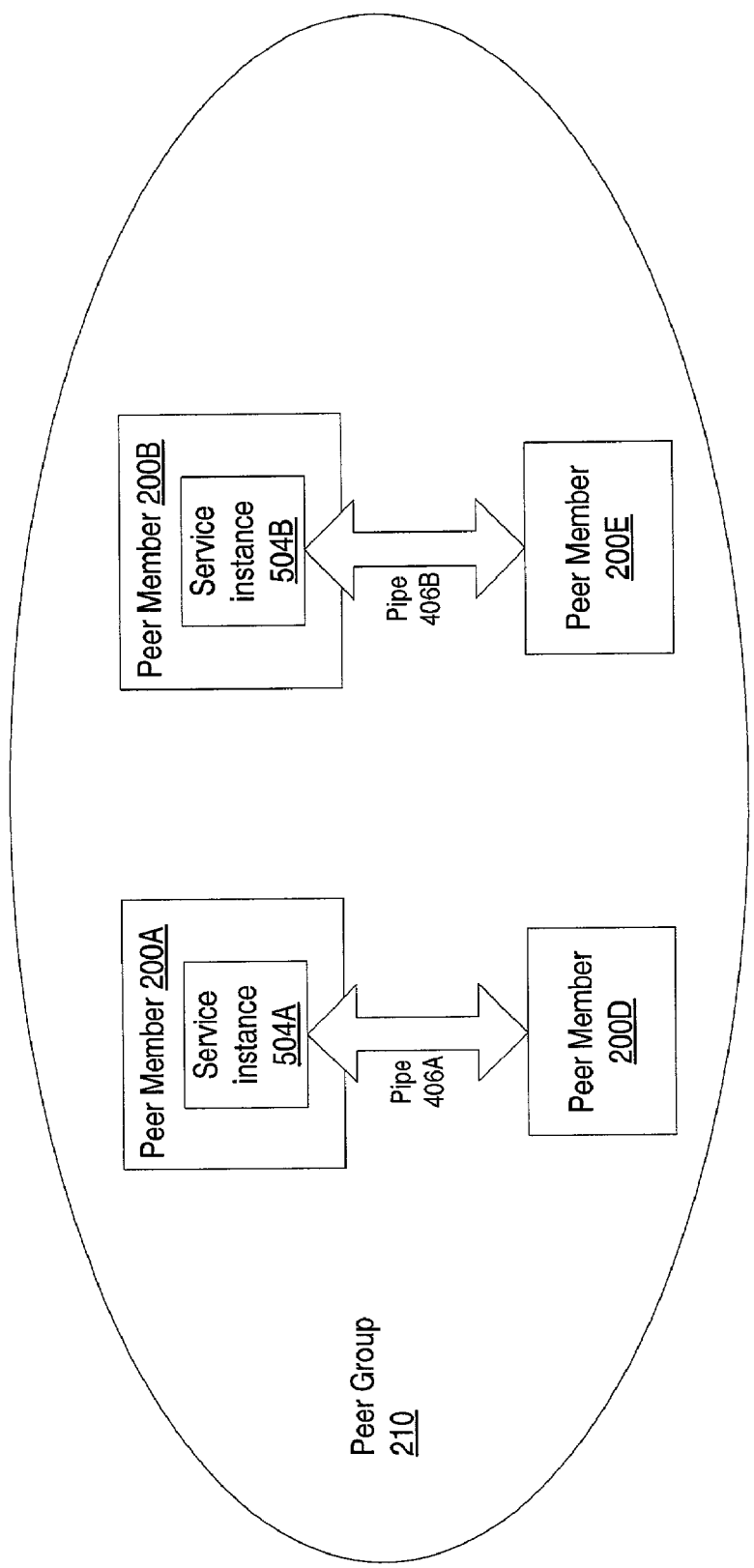
FIG. 18B illustrates migration of a service in a peer group according to one embodiment.

FIG. 18B illustrates migration of a service in a peer group according to one embodiment. In FIG. 18B, peer 200E is shown accessing a different service instance 504B on peer 200B through pipe 406B after redirection and binding to the input pipe of peer 200B, which may have performed, for example, if peer 200C, and thus service instance 200C, becomes unavailable. In one embodiment, the redirection and binding may occur transparently to peer 200E. In one embodiment, the redirection and binding may occur without assistance of a third party (e.g. another peer monitoring the activities of the peers including the availability of service instances 504.)

Some services may maintain state information corresponding to peers that are accessing the service via a pipe. For these services, it may be necessary when migrating from one service instance to another service instance to transfer state information corresponding to the peer from the peer hosting the first service instance to the peer hosting the second service instance. In one embodiment, transferal of state information is the responsibility of the service. For example, if service 504 maintains state information for peers accessing the service, then state information for service 504 corresponding to peer 200E may be migrated from peer 200C to peer 200B.

Figure 19B:
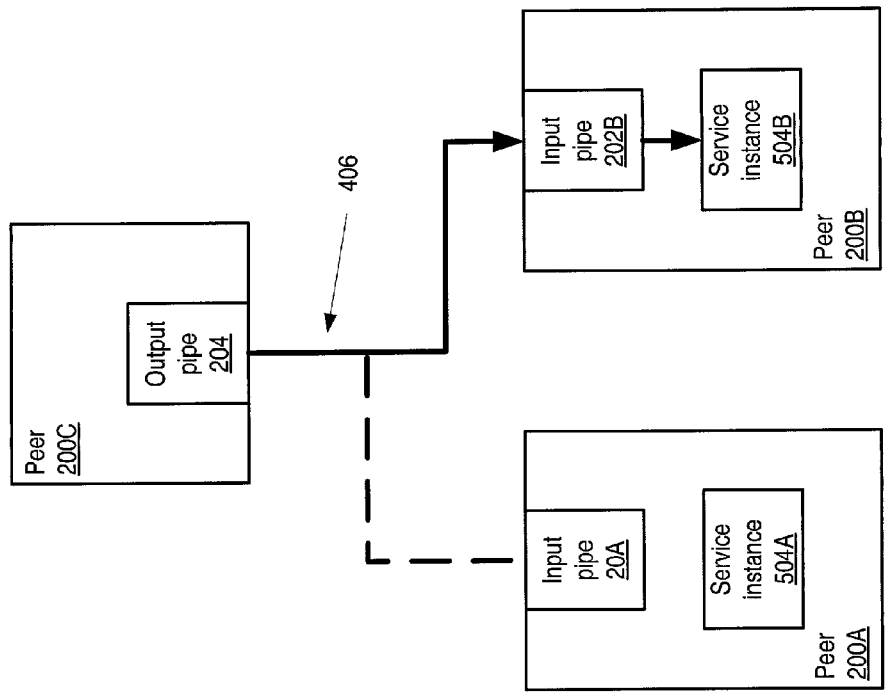
FIG. 19B illustrates migration of a service in a peer group provided to other peers via a propagate pipe according to one embodiment.
Figure 19A:
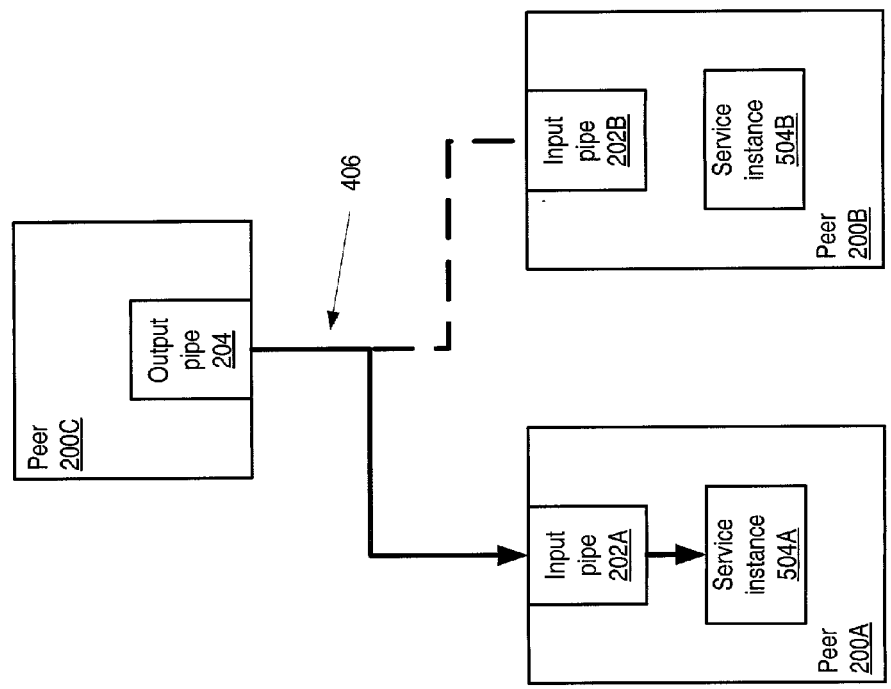
FIG. 19A illustrates a peer group providing a redundant service to other peers via a propagate pipe according to one embodiment.

FIG. 19A illustrates a peer group providing a redundant service to other peers via a propagate pipe according to one embodiment. In this example, peers 200B and 200C each provide an instance of a service 504 to other peers on a network. Peer 200C is shown accessing service instance 504A on peer 200A via propagate pipe 406, which is coupled to output pipe 204 on peer 200A, input pipe 202A on peer 200A and input pipe 202B on peer 200B. In one embodiment, peers 200A, 200B, and 200C may be member peers in a peer group, and the service may be a peer group network service available only to member peers in the peer group. From peer 200C's perspective, the peer may not be aware of which instance of the service it is accessing.

In one embodiment, a pipe resolver may handle localizing the receiving end (i.e. input pipe 202A) of the pipe 406. In one embodiment, the pipe resolver may use a pipe advertisement for the pipe 406 in localizing the input pipe. In one embodiment, the pipe resolver may manage a cache of the locations (i.e. receiving peers and corresponding service instances) of the receiving ends (input pipes 202) of the pipe. Using the pipe resolver, messages on the pipe 406 from peer 200C for the service may be routed from output pipe 204 to input pipe 202A. In one embodiment, the pipe resolver may be accessed by applications and/or services to set/unset entries in the cache. For example, if a service instance 506 becomes unavailable, the service and/or hosting peer may inform the pipe resolver that the service instance 506 is no longer available. Messages to the service may then be routed to a redundant instance 506 of the service on another peer. In one embodiment, the pipe resolver may be a service provided by one or more members of the peer group.

FIG. 19B illustrates migration of a service in a peer group provided to other peers via a propagate pipe according to one embodiment. As illustrated in FIG. 19B, if the instance of service 504A on peer 200A becomes unavailable (e.g. the service instance is no longer provided by the peer, the peer disconnects from the network or leaves the peer group, or load balancing is desired or required), redirection of peer 200C to instance of service 504B on peer 200B may be accomplished by routing messages on the pipe 406 from peer 200C for the service from output pipe 204 to input pipe 202B. In one embodiment, a pipe resolver may handle the routing of the messages to a particular input pipes 202 corresponding to a currently available service instance 506.

In one embodiment, a peer group 210 may provide a monitoring service (hosted by one or more peers 200) that may track information about the status of member peers 200 including the availability of service instances 504 on the member peers. If an instance of service 504 on one of the peers 200 becomes unavailable, the monitoring service may detect this and member peers 200 currently accessing the service instance 504 may be redirected by the monitoring service to a redundant instance of the service 504. In one embodiment, the monitoring service may monitor load on the peers 200 and may redirect peers to other service instances to perform load balancing.

Figure 20:
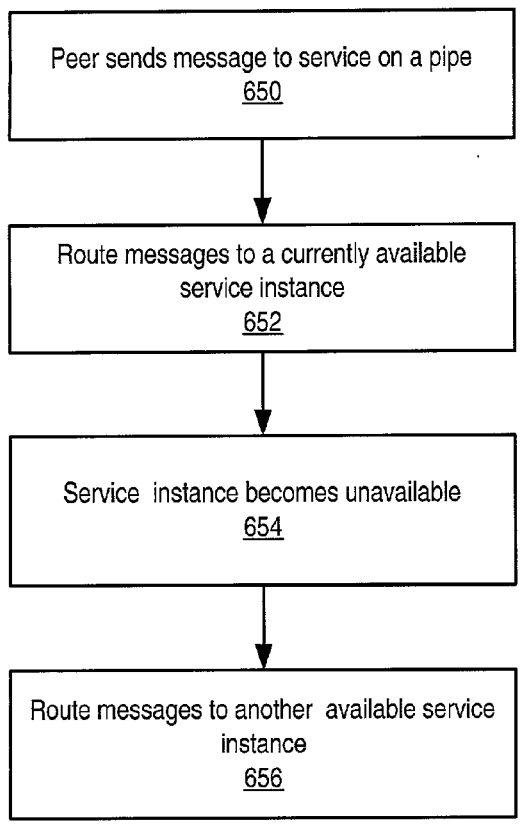
FIG. 20 is a flowchart illustrating a method of migrating a service according to one embodiment.

FIG. 20 is a flowchart illustrating a method of migrating a service according to one embodiment. A plurality of peers may offer redundant instances of a network service. In one embodiment, the peers may be member peers in a peer group, and the service may be a peer group service available only to member peers of the peer group. In one embodiment, a pipe may be bound to two or more of the peers hosting redundant instances of the service. As indicated at 650, a peer may send messages on the pipe to the service. The messages may be routed to a currently available instance of the service hosted by one of the peers as indicated at 652. In one embodiment, a pipe resolver may handle localizing the receiving end (input pipe) of the pipe. In one embodiment, the pipe resolver may maintain information on input pipes corresponding to instances of the service, and may select an input pipe to route the messages to from the information.

The service instance to which messages from the peer to the service are being routed on the pipe may become unavailable (e.g. due to the peer node disconnecting from the network or leaving the peer group, load balancing, etc.) as indicated at 654. As indicated at 656, subsequent messages may be routed to an input pipe of the pipe corresponding to an available redundant instance of the service on another peer. In one embodiment, a pipe resolver may handle localizing the receiving end (input pipe) of the pipe to route the messages to the redundant instance of the service.

Figure 21:
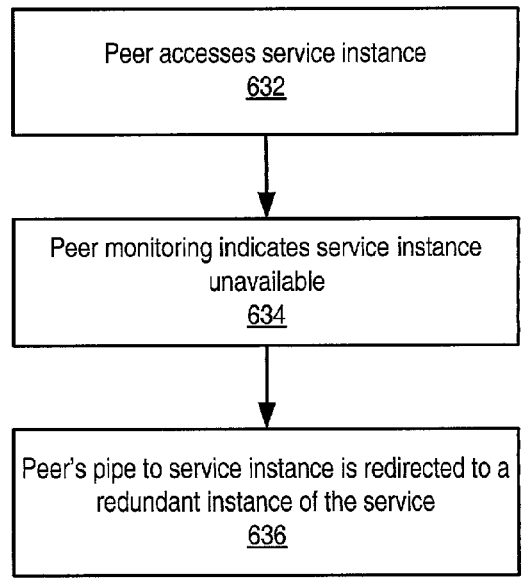
FIG. 21 is a flowchart illustrating a method of redirecting access from a failed peer to an available peer according to one embodiment.

FIG. 21 is a flowchart illustrating a method of redirecting access from a failed peer to an available peer using a monitoring service according to one embodiment. This method also may be used when performing load balancing among a collection of peers. A peer group may offer redundant instances of a network service on two or more member peers. A member peer may use a service instance provided by another member of the peer group as indicated at 632. In one embodiment, the peer group may implement a monitoring service that keeps track of the status of the service instances' host peers. The particular service instance currently accessed by the peer may become unavailable. For example, the host peer may become unavailable or may decide to discontinue hosting the service instance. The monitoring service may detect the service instance on the host peer's unavailability as indicated at 634 and automatically redirect access to another instance of the service as indicated at 636. In one embodiment, the redirection may include rebinding the endpoint of the service instance's output pipe to a redundant instance of the network service running on an available host peer.

In some embodiments as indicated in FIGS. 22A and 22B, migration of services may be implemented using several layers according to the peer-to-peer platform. Each layer may implement its own protocol for communicating on the network. As illustrated in FIG. 22A, pipe resolver 304 may handle the localization of the receiving end (input pipe 202) of the pipe 406 and may be implemented with a pipe resolver protocol 305 for communicating with the pipe resolver according to the peer-to-peer platform. Pipe resolver 304 may use a resolver 308 for sending messages. Resolver 308 may handle the actual sending of messages (queries) on the pipe 406. Resolver 308 may be implemented with a resolver protocol for sending simple, generic messages on pipes in accordance with the peer-to-peer platform. In one embodiment, pipe resolver 304 and resolver 308 may be implemented as services in a peer group by one or more peer group members.

In one embodiment, peer groups may extend across multiple IP subnets. Thus, instances of a service 504 may be located in two or more subnets or on the other side of firewalls, and an instance of a service 504 may or may not be located in a different subnet or may be located across a firewall from peer 200. As illustrated in FIG. 22B, rendezvous 350 may be used to propagate messages to peers in other subnets. The rendezvous 350 may be implemented using a rendezvous protocol 352 in accordance with the peer-to-peer platform. In one embodiment, the rendezvous protocol 352 may be used across subnets (configurable at the peer group level). In one embodiment, the rendezvous protocol may be used across/through firewalls (e.g. gateways). For example when localizing the receiving end of pipe 406, rendezvous 350 may use rendezvous protocol 352 to propagate messages from resolver 308 across subnets. In one embodiment, the rendezvous may be a service implemented in a peer group by one or more peer group members. In one embodiment, the rendezvous service may propagate queries to other rendezvous services in other peer groups.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or nonvolatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Note that the various methods as illustrated in the Figures and described herein are merely examples. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A peer computing system, comprising:
    a plurality of peer nodes each configured to provide a redundant instance of a network service for access by other peer nodes in a network;
    a peer node configured to access the network service by sending messages on a pipe bound to the peer node and to each of the plurality of peer nodes, wherein the pipe represents a virtual communications channel in the network for communicating with the network service;
    wherein the peer computing system is configured to:
        route one or more messages on the pipe for the network service from the peer node to an instance of the network service on one of the plurality of peer nodes bound to the pipe;
        detect that the one of the plurality of peer nodes is not able to provide access to the instance of the service; and
        route a subsequent one or more messages on the pipe for the network service from the peer node to another instance of the network service provided by another one of the plurality of peer nodes bound to the pipe in response to the one of the plurality of peer nodes not being able to provide access to the instance of the service.

2. The peer computing system as recited in claim 1, wherein the peer node is not aware of which instance of the network service the messages are routed to.

3. The peer computing system as recited in claim 1, wherein the peer node is not aware that the one of the plurality of peer nodes is not able to provide access to the instance of the service.

4. The peer computing system as recited in claim 1, wherein the peer computing system is further configured to unbind the one of the plurality of peer nodes from the pipe in response to the one of the plurality of peer nodes not being able to provide access to the instance of the service.

5. The peer computing system as recited in claim 1, wherein the peer computing system is further configured to bind the other one of the plurality of peer nodes to the pipe in response to the one of the plurality of peer nodes not being able to provide access to the instance of the service.

6. The peer computing system as recited in claim 1, wherein the network service is configured to transfer state information for the network service corresponding to the peer node from the one of the plurality of peer nodes to the other of the plurality of peer nodes in response to the one of the plurality of peer nodes not being able to provide access to the instance of the service.

7. The peer computing system as recited in claim 1, wherein the peer computing system further comprises a pipe resolver configured to determine a particular instance of the network service on the plurality of peer nodes bound to the pipe to which messages on the pipe for the network service are to be routed.

8. The peer computing system as recited in claim 1, wherein the peer computing system further comprises a pipe resolver configured to:
  determine the instance of the network service on the one of the plurality of peer nodes bound to the pipe to which the one or more messages for the network service are to be routed; and
  determine the other instance of the network service on the other one of the plurality of peer nodes bound to the pipe to which the subsequent one or more messages for the network service are to be routed.

9. The peer computing system as recited in claim 1, wherein the plurality of peer nodes and the peer node are configured to implement a peer-to-peer environment on the network according to a peer-to-peer platform comprising one or more peer-to-peer platform protocols for enabling the peer nodes to discover each other, to communicate with each other, and to share content in the peer-to-peer environment.

10. The peer computing system as recited in claim 1, wherein the plurality of peer nodes and the peer node are member peers in a peer group in the network, wherein member peers of the peer group are configured to share the network service with other member peers of the peer group only, so that the peer group defines a limited domain of availability for the network service.

11. The peer computing system as recited in claim 1, wherein, to detect that the one of the plurality of peer nodes is not able to provide access to the instance of the service, the peer computing system is further configured to detect that the one of the plurality of peer nodes is disconnected from the network.

12. The peer computing system as recited in claim 1, wherein, to detect that the one of the plurality of peer nodes is not able to provide access to the instance of the service, the peer computing system is further configured to determine load on the one of the plurality of peer nodes is above a load threshold for the one of the plurality of peer nodes.

13. A peer computing system, comprising:
  a peer node configured to provide an instance of a network service for access by other peer nodes in a network;
  another peer node configured to access the instance of the network service provided by the peer node by sending one or more messages on a pipe bound to the peer node and to the other peer node, wherein the pipe represents a virtual communications channel in the network for communicating with the network service;
  wherein the peer computing system is configured to bind the pipe to a different peer node configured to provide another instance of the network service for access by the other peer nodes in the network; and
  wherein the other peer node is further configured to access the other instance of the network service provided by the different peer node by sending a subsequent one or more messages on the pipe bound to the different peer node and the other peer node if the peer node is not able to provide access to the instance of the service.

14. The peer computing system as recited in claim 13, wherein the peer computing system is further configured to:
  route the one or more messages to the instance of the network service on the peer node bound to the pipe;
  detect that the peer node is not able to provide access to the instance of the service; and
  route the subsequent one or more messages to the other instance of the network service on the different peer node bound to the pipe in response to the peer node not being able to provide access to the instance of the service.

15. The peer computing system as recited in claim 13, wherein the other peer node is not aware of which instance of the network service is accessed via the pipe.

16. The peer computing system as recited in claim 13, wherein the peer computing system is further configured to unbind the peer node from the pipe in response to the peer node not being able to provide access to the instance of the service.

17. The peer computing system as recited in claim 13, wherein the peer computing system is further configured to bind the different peer node to the pipe in response to the peer node not being able to provide access to the instance of the service.

18. The peer computing system as recited in claim 13, wherein the network service is configured to transfer state information for the network service corresponding to the other peer node from the peer node to the different peer node in response to the peer node not being able to provide access to the instance of the service.

19. The peer computing system as recited in claim 13, wherein the peer computing system further comprises a pipe resolver configured to determine to which instance of the network service on which peer node bound to the pipe the messages on the pipe for the network service are to be routed.

20. The peer computing system as recited in claim 13, wherein the peer computing system comprises a plurality of peer nodes including the peer node, the other peer node, and the different peer node, wherein the plurality of peer nodes is configured to implement a peer-to-peer environment on the network according to a peer-to-peer platform comprising one or more peer-to-peer platform protocols for enabling the plurality of peer nodes to discover each other, to communicate with each other, and to share content in the peer-to-peer environment.

21. The peer computing system as recited in claim 13, wherein the peer node, the other peer node, and the different peer node are member peers in a peer group in the p network, wherein member peers of the peer group are configured to share the network service with other member peers of the peer group only, so that the peer group defines a limited domain of availability for the network service.

22. A peer computing system, comprising:
  a plurality of peer nodes, wherein the plurality of peer nodes is configured to implement a peer-to-peer environment on a network according to a peer-to-peer platform comprising one or more peer-to-peer platform protocols for enabling the plurality of peer nodes to discover each other, to communicate with each other, and to share content in the peer-to-peer environment;

a subset of the plurality of peer nodes each comprising a redundant instance of a network service for access by others of the plurality of peer nodes in accordance with the peer-to-peer platform;

wherein, to access an instance of the network service, one of the plurality of peer nodes is configured to send messages to the network service on a pipe bound to the peer node and to one or more of the subset of peer nodes in accordance with the peer-to-peer platform, wherein the pipe represents a virtual communications channel for communicating with the network service on the one or more of the subset of peer nodes;

wherein the peer computing system is configured to:
route one or more messages on the pipe for the network service from the peer node to an instance of the network service on one of the subset of peer nodes bound to the pipe;
detect that the one of the subset of peer nodes is not able to provide access to the instance of the service; and
route a subsequent one or more messages on the pipe for the network service from the peer node to another instance of the network service provided by another one of the subset of peer nodes bound to the pipe in response to the one of the subset of peer nodes not being able to provide access to the instance of the service.

23. The peer computing system as recited in claim 22, wherein the peer node is not aware of which instance of the network service the messages are routed to.

24. The peer computing system as recited in claim 22, wherein the peer computing system is further configured to unbind the one of the subset of peer nodes from the pipe in response to the one of the subset of peer nodes not being able to provide access to the instance of the service.

25. The peer computing system as recited in claim 22, wherein the peer computing system is further configured to bind the other one of the subset of peer nodes to the pipe in response to the one of the subset of peer nodes not being able to provide access to the instance of the service.

26. The peer computing system as recited in claim 22, wherein the network service is configured to transfer state information for the network service corresponding to the peer node from the one of the subset of peer nodes to the other of the subset of peer nodes in response to the one of the subset of peer nodes not being able to provide access to the instance of the service.

27. The peer computing system as recited in claim 22, wherein the peer computing system further comprises a pipe resolver configured to:
determine the instance of the network service on the one of the subset of peer nodes bound to the pipe to which the one or more messages for the network service are to be routed; and
determine the other instance of the network service on the other one of the subset of peer nodes bound to the pipe to which the subsequent one or more messages for the network service are to be routed.

28. The peer computing system as recited in claim 22, wherein the subset of the plurality of peer nodes and the one of the plurality of peer nodes are member peers in a peer group in the network, wherein member peers of the peer group are configured to share the network service with other member peers of the peer group only, so that the peer group defines a limited domain of availability for the network service.

29. A peer-to-peer network environment, comprising:
a peer group comprising a plurality of peer group members, wherein each peer group member comprises a network node configured to communicate with other members of the peer group over one or more networks;
wherein a subset of the peer group members are configured to provide redundant instances of a network service to the peer group, wherein a member of the peer group can access the network service from any of the plurality of peer group members providing one of the redundant instances of the network service;
wherein the subset of peer group members providing redundant instances of the network service are configured to provide a fail-over mechanism wherein if one of the peers providing the network service fails or leaves the peer group, the network service may be obtained from another one of the peers providing the network service; and
wherein the subset of peer group members providing redundant instances of the network service support a pipe binding protocol for establishing a pipe to access the network service.

30. The peer-to-peer network environment as recited in claim 29, wherein a member of the peer group can access the network service by connecting to a pipe to one of the redundant instances of the network service, wherein the pipe represents a virtual communications channel for communicating with the network service.

31. The peer-to-peer network environment as recited in claim 30, wherein the subset of peer group members providing redundant instances of the network service are configured to rebind a pipe in accordance with the pipe binding protocol from a failed one of the subset of peer group members providing redundant instances of the network service to another one of the subset of peer group members providing redundant instances of the network service so that peer group members connected to that communication pipe continue to have access to the network service.

32. A method, comprising:
a plurality of peer nodes each providing a redundant instance of a network service for access by other peer nodes in a network;
a peer node accessing the network service provided by the plurality of peer nodes by sending messages on a pipe bound to the peer node and to each of the plurality of peer nodes, wherein the pipe represents a virtual communications channel in the network for communicating with the network service;
routing one or more messages on the pipe for the network service from the peer node to an instance of the network service on one of the plurality of peer nodes bound to the pipe;
detecting that the one of the plurality of peer nodes is not able to provide access to the instance of the service; and
routing a subsequent one or more messages on the pipe for the network service from the peer node to another instance of the network service provided by another one of the plurality of peer nodes bound to the pipe in response to said detecting that the one of the plurality of peer nodes is not able to provide access to the instance of the service.

33. The method as recited in claim 32, wherein the peer node is not aware of which instance of the network service the messages are routed to.

34. The method as recited in claim 32, wherein the peer node is not aware that the one of the plurality of peer nodes is not able to provide access to the instance of the service.

35. The method as recited in claim 32, further comprising unbinding the one of the plurality of peer nodes from the pipe in response to said detecting that the one of the plurality of peer nodes is not able to provide access to the instance of the service.

36. The method as recited in claim 32, further comprising binding the other one of the plurality of peer nodes to the pipe in response to said detecting that the one of the plurality of peer nodes is not able to provide access to the instance of the service.

37. The method as recited in claim 32, further comprising transferring state information for the network service corresponding to the peer node from the one of the plurality of peer nodes to the other of the plurality of peer nodes in response to said detecting that the one of the plurality of peer nodes is not able to provide access to the instance of the service.

38. The method as recited in claim 32, further comprising:
   determining the instance of the network service on the one of the plurality of peer nodes bound to the pipe to which the one or more messages for the network service are to be routed; and
   determining the other instance of the network service on the other one of the plurality of peer nodes bound to the pipe to which the subsequent one or more messages for the network service are to be routed.

39. The method as recited in claim 32, wherein the plurality of peer nodes and the peer node are configured to implement a peer-to-peer environment on the network according to a peer-to-peer platform comprising one or more peer-to-peer platform protocols for enabling the peer nodes to discover each other, to communicate with each other, and to share content in the peer-to-peer environment.

40. The method as recited in claim 32, wherein the plurality of peer nodes and the peer node are member peers in a peer group in the network, wherein member peers of the peer group are configured to share the network service with other member peers of the peer group only, so that the peer group defines a limited domain of availability for the network service.

41. The method as recited in claim 32, wherein said detecting that the one of the plurality of peer nodes is not able to provide access to the instance of the service comprises detecting that the one of the plurality of peer nodes is disconnected from the network.

42. The method as recited in claim 32, wherein said detecting that the one of the plurality of peer nodes is not able to provide access to the instance of the service comprises determining load on the one of the plurality of peer nodes is above a load threshold for the one of the plurality of peer nodes.

43. A method comprising:
   a peer node in a peer-to-peer network accessing an instance of a network service provided by another peer node in the peer-to-peer network via a pipe bound to the peer node and the other peer node, wherein the pipe represents a virtual communications channel in the peer-to-peer network for communicating with the network service;
   binding the pipe to a different peer node in the peer-to-peer network providing a redundant instance of the network service; and
   the peer node accessing the instance of the network service provided by the different peer node via the pipe bound to the peer node and the different peer node.

44. The method as recited in claim 43, wherein said binding the pipe to a different peer node is performed transparently to the peer node.

45. The method as recited in claim 43, further comprising detecting that the instance of the network service on the other peer node is unavailable for access on the peer-to-peer network, wherein said binding the pipe to a different peer node is performed in response to said detecting.

46. The method as recited in claim 43, wherein said binding the pipe to a different peer node comprises binding the pipe to an endpoint of the different peer node, wherein the endpoint of the different peer node corresponds to a network interface of the different peer node that implements a network transport protocol supported by the pipe.

47. The method as recited in claim 43, wherein peer nodes in the peer-to-peer network are configured to implement a peer-to-peer environment in the peer-to-peer network according to a peer-to-peer platform comprising one or more peer-to-peer platform protocols for enabling the peer nodes to discover each other, to communicate with each other via pipes, and to share content including network services in the peer-to-peer environment.

48. The method as recited in claim 43, wherein the peer node, the other peer node, and the different peer node are member peers in a peer group in the peer-to-peer network, wherein member peers of the peer group are configured to share the network service with other member peers of the peer group only, so that the peer group defines a limited domain of availability for the network service.

49. A tangible, computer-accessible storage medium, comprising software instructions executable to implement:
   a plurality of peer nodes each providing a redundant instance of a network service for access by other peer nodes in a network;
   a peer node accessing the network service provided by the plurality of peer nodes by sending messages on a pipe bound to the peer node and to each of the plurality of peer nodes, wherein the pipe represents a virtual communications channel in the network for communicating with the network service;
   routing one or more messages on the pipe for the network service from the peer node to an instance of the network service on one of the plurality of peer nodes bound to the pipe;
   detecting that the one of the plurality of peer nodes is not able to provide access to the instance of the service; and
   routing a subsequent one or more messages on the pipe for the network service from the peer node to another instance of the network service provided by another one of the plurality of peer nodes bound to the pipe in response to said detecting that the one of the plurality of peer nodes is not able to provide access to the instance of the service.

50. The tangible, computer-accessible storage medium as recited in claim 49, wherein the peer node is not aware of which instance of the network service the messages are routed to.

51. The tangible, computer-accessible storage medium as recited in claim 49, wherein the peer node is not aware that the one of the plurality of peer nodes is not able to provide access to the instance of the service.

52. The tangible, computer-accessible storage medium as recited in claim 49, wherein the software instructions are further executable to implement unbinding the one of the plurality of peer nodes from the pipe in response to said detecting that the one of the plurality of peer nodes is not able to provide access to the instance of the service.

53. The tangible, computer-accessible storage medium as recited in claim 49, wherein the software instructions are further executable to implement binding the other one of the plurality of peer nodes to the pipe in response to said detecting that the one of the plurality of peer nodes is not able to provide access to the instance of the service.

54. The tangible, computer-accessible storage medium as recited in claim 49, wherein the software instructions are further executable to implement transferring state information for the network service corresponding to the peer node from the one of the plurality of peer nodes to the other of the plurality of peer nodes in response to said detecting that the one of the plurality of peer nodes is not able to provide access to the instance of the service.

55. The tangible, computer-accessible storage medium as recited in claim 49, wherein the software instructions are further executable to implement:
   determining the instance of the network service on the one of the plurality of peer nodes bound to the pipe to which the one or more messages for the network service are to be routed; and
   determining the other instance of the network service on the other one of the plurality of peer nodes bound to the pipe to which the subsequent one or more messages for the network service are to be routed.

56. The tangible, computer-accessible storage medium as recited in claim 49, wherein the plurality of peer nodes and the peer node are configured to implement a peer-to-peer environment on the network according to a peer-to-peer platform comprising one or more peer-to-peer platform protocols for enabling the peer nodes to discover each other, to communicate with each other, and to share content in the peer-to-peer environment.

57. The tangible, computer-accessible storage medium as recited in claim 49, wherein the plurality of peer nodes and the peer node are member peers in a peer group in the network, wherein member peers of the peer group are configured to share the network service with other member peers of the peer group only, so that the peer group defines a limited domain of availability for the network service.

58. The tangible, computer-accessible storage medium as recited in claim 49, wherein, in said detecting that the one of the plurality of peer nodes is not able to provide access to the instance of the service, the software instructions are further executable to implement detecting that the one of the plurality of peer nodes is disconnected from the network.

59. The tangible, computer-accessible storage medium as recited in claim 49, wherein, in said detecting that the one of the plurality of peer nodes is not able to provide access to the instance of the service, the software instructions are further executable to implement determining load on the one of the plurality of peer nodes is above a load threshold for the one of the plurality of peer nodes.

60. A tangible, computer-accessible storage medium, comprising software instructions executable to implement:
   a peer node in a peer-to-peer network accessing an instance of a network service provided by another peer node in the peer-to-peer network via a pipe bound to the peer node and the other peer node, wherein the pipe represents a virtual communications channel in the peer-to-peer network for communicating with the network service;
   binding the pipe to a different peer node in the peer-to-peer network providing a redundant instance of the network service; and
   the peer node accessing the instance of the network service provided by the different peer node via the pipe bound to the peer node and the different peer node.

61. The tangible, computer-accessible storage medium as recited in claim 60, wherein said binding the pipe to a different peer node is performed transparently to the peer node.

62. The tangible, computer-accessible storage medium as recited in claim 60, wherein the software instructions are further executable to implement detecting that the instance of the network service on the other peer node is unavailable for access on the peer-to-peer network, wherein said binding the pipe to a different peer node is performed in response to said detecting.

63. The tangible, computer-accessible storage medium as recited in claim 60, wherein, in said binding the pipe to a different peer node, the software instructions are further executable to implement binding the pipe to an endpoint of the different peer node, wherein the endpoint of the different peer node corresponds to a network interface of the different peer node that implements a network transport protocol supported by the pipe.

64. The tangible, computer-accessible storage medium as recited in claim 60, wherein peer nodes in the peer-to-peer network are configured to implement a peer-to-peer environment in the peer-to-peer network according to a peer-to-peer platform comprising one or more peer-to-peer platform protocols for enabling the peer nodes to discover each other, to communicate with each other via pipes, and to share content including network services in the peer-to-peer environment.

65. The tangible, computer-accessible storage medium as recited in claim 60, wherein the peer node, the other peer node, and the different peer node are member peers in a peer group in the peer-to-peer network, wherein member peers of the peer group are configured to share the network service with other member peers of the peer group only, so that the peer group defines a limited domain of availability for the network service.

* * * * *